US012354858B2

(12) United States Patent
Miyazaki et al.

(10) Patent No.: US 12,354,858 B2
(45) Date of Patent: Jul. 8, 2025

(54) ELECTRON TUBE, IMAGING DEVICE AND ELECTROMAGNETIC WAVE DETECTION DEVICE

(71) Applicant: HAMAMATSU PHOTONICS K.K., Hamamatsu (JP)

(72) Inventors: Yasuhide Miyazaki, Hamamatsu (JP); Yuta Kuge, Hamamatsu (JP); Naoya Kawai, Hamamatsu (JP); Simon Lehnskov Lange, Copenhagen (DK); Peter Uhd Jepsen, Copenhagen (DK)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 356 days.

(21) Appl. No.: 17/796,738

(22) PCT Filed: Feb. 5, 2021

(86) PCT No.: PCT/EP2021/052815

§ 371 (c)(1),
(2) Date: Aug. 1, 2022

(87) PCT Pub. No.: WO2021/156442

PCT Pub. Date: Aug. 12, 2021

(65) Prior Publication Data

US 2023/0071586 A1 Mar. 9, 2023

(30) Foreign Application Priority Data

Feb. 7, 2020 (EP) .................................... 20156121

(51) Int. Cl.
*H01J 43/28* (2006.01)
*H01J 43/24* (2006.01)

(52) U.S. Cl.
CPC ............ *H01J 43/28* (2013.01); *H01J 43/246* (2013.01)

(58) Field of Classification Search
CPC .......... H01J 43/28; H01J 43/246; H01J 43/04; H01J 40/16; H01J 1/304; H01J 1/34
See application file for complete search history.

(56) References Cited

U.S. PATENT DOCUMENTS 5,591,986 A 1/1997 Niigaki et al.
2013/0256535 A1 10/2013 Meijer et al.
(Continued)

FOREIGN PATENT DOCUMENTS

CN 1415076 A 4/2003
CN 1725418 A 1/2006
(Continued)

OTHER PUBLICATIONS

Hao Guang-Hui, "The Nanoscale Vacuum Channel Triode for Optical Detecting", Beijing Vacuum Electronics Restarch Institute , Beijing 100015, China, Jun. 25, 2018, p. 30-p. 36.
(Continued)

*Primary Examiner* — David P Porta
*Assistant Examiner* — Casey Bryant
(74) *Attorney, Agent, or Firm* — Faegre Drinker Biddle & Reath LLP

(57) ABSTRACT

In an electron tube, the meta-surface emits an electron in response to an incidence of the electromagnetic wave. The first and second electrodes are spaced away from each other, and apply potentials different from each other to the meta-surface. A holder is disposed in the housing and holds the electron emitter. A first conductive line of the meta-surface is electrically connected to the first electrode. A second conductive line of the meta-surface is spaced away from the first conductive line, and is electrically connected to the second electrode. The first conductive line extends from the
(Continued)

first electrode to the second conductive line. The second conductive line extends from the second electrode to the first conductive line.

23 Claims, 41 Drawing Sheets

(56) References Cited

U.S. PATENT DOCUMENTS

| | | | |
|---|---|---|---|
| 2016/0216201 | A1 | 7/2016 | Iwaszczuk et al. |
| 2018/0151338 | A1 | 5/2018 | Conley |

FOREIGN PATENT DOCUMENTS

| | | | | |
|---|---|---|---|---|
| CN | 103227097 | A | 7/2013 | |
| CN | 112136077 | A | 12/2020 | |
| EP | 0558308 | A1 | 9/1993 | |
| EP | 3863038 | A1 * | 8/2021 | ................ H01J 1/78 |
| FR | 3030873 | A1 | 6/2016 | |
| JP | S57-072254 | A | 5/1982 | |
| JP | H07-050149 | A | 2/1995 | |
| JP | H9-503091 | A | 3/1997 | |
| JP | 2006-202653 | A | 8/2006 | |
| JP | 2008-016293 | A | 1/2008 | |
| JP | 2009-105102 | A | 5/2009 | |
| JP | 2016-100121 | A | 5/2016 | |
| JP | 2017-142135 | A | 8/2017 | |
| JP | 2019-201065 | A | 11/2019 | |
| KR | 20050112758 | A | 12/2005 | |
| WO | WO-95/009433 | A1 | 4/1995 | |
| WO | WO-03/087739 | A1 | 10/2003 | |
| WO | WO-2007/099958 | A1 | 9/2007 | |
| WO | WO-2012/078043 | A1 | 6/2012 | |
| WO | WO-2015/028029 | A1 | 3/2015 | |
| WO | WO-2019/221133 | A1 | 11/2019 | |

OTHER PUBLICATIONS

Anonymous, "Metamaterial—Wikipedia," https://en.wikipedia.org/wiki/Metamaterial, Nov. 11, 2019, 13 pages.

Anonymous, "Electromagnetic metasurface—Wikipedia," https://en.wikipedia.org/wiki/Electromagnetic_metasurface, Jul. 8, 2020, 8 pages.

Ashihara, Satoshi, "Mid-infrared plasmonic field enhancement and its application to novel nonlinear optical phenomena," Kakenhi/Grants-in-Aid for Scientific Research Research Report, Jun. 8, 2016.

Written Opinion Of the International Searching Authority mailed Mar. 30, 2021 for PCT/EP2021/052815.

* cited by examiner

ELECTRON TUBE, IMAGING DEVICE AND ELECTROMAGNETIC WAVE DETECTION DEVICE

TECHNICAL FIELD

The present invention relates to an electron tube, an imaging device, and an electromagnetic wave detection device.

BACKGROUND ART

Typically there are four types of electron emission such as thermionic emission (achieved by heating electrode), photoelectric emission (achieved by application of photons), secondary emission (achieved by bombarding light speed electron), and field emission (achieved in the presence of electrostatic field). Known a detector detects an electromagnetic wave (see, for example, US Unexamined Patent Application Publication No. 2016/0216201). A system described in Patent Literature 1 is provided with a substrate with a metamaterial structure. The system detects a terahertz-wave (for example, electromagnetic wave of frequencies of 100 GHz up to around 30 THz) among the electromagnetic wave which is incident on the substrate.

CITATION LIST

Patent Literature

Patent Literature 1: US Unexamined Patent Application Publication No. 2016/0216201

SUMMARY OF INVENTION

Technical Problem

In the system described in Patent Literature 1, when the electromagnetic wave is incident on the substrate with the metamaterial structure, the substrate emits an electron. The electron emitted from the substrate excites a molecule included in the gas surrounding the substrate, for example, atmosphere. The excited molecule generates light. A photo sensor detects the generated light.

An object of one aspect of the present invention is to provide an electron tube that can ensure detection accuracy of an electromagnetic wave. An object of another aspect of the present invention is to provide an imaging device that can ensure detection accuracy of an electromagnetic wave. An object of further the other aspect of the present invention is to provide an electromagnetic wave detection device that ensures detection accuracy of an electromagnetic wave.

Solution to Problem

An electron tube according to one aspect of the present invention is provided with a housing, an electron emitter and a holder. The housing is sealed and includes a window transmitting an electromagnetic wave. The electron emitter is disposed in the housing and includes a meta-surface, a first electrode, and a second electrode.

The meta-surface is arranged to emit an electron in response to incidence of the electromagnetic wave. The first electrode and the second electrode are spaced away from each other and are respectively arranged to apply potentials different from each other to the meta-surface. The holder is disposed in the housing and holds the electron emitter. The meta-surface includes a first conductive line and a second conductive line. The first conductive line is electrically connected to the first electrode. The second conductive line is spaced away from the first conductive line and is electrically connected to the second electrode. The first conductive line extends from the first electrode toward the second conductive line. The second conductive line extends from the second electrode toward the first conductive line.

In the one aspect, the electron emitter having the meta-surface is held in the housing sealed by the holder. The first conductive line included in the meta-surface is electrically connected to the first electrode, and the second conductive line included in the meta-surface is electrically connected to the second electrode. In the electron tube, the election emission in the meta-surface can be improved or suppressed in response to the electromagnetic wave passed through the window by applying potentials different from each other to the first electrode and the second electrode. Therefore, detection accuracy of the electromagnetic wave entering the electron tube can be ensured by observing the electron emitted from the electron emitter using the electron tube.

In the one aspect, the holder may include a first conductive terminal and a second conductive terminal that are spaced away from each other. The first electrode may be electrically connected to the first conductive terminal. The second electrode may be electrically connected to the second conductive terminal. In this case, a voltage can be applied to the electron emitter through the holder. Therefore, the number of parts in the electron tube is reduced and the electron tube is made compact.

In the one aspect, the housing may include a first conductive layer and a second conductive layer that are provided on an inner surface of the housing. The first conductive layer and the second conductive layer may be spaced away from each other. The first conductive terminal may be in contact with the first conductive layer.

The second conductive terminal may be in contact with the second conductive layer. In this case, the first conductive layer and the second conductive layer, provided on the inner surface of the housing, can apply potentials to the first conductive terminal and the second conductive terminal Therefore, the electron tube is made compact.

In the one aspect, the holder may include a plurality of springs. The plurality of springs may be arranged to apply energizing force to the inner surface of the housing, the spring positioning the holder with respect to the housing due to the energizing force. The plurality of springs may include at least one of the first conductive terminal and the second conductive terminal. In this case, in spite of any certain amount of deformation due to a manufacturing error or a change in temperature in each of the members of the electron tube, the holder is stably held to the housing. The potentials can be applied to the electron emitter through the springs.

In the one aspect, the holder may include a holding body and a contact electrode. The holding body may have a penetration opening and be in contact with the electron emitter. The contact electrode may be in contact with one of the first electrode and the second electrode and be spaced away from the holding body. The meta-surface and the one being in contact with the contact electrode may be exposed from the penetration opening and be spaced away from an edge of the penetration opening. In this case, the one being in contact with the contact electrode is prevented from being in contact with the holding body. Therefore, a desired electrical connection structure can be achieved between the first electrode and the second electrode with a simple structure.

In the one aspect, the electron emitter may include a substrate having a first principal surface and a second principal surface that face each other. The meta-surface may be provided on the first principal surface.

In one aspect, at least one of the first electrode and the second electrode may be spaced away from an entire edge of the first principal surface. At least one of the first electrode and the second electrode can be easily prevented from being in contact with the holder as long as being spaced away from the entire edge of the first principal surface. Therefore, a desired electrical connection structure can be achieved between the holder and the first and second electrodes with a simple structure.

In the one aspect, the holder may include a base member and an energizing member. The base member may be in contact with the second principal surface. The energizing member may be in contact with an edge of the first principal surface and be arranged to energize the electron emitter to the base member. The energizing member may electrically connect the second electrode. In this case, in spite of any certain amount of deformation due to a manufacturing error or a change in temperature in each of the members of the electron tube, the electron emitter is stably held to the base member. A voltage can be applied to the electron emitter through the energizing member.

In the one aspect, one of the first electrode and the second electrode may be an electrode arranged to connect a ground.

In the one aspect, one of the first conductive line and the second conductive line may include an antenna portion and a bias portion. The antenna portion may be arranged to emit an electron in response to incidence of the electromagnetic wave. The bias portion may be arranged to generate an electric field with the other of the first conductive line and the second conductive line.

In the one aspect, the second conductive line may be arranged to emit an electron in response to incidence of the electromagnetic wave when a bias potential is applied to the first electrode. The first conductive line may be arranged to emit an electron in response to incidence of the electromagnetic wave when a bias potential is applied to the second electrode.

In the one aspect, the second conductive line may include an antenna portion arranged to emit an electron in response to incidence of the electromagnetic wave. The first conductive line may include a bias portion arranged to generate an electric field with the antenna portion when a bias potential is applied to the first electrode. In this case, the potential can be tilted around the antenna portion. Thus, the electron emission can be improved or suppress in the meta-surface.

In the one aspect, the first conductive line may include a first end portion being in contact with the first electrode, and a second end portion electrically connecting the first end portion. The second conductive line may include a third end portion being in contact with the second electrode, and a fourth end portion electrically connecting the third end portion. The second end portion may be disposed closer to the fourth end portion than all parts other than the second end portion in the first conductive line. In this case, the intensity of an electric field generated between the second end portion and the fourth end portion is improved, and a potential around the antenna portion is further tilted. Thus, the election emission can be improved or suppressed in the meta-surface.

In the one aspect, the second conductive line may include a linear portion extending on a virtual straight line extending from the fourth end portion. The second end portion may be located on the virtual straight line. In this case, the electron emitted in the fourth end portion hits against the second end portion and is amplified. Thus, the electron emission is improved in the meta-surface.

In the one aspect, the second conductive line may include a linear portion extending on a virtual straight line extending from the fourth end portion. The second end portion may not be located on the virtual straight line. In this case, amplification of the electron emitted in the fourth end portion, caused by the second end portion, is suppressed. As a result, the electron at an amount depending on the electromagnetic wave passed through the window is emitted from the meta-surface. Therefore, the amplitude of the electromagnetic wave passed through the window can be more accurately detected.

In the one aspect, the electron tube may further include an electron multiplying unit and an electron collecting unit. The electron multiplying unit may be disposed in the housing and be arranged to multiply the electron emitted from the electron emitter. The electron collecting unit may be disposed in the housing and be arranged to collect electrons multiplied by the electron multiplying unit. The housing may be internally held in a vacuum. In this case, the electron emitted from the electron emitter is collected in the electron collecting unit after being amplified in the electron multiplying unit. Therefore, in spite of a compact structure, detection accuracy can be ensured for the electromagnetic wave which is incident from the window.

In the one aspect, the electron multiplying unit and the electron collecting unit may be a diode and may be integrally configured. In this case, a size of the electron tube can be further reduced.

In the one aspect, the electron multiplying unit may include a plurality of dynodes separated from each other. The electron collecting unit may include an anode or a diode arranged to collect the electrons multiplied by the electron multiplying unit. In this case, the electron emitted from the meta-surface is multiplied by a plurality of dynodes. Therefore, a multiplication factor of the electrons collected by the anode or the diode is improved.

In the one aspect, the electron multiplying unit may include a microchannel plate. The electron collecting unit may include an anode or a diode arranged to collect the electrons multiplied by the electron multiplying unit. In this case, a size, a weight, and power consumption are reduced and a response speed and a gain are improved, as compared with a case where the electron multiplying unit includes a plurality of dynodes.

In the one aspect, the electron multiplying unit may include a microchannel plate. The electron collecting unit may include a fluorescent body arranged to receive the electrons multiplied by the electron multiplying unit and emit light. In this case, two-dimensional positions of the electron emitted from the meta-surface can be detected by the light emitted from the fluorescent body.

An imaging device according to another aspect of the present invention includes the electron tube and an imaging unit configured to capture an image based on the light from the fluorescent body. In another aspect, detection accuracy of the electromagnetic wave is ensured.

An electromagnetic wave detecting device according to further the other aspect of the present invention includes the electron tube and a light detector. The light detector is arranged to detect light. The housing houses a gas for emitting light due to an electron emitted from the meta-surface. The light detector is arranged to detect light due to light emission of the gas.

In further the other aspect, the gas may include air, argon gas, or nitrogen gas.

Advantageous Effects of Invention

According to one aspect of the present invention, an electron tube that can ensure detection accuracy of an electromagnetic wave is provided. According to another aspect of the present invention, an imaging device that can ensure detection accuracy of an electromagnetic wave is provided. According to further the other aspect of the present invention, an electromagnetic wave detection device that ensures detection accuracy of an electromagnetic wave is provided.

DESCRIPTION OF EMBODIMENTS

Figure 1:
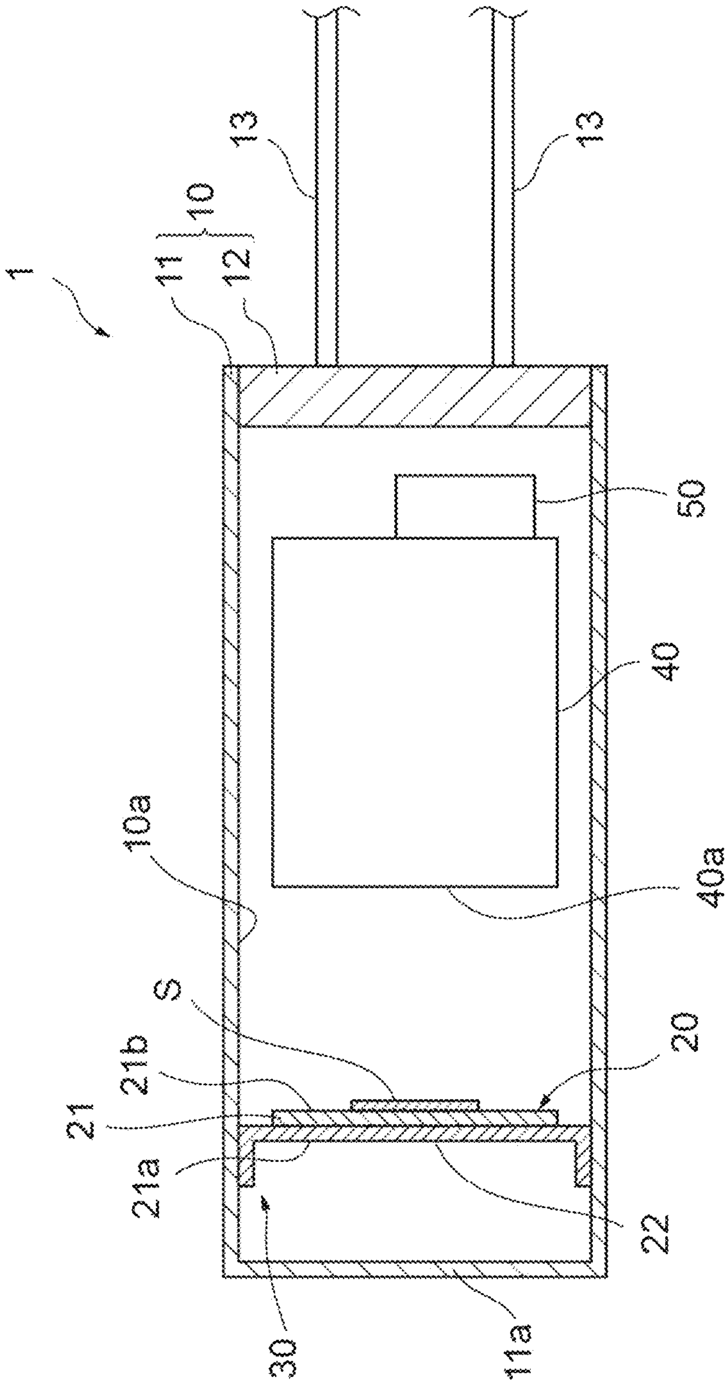
FIG. 1 is a schematic view of an electron tube according to an embodiment.

Hereinafter, embodiments of the present invention will be described in detail with reference to the accompanying drawings. In the description, the same elements or elements having the same functions will be denoted with the same reference numerals and a redundant explanation will be omitted.

Figure 2:
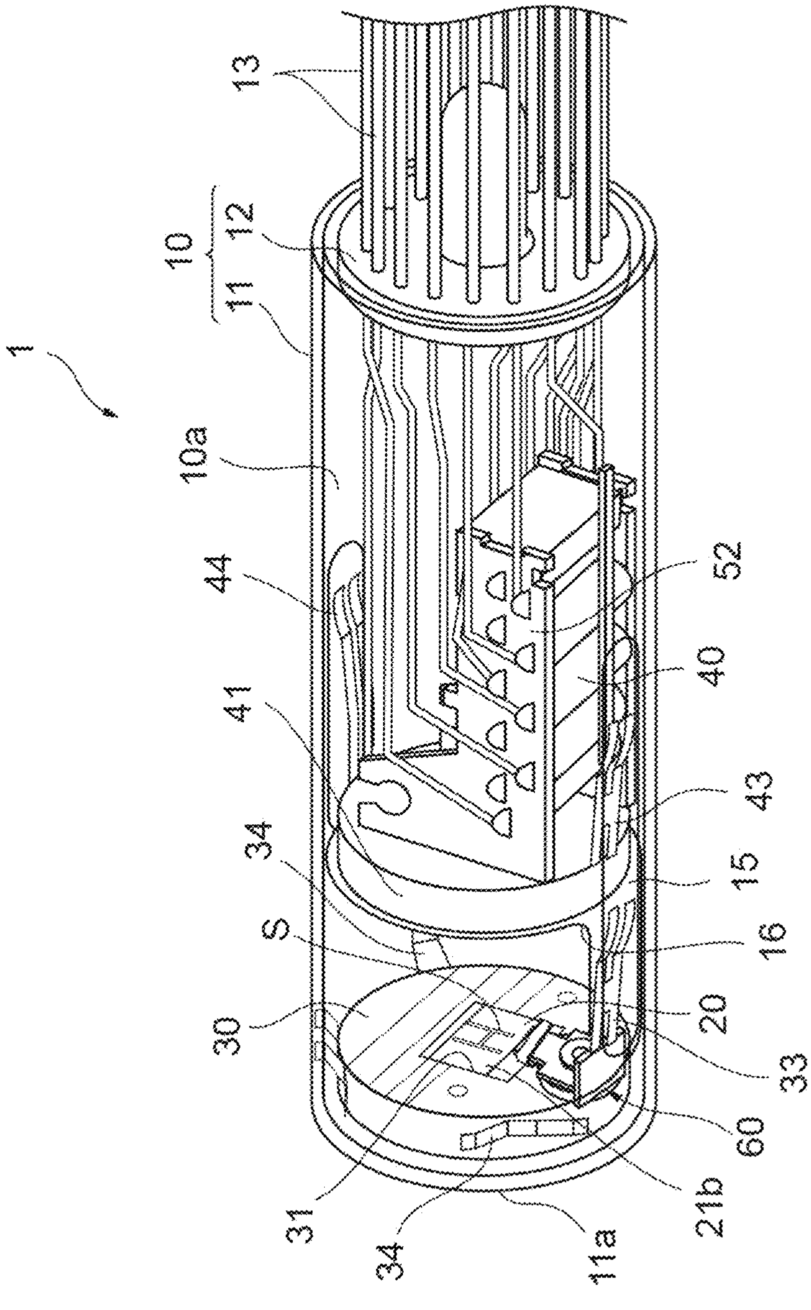
FIG. 2 is a perspective view of the electron tube.
Figure 3:
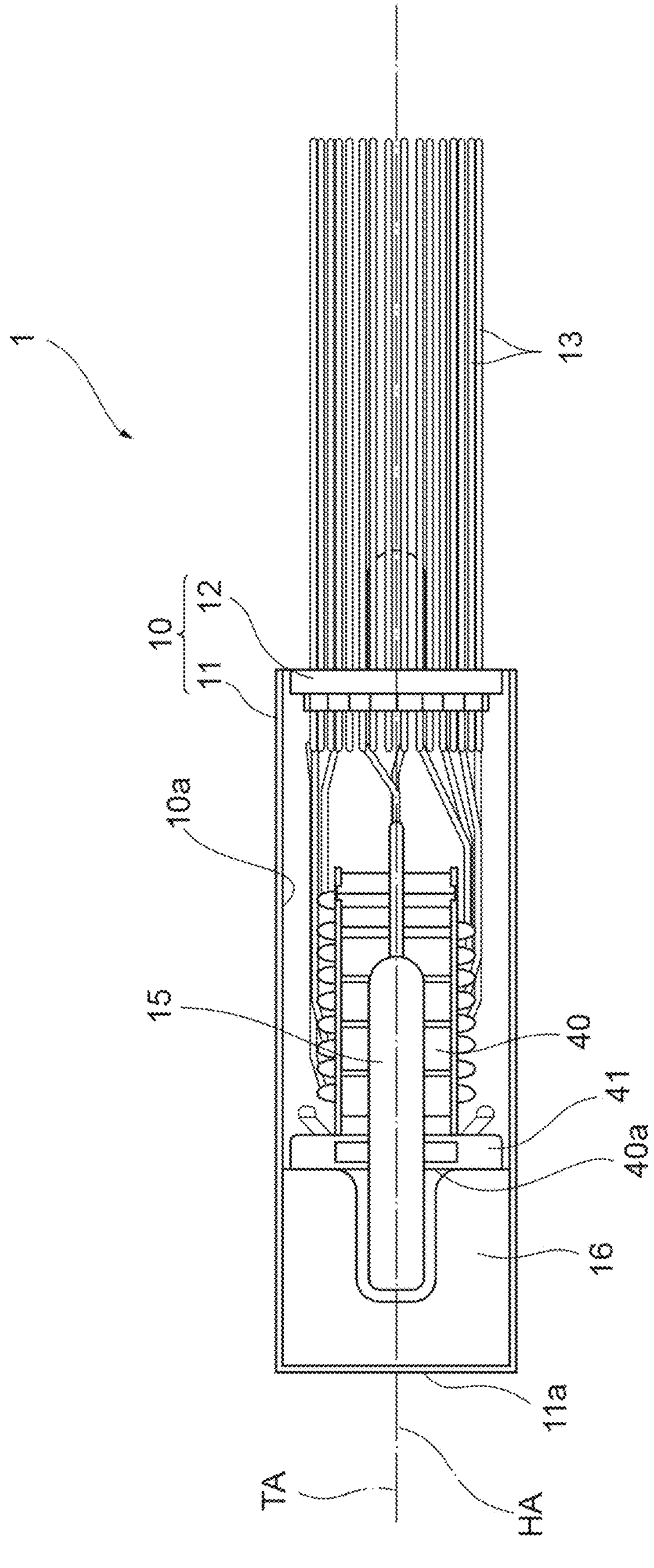
FIG. 3 is a side view of the electron tube.
Figure 4:
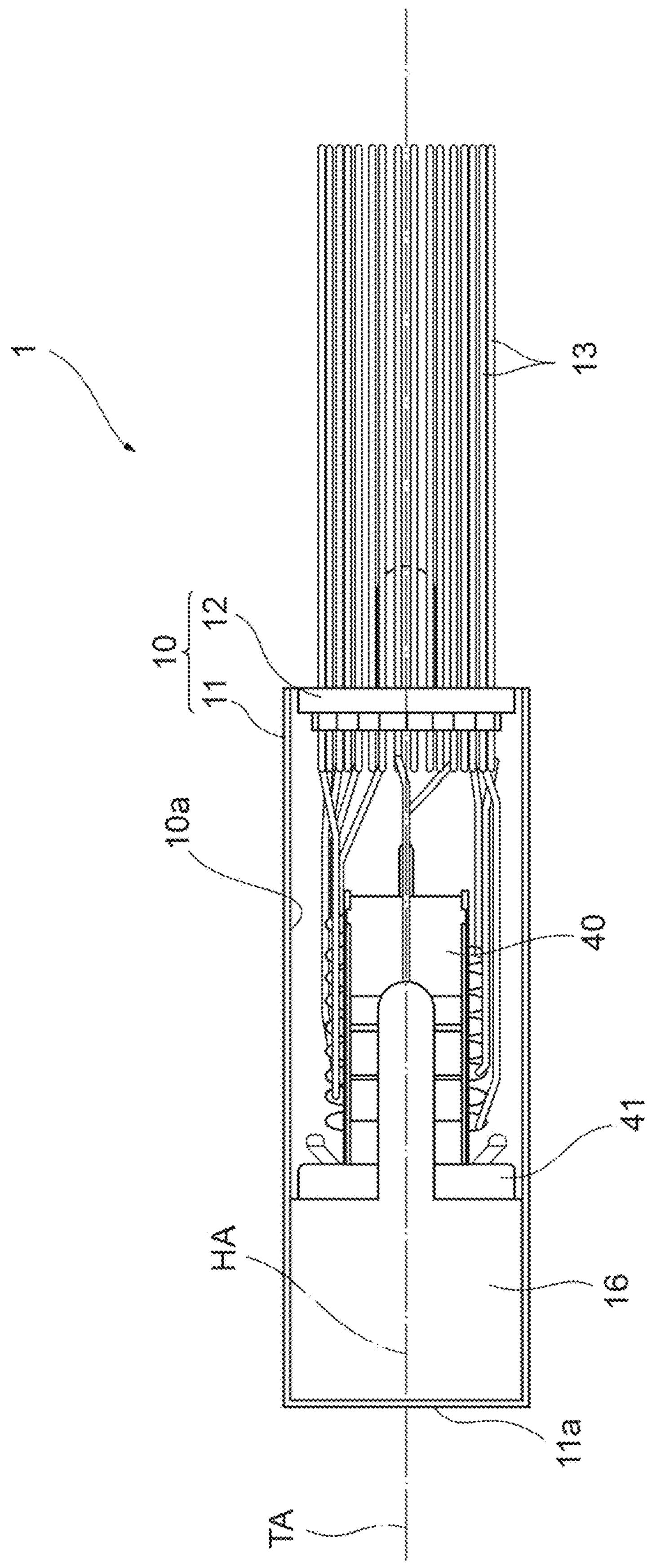
FIG. 4 is a side view of the electron tube.
Figure 5:
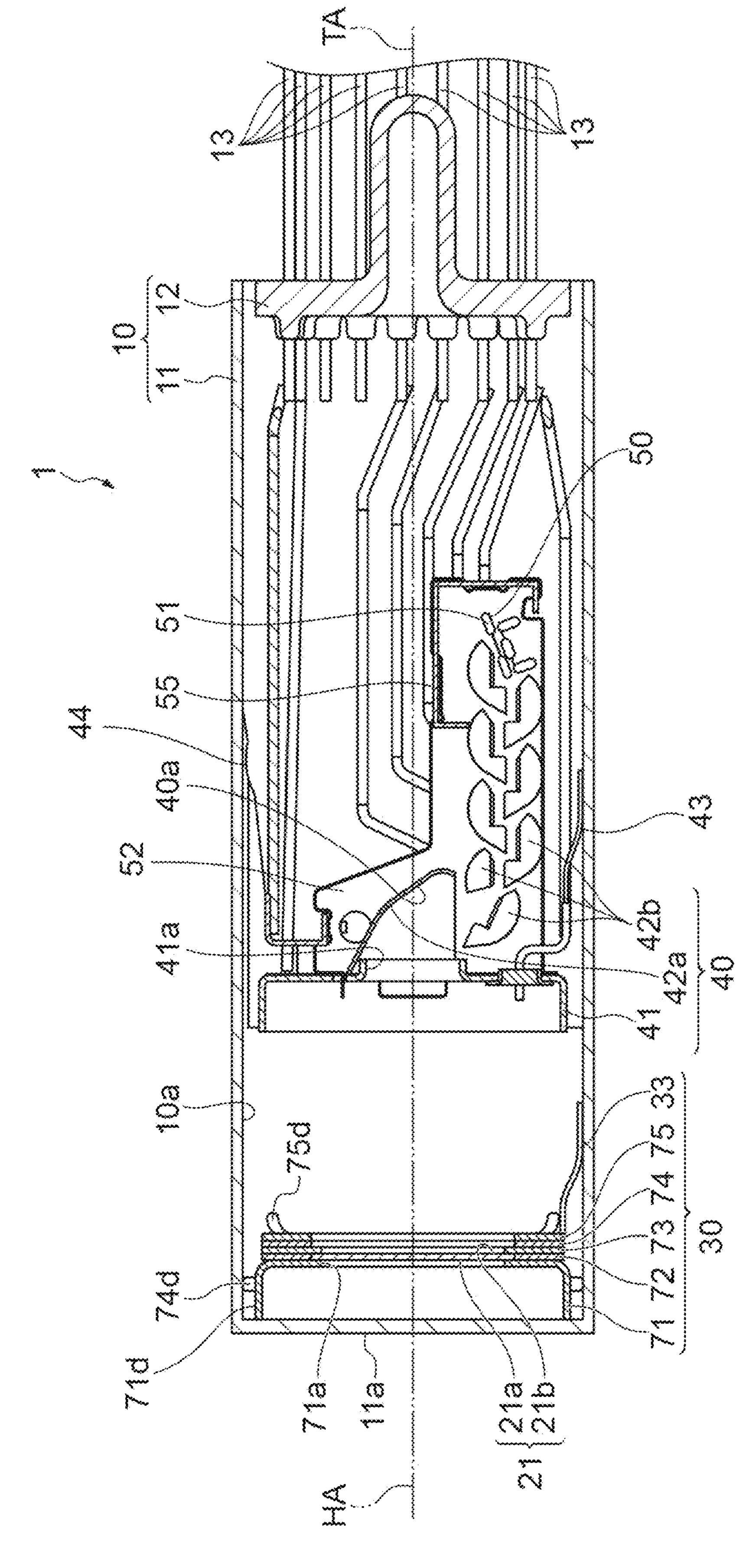
FIG. 5 is a cross-sectional view of the electron tube.

First, a configuration of an electron tube according to an embodiment of the present invention will be described with reference to FIGS. 1 to 5. FIG. 1 is a perspective view of the electron tube according to the embodiment. FIG. 2 is a perspective view of the electron tube. In FIG. 2, an internal structure of the electron tube is also illustrated by a solid line. FIG. 3 is a side view of the electron tube. FIG. 4 is a side view of the electron tube. FIG. 5 is a cross-sectional view of the electron tube.

An electron tube 1 is a photomultiplier tube that outputs an electric signal in response to incidence of an electromagnetic wave. In the present specification, the "electromagnetic wave" incident on the electron tube is an electromagnetic wave included in a frequency band from a so-called millimeter wave to infrared light. When the electromagnetic wave is incident, the electron tube 1 internally emits electron and multiplies the emitted electron. In the embodiment, the electron tube 1 makes the electromagnetic wave be incident on a photoelectric surface and multiplies the electron emitted by external photoelectric effect from the photoelectric surface. The electron tube 1 includes a housing 10, an electron emitter 20, a holder 30, an electron multiplying unit 40 and an electron collecting unit 50.

The housing 10 includes a valve 11 and a stein 12. An inner portion of the housing 10 is airtightly sealed with the valve 11 and the stein 12. In the embodiment, the inner portion of the housing 10 is held in a vacuum. The vacuum includes not only an absolute vacuum but also a state where the housing is filled with gas having a pressure lower than an atmospheric pressure. For example, the inner portion of the housing 10 is held at $1\times10^{-4}$ to $1\times10^{-7}$ Pa. The valve 11 includes a window 11*a* having an electromagnetic wave transparency. In the present specification, the "electromagnetic wave transparency" means a property of transmitting at least a partial frequency band of the incident electromagnetic wave. In the embodiment, the housing 10 has a circular cylindrical shape. The stein 12 configures a bottom surface of the housing 10. The valve 11 configures a side surface of the housing 10 and a bottom surface facing the stein 12.

The window 11*a* configures a bottom surface facing the stein 12. For example, the window 11*a* has a circular shape in plan view. A frequency characteristic of transmittance of the electromagnetic wave is different depending on a material. Therefore, the window 11*a* is configured by an appropriate material depending on a frequency band of the electromagnetic wave entering the electron tube 1. For example, the window 11*a* includes at least one selected from quartz, silicon, germanium, sapphire, zinc selenide, zinc sulfide, magnesium fluoride, lithium fluoride, barium fluoride, calcium fluoride, magnesium oxide, calcium carbonate, and chalcogenide glass. The window 11$a$ configured by the material selected from them enables an electromagnetic wave having an arbitrary frequency band between millimeter wave and infrared light to be guided into the inner portion of the housing 10. For example, the quartz may be selected as a material of a member transmitting an electromagnetic wave having a frequency band of 0.1 to 5 THz, the silicon may be selected for a material of a member transmitting an electromagnetic wave having a frequency band of 0.04 to 11 THz and 46 THz or more, the magnesium fluoride may be selected for a material of a member transmitting an electromagnetic wave having a frequency band of 40 THz or more, the germanium may be selected for a material of a member transmitting an electromagnetic wave having a frequency band of 13 THz or more, and the zinc selenide may be selected for a material of a member transmitting an electromagnetic wave having a frequency band of 14 THz or more.

The electron tube 1 includes a plurality of wires 13 for enabling electrical connection between an outer portion and an inner portion of the housing 10. The plurality of wires 13 is, for example, lead wires or pins. In the embodiment, the plurality of wires 13 is pins penetrating the stein 12 and extend from the inner portion of the housing 10 to the outer portion thereof. At least one of the plurality of wires 13 is connected to various members provided in the inner portion of the housing 10.

The housing 10 has conductive layers 15 and 16 provided in an inner surface 10$a$ of the housing 10. The conductive layers 15 and 16 are spaced away from each other. Potentials different from each other are applied to the conductive layers 15 and 16 from an external portion of the housing 10. The conductive layer 15 has an elliptical shape in plan view. The conductive layer 15 extends along a tube axis TA of the housing 10. The conductive layer 15 extends in a direction from the window 11$a$ toward the stein 12.

The conductive layer 16 is provided around the window 11$a$. The conductive layer 16 surrounds the holder 30 around the tube axis TA along the inner surface 10$a$ of the housing 10. In an extending direction of the conductive layer 15, the conductive layer 16 is provided in an area closer to the window 11$a$ than the conductive layer 15. The conductive layer 16 extends along the tube axis TA of the housing 10 at a position facing the conductive layer 15. Therefore, the conductive layer 16 also includes a portion extending in the direction from the window 11$a$ toward the stein 12. In the embodiment, the shortest distance between the conductive layer 15 and the conductive layer 16 is about 1 mm. The conductive layers 15 and 16 are formed by evaporating a metal on the inner surface 10$a$ of the housing 10. Materials of the conductive layers 15 and 16 include aluminum, for example. When the conductive layer 15 is a first conductive layer, the conductive layer 16 is a second conductive layer.

The electron emitter 20 is disposed in the inner portion of the housing 10 and emits electron in response to the incidence of the electromagnetic wave in the inner portion of the housing 10. The electron emitter 20 includes a substrate 21 and a meta-surface S. The substrate 21 has a principal surface 21$a$ and a principal surface 21$b$ facing each other. In the embodiment, the substrate 21 has a plate shape. For example, when the principal surface 21$a$ configures the second principal surface, the principal surface 21$b$ configures the first principal surface.

The principal surface 21$a$ and the principal surface 21$b$ are disposed in parallel to the window 11$a$. The principal surface 21$a$ faces the window 11$a$. The principal surface 21$a$ includes an incidence surface 22 on which the electromagnetic wave passed through the window 11$a$ is incident. The substrate 21 has an electromagnetic wave transparency for the electromagnetic wave passed through the window 11$a$. Therefore, the substrate 21 transmits at least a part of a frequency band of the electromagnetic wave passed through the window 11$a$. The material of the substrate 21 includes, for example, quartz. The material of the substrate 21 may include, for example, silicon. The substrate 21 has a rectangular shape in plan view. The substrate 21 is spaced away from the window 11$a$ and the electron multiplying unit 40.

The meta-surface S emits the electron in response to the incident of the electromagnetic wave. The meta-surface S is included in an oxide layer or a metal layer patterned on the substrate 21. The material of the oxide layer is, for example, silicon dioxide and titanium oxide. The material of the metal layer is, for example, gold. In the embodiment, the oxide layer is formed on the principal surface 21$b$ of the substrate 21 made of quartz, and the metal layer is formed on the oxide layer. The meta-surface S has a rectangular shape in plan view. In the embodiment, the meta-surface S is provided on the principal surface 21$b$. The meta-surface S may be provided on the principal surface 21$a$.

The holder 30 holds the electron emitter 20 in the inner portion of the housing 10. The holder 30 is positioned to the inner surface 10$a$ of the housing 10. The holder 30 positions the electron emitter 20 for the housing 10. The holder 30 has a frame shape along the inner surface 10$a$ of the housing 10, and a penetration opening 31 is formed in the holder 30. The incidence surface 22 of the electron emitter 20 and the meta-surface S are disposed in an inner side of an edge defining the penetration opening 31 as seen from an orthogonal direction to the principal surfaces 21$a$ and 21$b$ of the electron emitter 20. In a state where the holder 30 is positioned to the housing 10, the tube axis TA of the housing 10 passes the penetration opening 31. The holder 30 is positioned to the housing 10 so that an optical axis (hereinafter, refer to as "axis of holder 30") of the electromagnetic wave passing through the penetration opening 31 is in parallel to the tube axis TA of the housing 10. An axis HA of the holder 30 is orthogonal to the principal surfaces 21$a$ and 21$b$ of the electron emitter 20. The holder 30 is connected to at least one of the plurality of wires 13. In the embodiment, the holder 30 applies a voltage to the electron emitter 20.

The holder 30 has conductive terminals 33 and 34. The conductive terminal 33 and the conductive terminal 34 are spaced away from each other. Potentials different from each other are applied to the conductive terminal 33 and the conductive terminal 34 through the conductive layers 15 and 16. The conductive terminal 33 extends toward the conductive layer 15, and is elastically in contact with the conductive layer 15. Therefore, the conductive terminal 33 is electrically connected to the conductive layer 15. The conductive terminal 34 extends toward the conductive layer 16, and is elastically in contact with the conductive layer 16. Therefore, the conductive terminal 34 is electrically connected to the conductive layer 16. When the conductive terminal 33 is a first conductive terminal, the conductive terminal 34 is a second conductive terminal.

The electron multiplying unit 40 is disposed in the inner portion of the housing 10 and includes an incidence surface 40$a$ on which the electron emitted from the electron emitter 20 is incident. The electron multiplying unit 40 multiplies the electron entering the incidence surface 40$a$. In the embodiment, the principal surface 21$b$ of the electron emitter 20 faces the incidence surface 40$a$ of the electron multiplying unit 40. The meta-surface S faces the incidence surface 40$a$ of the electron multiplying unit 40 and the electron emitted from the meta-surface S enters the incidence surface 40*a*. The principal surface 21*a* of the electron emitter 20 faces the window 11*a* of the housing 10.

In the present specification, "A faces B" means that B is located in a normal direction of A rather than a plane contacting A. In other words, "A faces B" means that, when a space is bisected by a surface contacting A, B is located at the A side, not the back side of A. For example, in the electron tube 1, as described above, the meta-surface S faces the incidence surface 40*a* of the electron multiplying unit 40. This means that the incidence surface 40*a* of the electron multiplying unit 40 is located in a normal direction of the meta-surface S rather than a plane contacting the meta-surface S.

In the embodiment, as illustrated in FIG. 1, the electron multiplying unit 40 includes so-called linear-focused multistage dynodes. In the embodiment, the electron multiplying unit 40 includes a focusing electrode 41 arranged to converge electrons, and a plurality of stages of dynodes 42*a* and 42*b* spaced away from each other. The dynode 42*a* includes the incidence surface 40*a* described above. In the embodiment, the electron multiplying unit 40 includes the ten stages of dynodes 42*a* and 42*b*. Nine stages of dynodes 42*b* are disposed at a rear stage of the dynode 42*a*. In a center portion of the focusing electrode 41, a circular incidence opening 41*a* is provided. The dynodes 42*a* and 42*b* are disposed at a rear stage of the incidence opening 41*a*. One of the plurality of wires 13 is connected to each of the dynodes 42*a* and 42*b*. Predetermined potentials are applied to each of the dynodes 42*a* and 42*b* through the wires 13. The dynodes 42*a* and 42*b* multiply the electron passed through the incidence opening 41*a* according to the applied potentials.

The focusing electrode 41 has conductive terminals 43 and 44 spaced away from each other. Potentials different from each other are applied to the conductive terminal 43 and the conductive terminal 44 through the conductive layers 15 and 16. One of the conductive layer 15 and the conductive layer 16 may be a ground. The conductive terminal 43 extends toward the conductive layer 15 and is elastically in contact with the conductive layer 15. Therefore, the conductive terminal 43 is electrically connected to the conductive layer 15. The conductive terminal 44 extends toward the conductive layer 16 and is elastically in contact with the conductive layer 16. Therefore, the conductive terminal 44 is electrically connected to the conductive layer 16.

The electron collecting unit 50 is disposed in the inner portion of the housing 10 and collects the electrons multiplied by the electron multiplying unit 40. In the embodiment, the electron collecting unit 50 includes a mesh-like anode 51. The anode 51 is located closer to the stein 12 than the principal surface 21*b* of the electron emitter 20. One of the plurality of wires 13 is connected to the anode 51. A predetermined potential is applied to the anode 51 through the wire 13. The anode 51 catches the electrons multiplied by the dynodes 42*a* and 42*b*. The electron collecting unit 50 may include a diode instead of the anode 51.

In the embodiment, the electron tube 1 includes a pair of insulating substrates 52 that secure the dynodes 42*a* and 42*b* and the anode 51 to the inner portion of the housing 10. The pair of insulating substrates 52 is made of alumina. The pair of insulating substrates 52 opposes each other. The dynodes 42*a* and 42*b* include a pair of end portions extending in a direction where the pair of insulating substrates 52 opposes each other. The anode 51 includes a pair of end portions extending in the direction where the pair of insulating substrates 52 opposes each other. The end portions of the dynodes 42*a* and 42*b* and the anode 51 are inserted into slit-like through-holes previously provided in the pair of insulating substrates 52.

The electron tube 1 includes a shielding plate 55 surrounding a part of the dynodes 42*a* and 42*b* and the anode 51. The shielding plate 55 prevents light and ions generated by the collision of the electrons multiplied by the dynodes 42*a* and 42*b* from being scattered in the inner portion of the housing 10. The shielding plate 55 is connected to one of the plurality of wires 13. A predetermined potential is applied to the shielding plate 55 through the wire 13.

Figure 6:
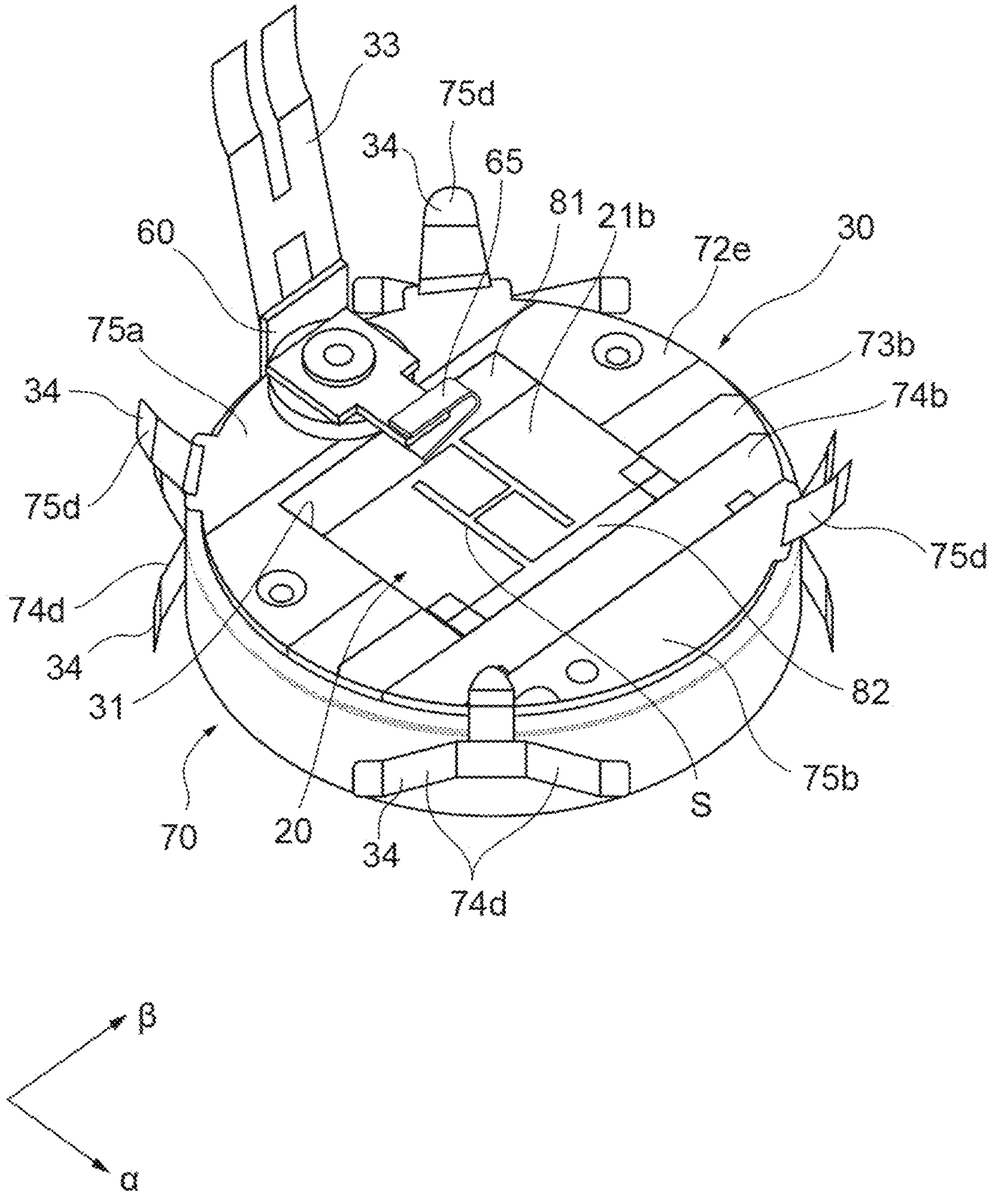
FIG. 6 is a perspective view of a holder.
Figure 7:
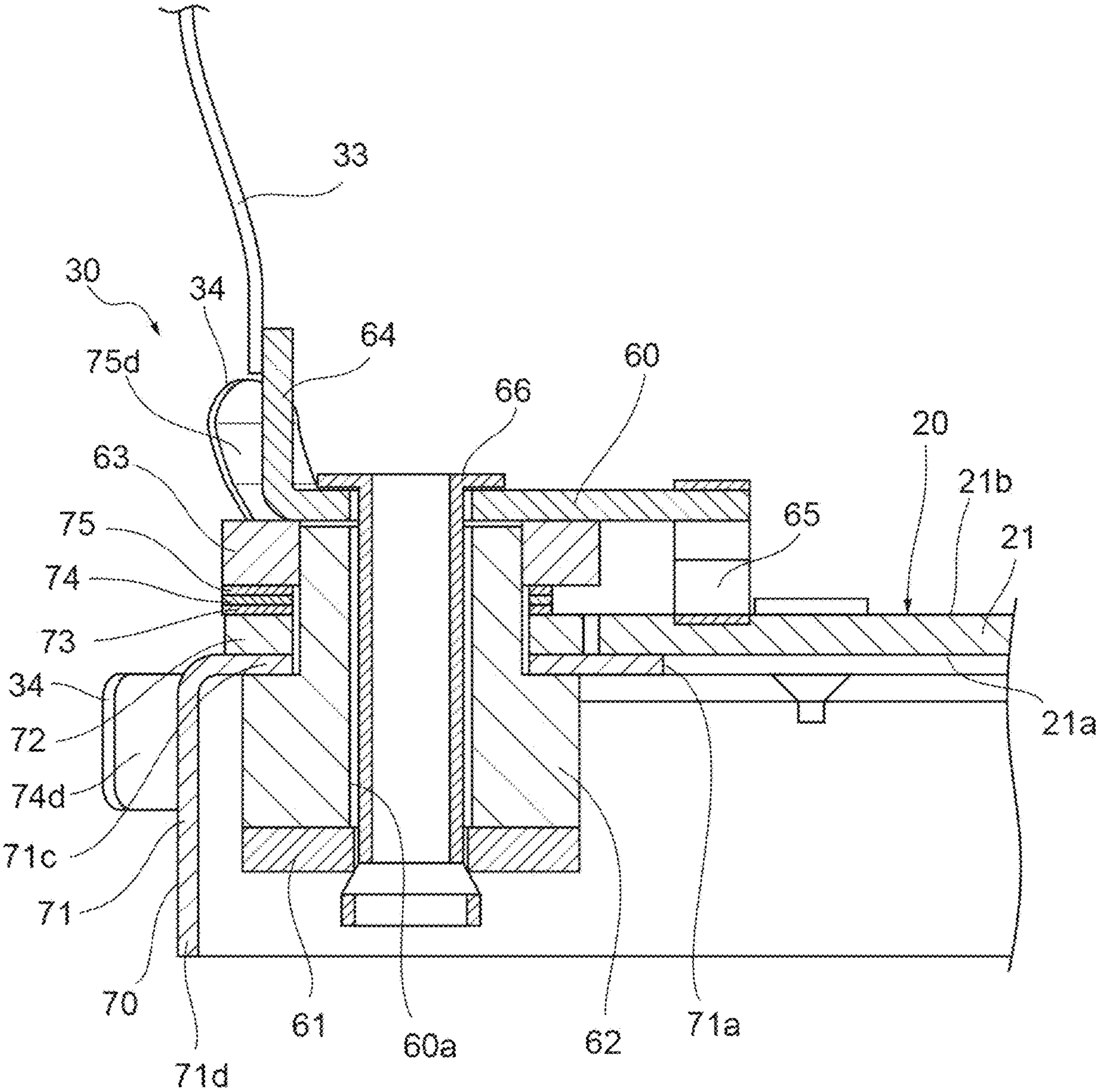
FIG. 7 is a partially cross-sectional view of the holder.
Figure 8:
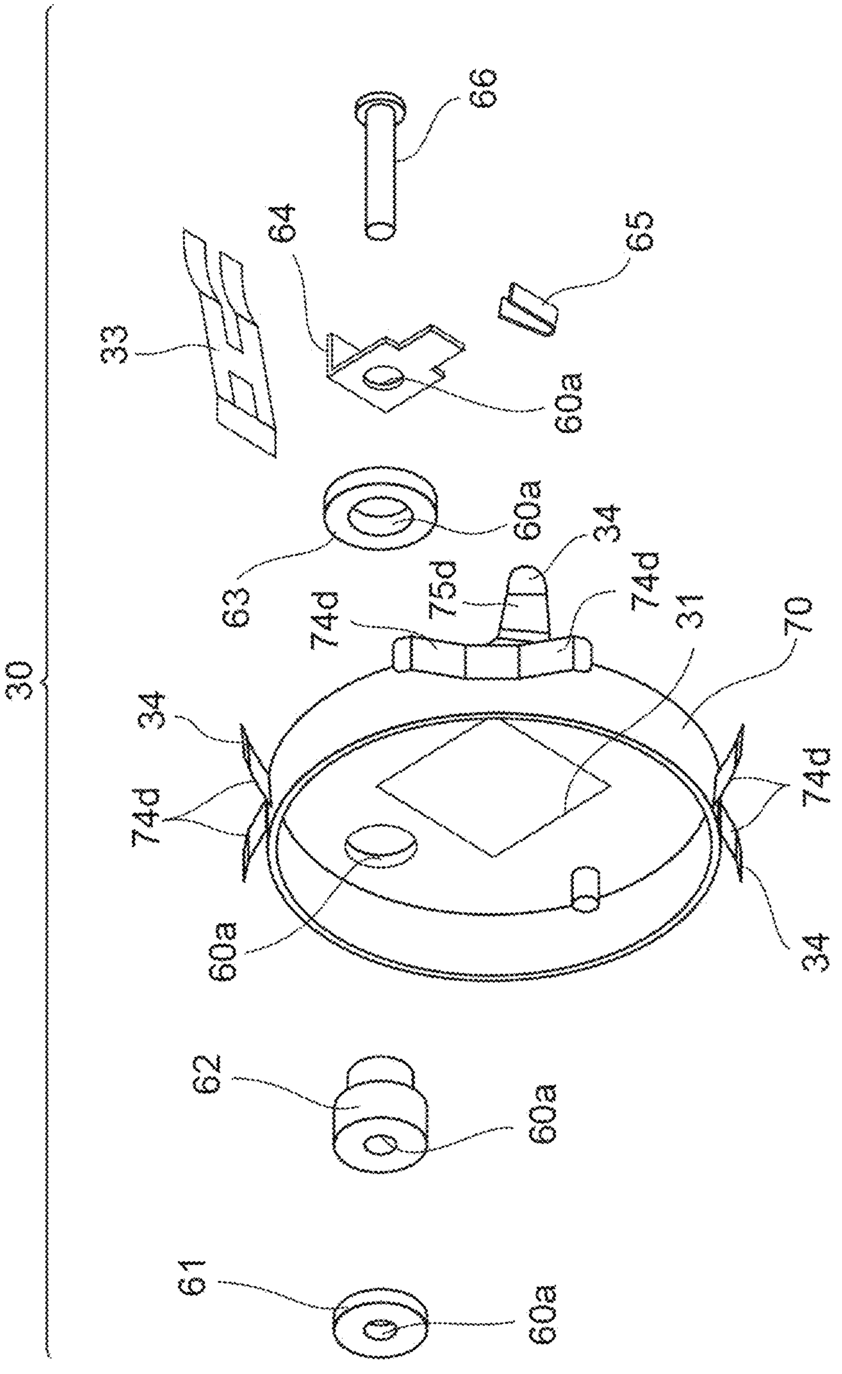
FIG. 8 is an exploded view of the holder.
Figure 9:
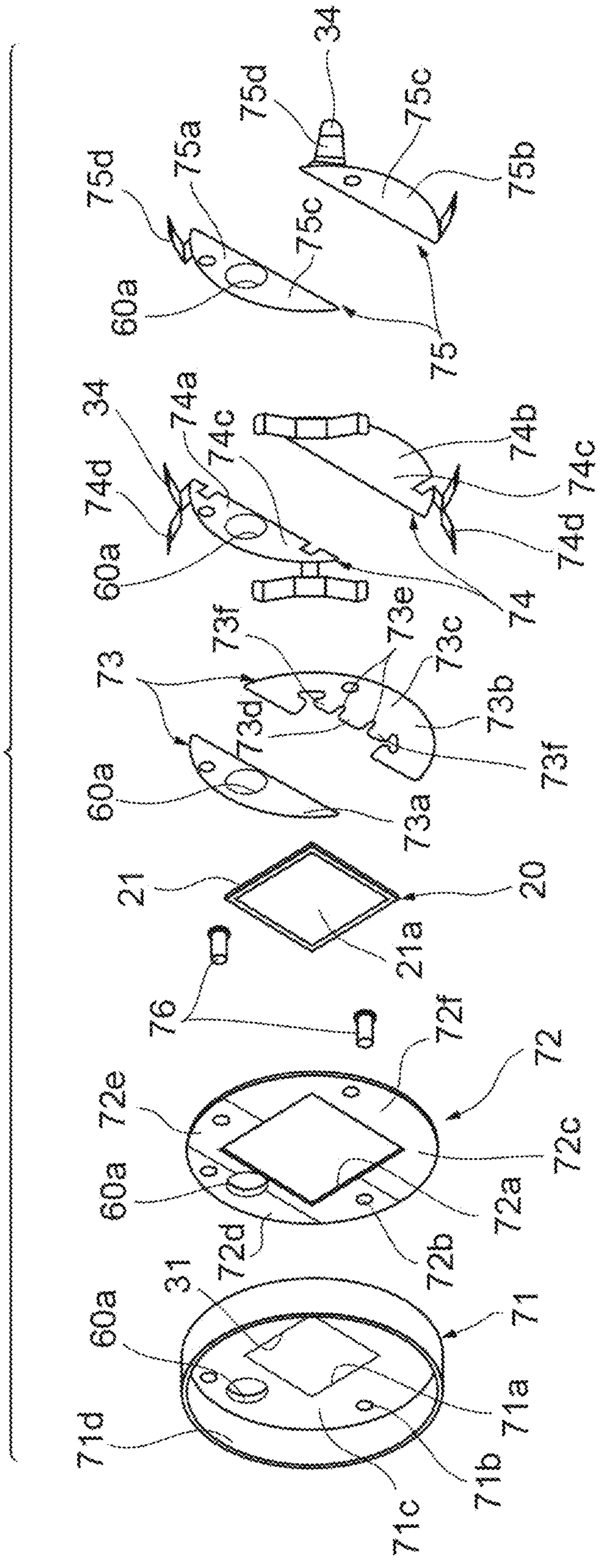
FIG. 9 is an exploded view of a holding body.
Figure 10:
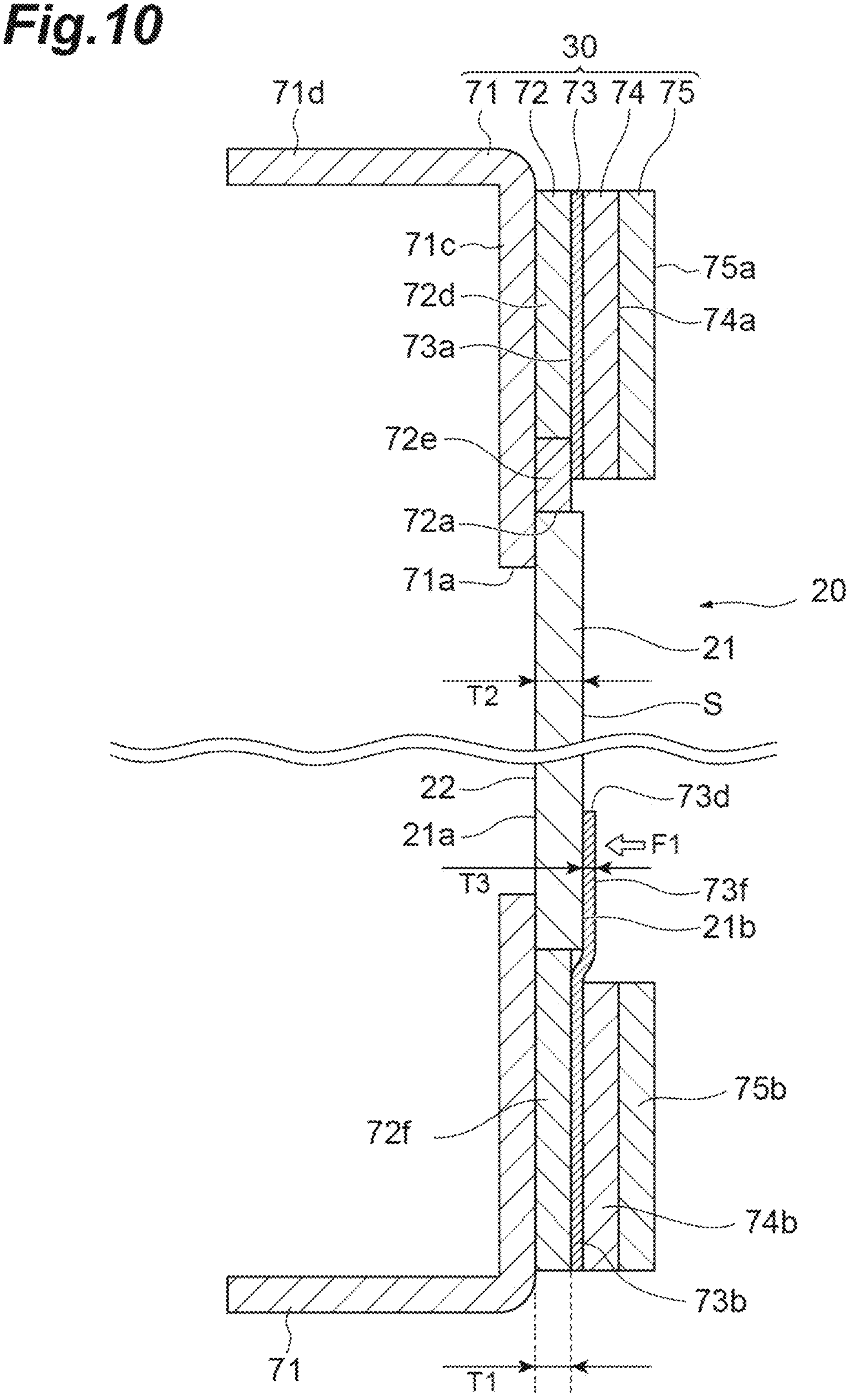
FIG. 10 is a cross-sectional view illustrating a state where the holder holds an electron emitter.

Next, a configuration of the holder 30 will be described in detail with reference to FIGS. 5 to 10. FIG. 6 is a perspective view of the holder 30. FIG. 7 is a partially cross-sectional view of the holder 30. FIG. 8 is an exploded view of the holder 30. FIG. 9 is an exploded view further exploding a part of the holder 30. FIG. 10 is an enlarged end view illustrating a state where the holder 30 holds the electron emitter.

The holder 30 has a contact member 60 and a holding body 70. The contact member 60 engages with the holding body 70. The holding body 70 has the penetration opening 31 described above. The principal surface 21*a* and the principal surface 21*b* of the electron emitter 20 are exposed from the penetration opening 31. The meta-surface S is exposed from the penetration opening 31.

As illustrated in FIG. 8, the contact member 60 includes the conductive terminal 33 described above, a washer 61, an insulating body 62, an insulating body 63, an attaching board 64, a contact electrode 65, and a post electrode 66. The conductive terminal 33 has a long plate shape. One end of the conductive terminal 33 is connected to the attaching board 64, and the other end of the conductive terminal 33 is elastically in contact with the conductive layer 15 described above.

In a state where the holder 30 is positioned in the housing 10, the washer 61, the insulating body 62, the holding body 70, the insulating body 63 and the attaching board 64 are disposed in this order from the window 11*a* side. The holding body 70 is located between the insulating body 62 and the insulating body 63. Each of the washer 61, the insulating body 62, the insulating body 63, the attaching board 64, and the holding body 70 has a through-hole 60*a*. The post electrode 66 is inserted into the through-hole 60*a* of each of the conductive terminal 33, the washer 61, the insulating body 62, the insulating body 63, the attaching board 64 and the holding body 70. The contact member 60 is fixed to the holding body 70 by the post electrode 66.

Each of the insulating bodies 62 and 63 has an insulation property. Each of the conductive terminal 33, the washer 61, the attaching board 64, the contact electrode 65, and the post electrode 66 has electrical conductivity. A material of the insulating bodies 62 and 63 includes, for example, ceramic. A material of the washer 61 and the attaching board 64 includes, for example, stainless steel. A material of the conductive terminal 33 and the contact electrode 65 includes, for example, stainless steel. A material of the post electrode 66 includes, for example, nickel.

The conductive terminal 33 is insulated from the holding body 70 at least when the electron tube 1 does not operate. The conductive terminal 33 is electrically connected to the contact electrode 65. The contact electrode 65 is electrically connected to the electron emitter 20. The conductive terminal 33 is electrically connected to the electron emitter 20 through the contact electrode 65. The contact electrode 65 is spaced away from the holding body 70.

The holding body 70 includes a base member 71, a frame member 72, an intermediate member 73, a first positioning member 74, a second positioning member 75 and a pin electrode 76. In a state where the holder 30 is positioned in the housing 10, the base member 71, the frame member 72, the intermediate member 73, the first positioning member 74 and the second positioning member 75 are disposed in this order from the window 11*a* side. The holding body 70 is in contact with the electron emitter 20. The contact member 60 engages with the first positioning member 74 and the base member 71. The base member 71, the frame member 72, the intermediate member 73, the first positioning member 74 and the second positioning member 75 are welded each other in a state where they hold the electron emitter 20.

The base member 71 has a flat plate portion 71*c* on which an opening 71*a* and a through-hole 71*b* are formed. The base member 71 is in contact with the principal surface 21*a* of the electron emitter 20 on the flat plate portion 71*c*. The opening 71*a* forms the penetration opening 31 of the holding body 70. The base member 71 is in contact with the principal surface 21*a* of the electron emitter 20 on an edge portion defining the opening 71*a*. The incidence surface 22 of the electron emitter 20 is exposed from the opening 71*a*. The opening 71*a* has a rectangular shape or a circular shape. In the embodiment, the opening 71*a* has a rectangular shape. A pin electrode 76 is inserted into the through-hole 71*b*.

In the embodiment, as illustrated in FIG. 5, the base member 71 has a U-shaped form in a cross section passing the axis HA of the holder 30. The base member 71 further has a frame portion 71*d* extending to an opposite side to the frame member 72 from a peripheral edge of the flat plate portion 71*c* in a direction of the axis HA of the holder 30.

The frame member 72 is located between the base member 71 and the intermediate member 73. The frame member 72 has a flat plate portion 72*c* on which an opening 72*a* and a through-hole 72*b* are formed. The opening 72*a* forms the penetration opening 31 of the holder 30. The opening 72*a* of the frame member 72 has a shape along an edge of the electron emitter 20. The frame member 72 surrounds the edge of the electron emitter 20. An edge of the opening 72*a* is in contact with the edge of the electron emitter 20. The frame member 72 restricts movement of the electron emitter 20 in a direction orthogonal to the principal surfaces 21*a* and 21*b* by the edge of the opening 72*a*. The opening 72*a* has a rectangular shape or a circular shape. In the embodiment, the opening 72*a* has a rectangular shape.

The frame member 72 positions the electron emitter 20 for the holder 30 in the direction orthogonal to the axis HA of the holder 30. A thickness T1 of the frame member 72 is equal to or less than a thickness T2 of the electron emitter 20. In the embodiment, the thickness T1 of the frame member 72 is smaller than the thickness T2 of the electron emitter 20.

The frame member 72 includes a first conductive portion 72*d*, an insulating portion 72*e* and a second conductive portion 72*f*. The insulating portion 72*e* is located between the first conductive portion 72*d* and the second conductive portion 72*f*. The opening 72*a* of the frame member 72 is defined by the insulating portion 72*e* and the second conductive portion 72*f*. The second conductive portion 72*f* and the insulating portion 72*e* are in contact with the electron emitter 20, however, the first conductive portion 72*d* is not in contact with the electron emitter 20. The through-hole 72*b* is formed in the insulating portion 72*e*. The pin electrode 76 is inserted into the through-hole 72*b*. The insulating portion 72*e* is fixed to the base member 71 by the pin electrode 76.

The intermediate member 73 includes a spacer 73*a* and a fixed portion 73*b*. The spacer 73*a* and the fixed portion 73*b* are spaced away from each other. The spacer 73*a* has a flat plate shape, and has the same thickness as the fixed portion 73*b*. The spacer 73*a* is in contact with the first conductive portion 72*d*. The first conductive portion 72*d* is sandwiched between the spacer 73*a* and the base member 71. The fixed portion 73*b* has a flat plate portion 73*c* and a plurality of energizing portions 73*d*. In the embodiment, the flat plate portion 73*c* and the plurality of energizing portions 73*d* are integrally formed. The flat plate portion 73*c* is in contact with the second conductive portion 72*f*, and each of the energizing portions 73*d* is in contact with the electron emitter 20. The second conductive portion 72*f* is sandwiched between the flat plate portion 73*c* and the base member 71. An edge of the spacer 73*a* and an edge of the fixed portion 73*b* form the penetration opening 31 of the holder 30.

Each of the energizing portions 73*d* has a plate shape, and functions as a plate spring energizing the electron emitter 20 to the base member 71. Therefore, the intermediate member 73 functions as an energizing member energizing the electron emitter 20 to the base member 71. Each of the energizing portions 73*d* is integrally formed flush with the flat plate portion 73*c* in a state before being in contact with the electron emitter 20. Each of the energizing portions 73*d* protrudes in a direction orthogonal to the axis HA of the holder 30 from the flat plate portion 73*c* toward the axis HA. In other words, each of the energizing portions 73*d* extends closer to the center of the penetration opening 31 from the flat plate portion 73*c*.

Each of the energizing portions 73*d* is in contact with the edge of the principal surface 21*b* and elastically energizes the electron emitter 20 to the flat plate portion 71*c* of the base member 71 by applying an energizing force F1 to the edge. Each of the energizing portions 73*d* is electrically connected to the principal surface 21*b*. That is, the holder 30 is electrically connected to the principal surface 21*b* through the plurality of energizing portions 73*d*. The electron emitter 20 is electrically connected through the plurality of energizing portions 73*d* to the wires 13 connected to the holder 30.

Each of the energizing portions 73*d* is in contact with the edge of the principal surface 21*b* of the electron emitter 20 to elastically deform and apply the energizing force F1 to the principal surface 21*b* of the electron emitter 20 as illustrated in FIG. 10. A thickness T3 of each of the energizing portions 73*d* is smaller than the thickness T2 of the electron emitter 20. The thickness T3 of each of the energizing portions 73*d* is smaller than the thickness T1 of the frame member 72. The thickness of the flat plate portion 73*c* is equal to the thickness T3 of each of the energizing portions 73*d*. The term "equal" includes a manufacturing tolerance range.

In the embodiment, the plurality of energizing portions 73*d* has a shape in which a plurality of notch-shaped clearances 73*e* is provided in an edge of the fixed portion 73*b* in a direction orthogonal to the axis HA of the holder 30. Each of the energizing portions 73*d* is divided into a plurality of piece portions 73*f* by the clearance 73*e*. Each of the plurality of piece portions 73*f* is a metal piece elastically energizing the electron emitter 20 to the base member 71. In the embodiment, each of the energizing portions 73*d* is divided into three piece portions 73*f* having a rectangular shape in plan view. Each of the energizing portions 73*d* may be divided into two sections or may be divided into four or more sections.

The first positioning member 74 and the second positioning member 75 position the holder 30 for the housing 10 in the inner portion of the housing 10. The first positioning member 74 includes a first positioning member 74*a* and a first positioning member 74*b* which are spaced away from each other. Each of the first positioning members 74*a* and 74*b* has a flat plate portion 74*c* and a plurality of springs 74*d*. The flat plate portion 74*c* and the plurality of springs 74*d* are integrally formed. The plurality of springs 74*d* includes at least one of the conductive terminals 33 and 34. In the embodiment, the plurality of springs 74*d* is included in the conductive terminal 34.

The flat plate portion 74*c* of each of the first positioning members 74*a* and 74*b* forms the penetration opening 31 of the holder 30. The flat plate portion 74*c* of the first positioning member 74*a* is in contact with the spacer 73*a*. The flat plate portion 74*c* of the first positioning member 74*b* is in contact with the flat plate portion 73*c* of the fixed portion 73*b*.

The plurality of springs 74*d* extends in directions different from each other. In the embodiment, the plurality of springs 74*d* is disposed in a peripheral direction of the holder 30 so as to be rotationally symmetrical as seen from the direction of the axis HA of the holder 30. In the embodiment, the plurality of springs 74*d* is disposed at equal intervals in a circumferential direction of the tube axis TA along the inner surface 10*a* of the housing 10. In the embodiment, each of the first positioning members 74*a* and 74*b* has two springs 74*d*.

The second positioning member 75 includes a second positioning member 75*a* and a second positioning member 75*b* which are spaced away from each other. Each of the second positioning members 75*a* and 75*b* has a flat plate portion 75*c* and a plurality of springs 75*d*. The flat plate portion 75*c* and the plurality of springs 75*d* are integrally formed. The plurality of springs 75*d* includes at least one of the conductive terminal 33 and the conductive terminal 34. In the embodiment, the plurality of springs 75*d* is included in the conductive terminal 34.

An edge of the flat plate portion 75*c* of each of the second positioning members 75*a* and 75*b* forms the penetration opening 31 of the holder 30. The flat plate portion 75*c* of the second positioning member 75*a* is in contact with the flat plate portion 74*c* of the first positioning member 74*a*. The flat plate portion 75*c* of the second positioning member 75*b* is in contact with the flat plate portion 74*c* of the first positioning member 74*b*.

The plurality of springs 75*d* extends in directions different from each other. In the embodiment, the plurality of springs 75*d* is disposed in a peripheral direction of the holder 30 so as to be rotationally symmetrical as seen from the direction of the axis HA of the holder 30. The plurality of springs 75*d* is disposed at equal intervals in a circumferential direction of the tube axis TA along the inner surface 10*a* of the housing 10. Each of the springs 75*d* extends in a direction getting away from the window 11*a*. In the embodiment, each of the second positioning members 75*a* and 75*b* has two springs 75*d*.

The base member 71, the first conductive portion 72*d* and the second conductive portion 72*f* of the frame member 72, the intermediate member 73, the first positioning member 74 and the second positioning member 75 have electrical conductivity. The insulating portion 72*e* of the frame member 72 has an insulation property. A material of the base member 71, the first positioning member 74 and the second positioning member 75 includes, for example, stainless steel. A material of the first conductive portion 72*d* and the second conductive portion 72*f* of the frame member 72, and the intermediate member 73 includes, for example, stainless steel. A material of the pin electrode 76 includes, for example, nickel.

Figure 11:
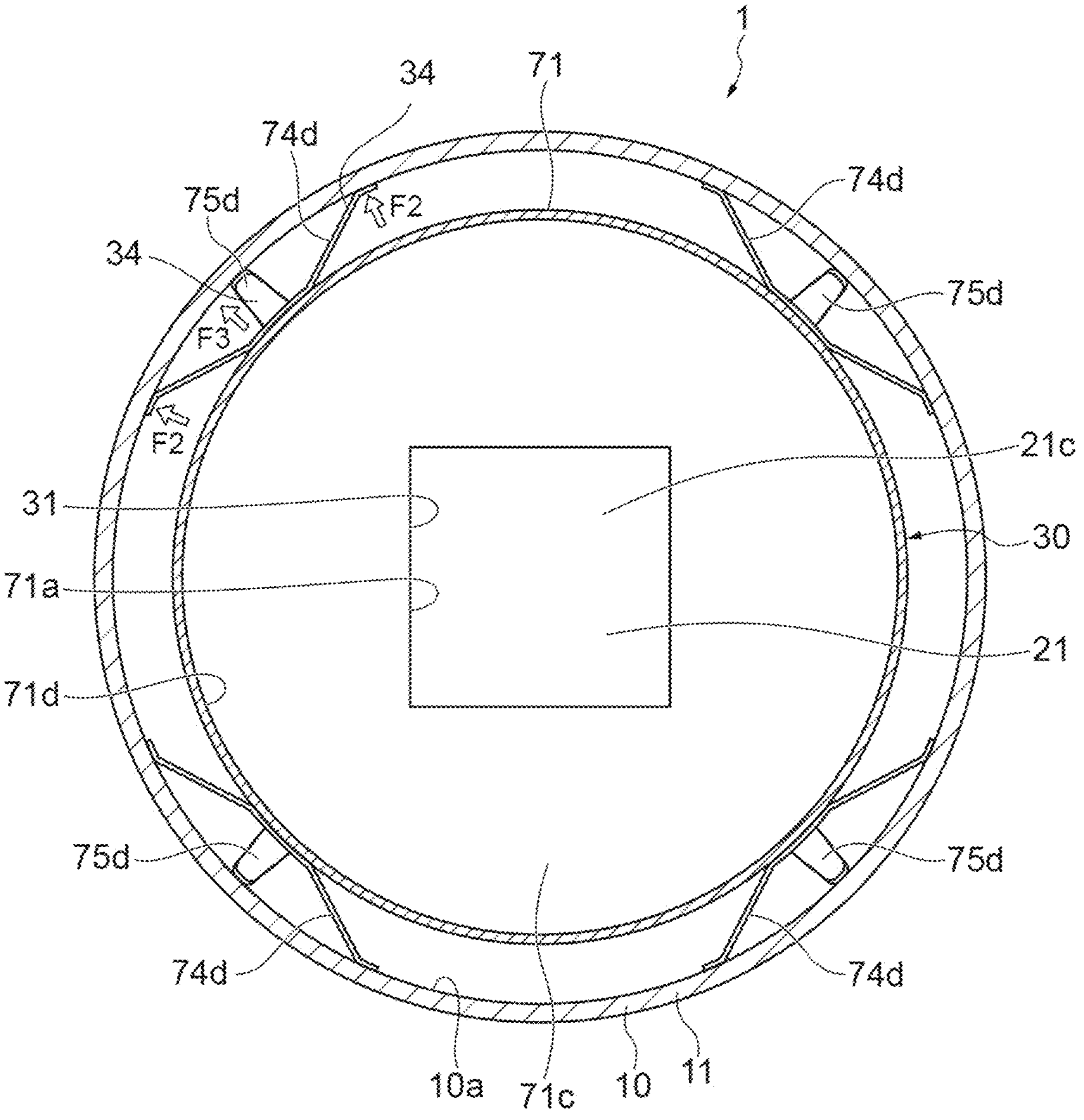
FIG. 11 is a view illustrating a state where the holder is positioned in the housing.
Figure 12:
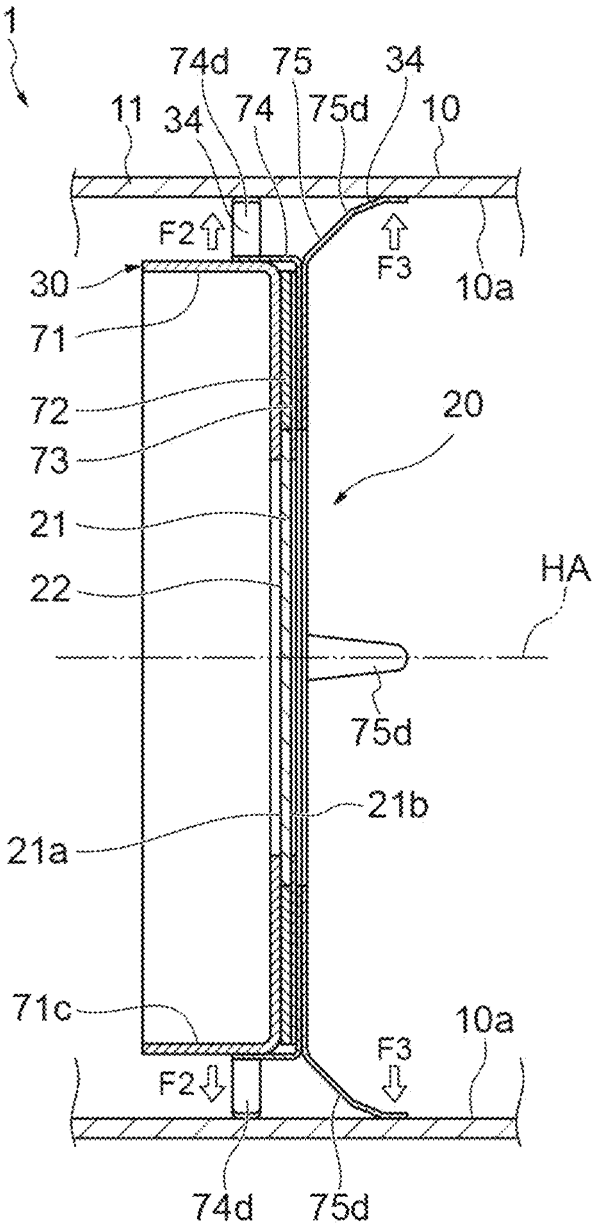
FIG. 12 is a view illustrating a state where the holder is positioned in the housing.

Next, a configuration of the first positioning member 74 and the second positioning member 75 will be described in more detail with reference to FIGS. 11 and 12. FIGS. 11 and 12 are views illustrating a state where the holder 30 is positioned in the housing 10.

The first positioning member 74 and the second positioning member 75 position the holder 30 for the housing 10 by the plurality of springs 74*d* and the plurality of springs 75*d*. Each of the springs 74*d* is disposed closer to the window 11*a* than the plurality of springs 75*d* as seen from the direction orthogonal to the axis HA of the holder 30. Each of the springs 74*d* of the first positioning member 74 extends in the direction of the axis HA of the holder 30 and the direction orthogonal to the axis HA. Leading ends of the plurality of springs 74*d* are elastically in contact with the conductive layer 16. Each of the springs 74*d* electrically connects the conductive layer 16 and the holder 30, as the conductive terminal 34.

Each of the springs 74*d* has a T-shaped form, and the leading end thereof is divided into two. The leading end of each of the springs 74*d* is divided into directions facing each other in the peripheral direction of the holder 30 as seen from the direction of the axis HA of the holder 30. Each of the springs 74*d* applies an energizing force F2 to the inner surface 10*a* of the housing 10 by the two leading ends of the spring 74*d*. Each of the springs 74*d* elastically holds a position of the holder 30 in the inner portion of the housing 10 in a direction orthogonal to the tube axis TA of the housing 10. In other words, the plurality of springs 74*d* positions the holder 30 for the housing 10 by applying the energizing force to the inner surface 10*a* of the housing 10.

Each of the springs 75*d* of the second positioning member 75 extends in the direction of the axis HA of the holder 30 and the direction orthogonal to the axis HA. Each of the springs 75*d* applies an energizing force F3 to the inner surface 10*a* of the housing 10 by the leading end of the spring 75*d*. The second positioning member 75 prevents the holder 30 from moving in the direction of the tube axis TA of the housing 10 by a frictional force between the plurality of springs 75*d* and the inner surface 10*a* of the housing 10. In other words, the plurality of springs 75*d* positions the holder 30 for the housing 10 by applying the energizing force to the inner surface 10*a* of the housing 10. The leading end of each of the springs 75*d* is elastically in contact with the conductive layer 16. Each of the springs 75*d* electrically connects the conductive layer 16 and the holder 30, as the conductive terminal 34.

Figure 13A:
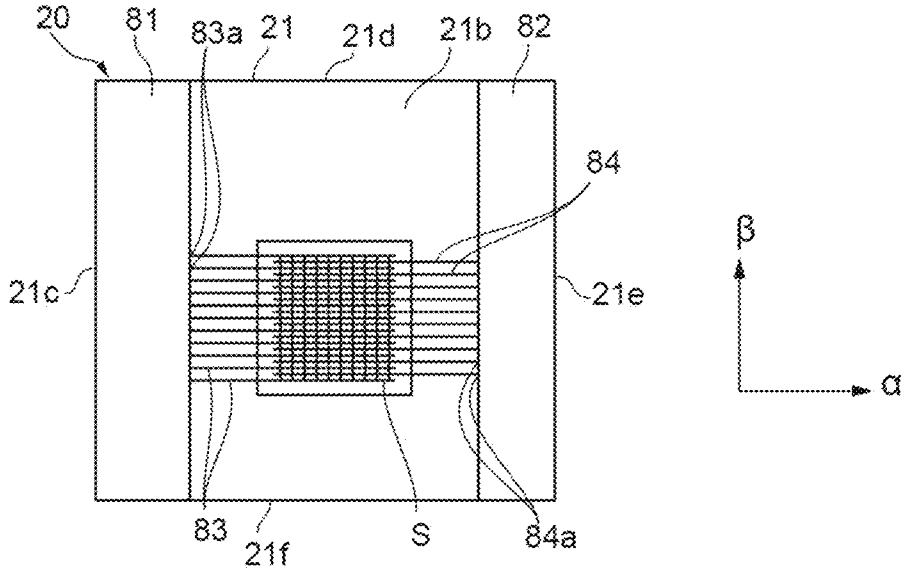
FIG. 13A is a plan view of the electron emitter in the embodiment.
Figure 13B:
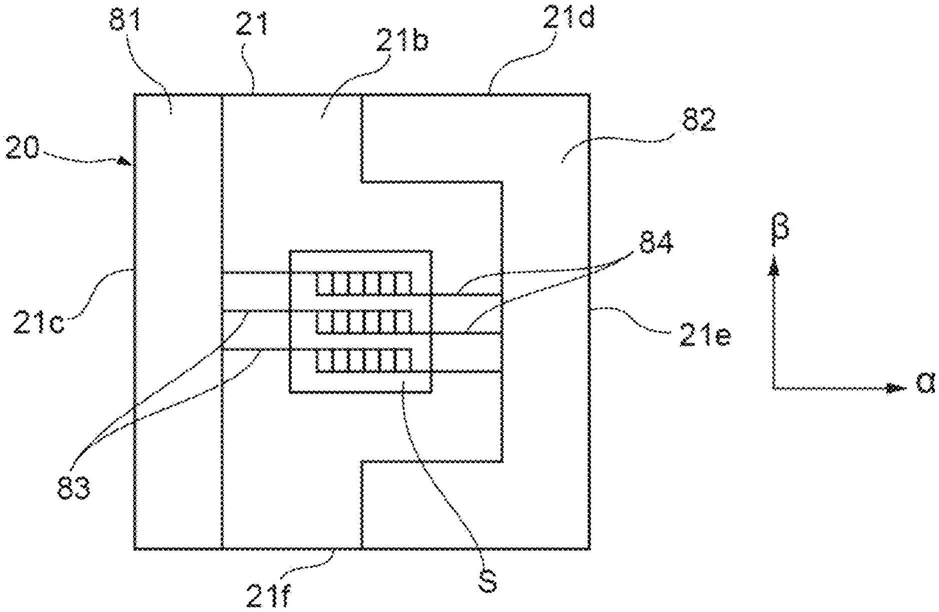
FIGS. 13B and 13C are plan views of an electron emitter in a modification of the embodiment.
Figure 13C:
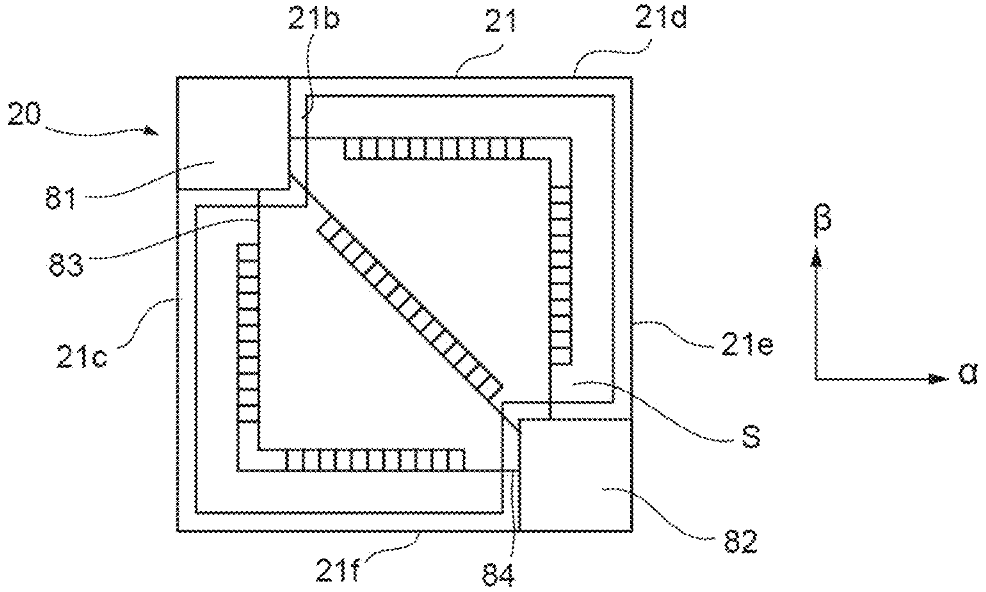
Figure 14:
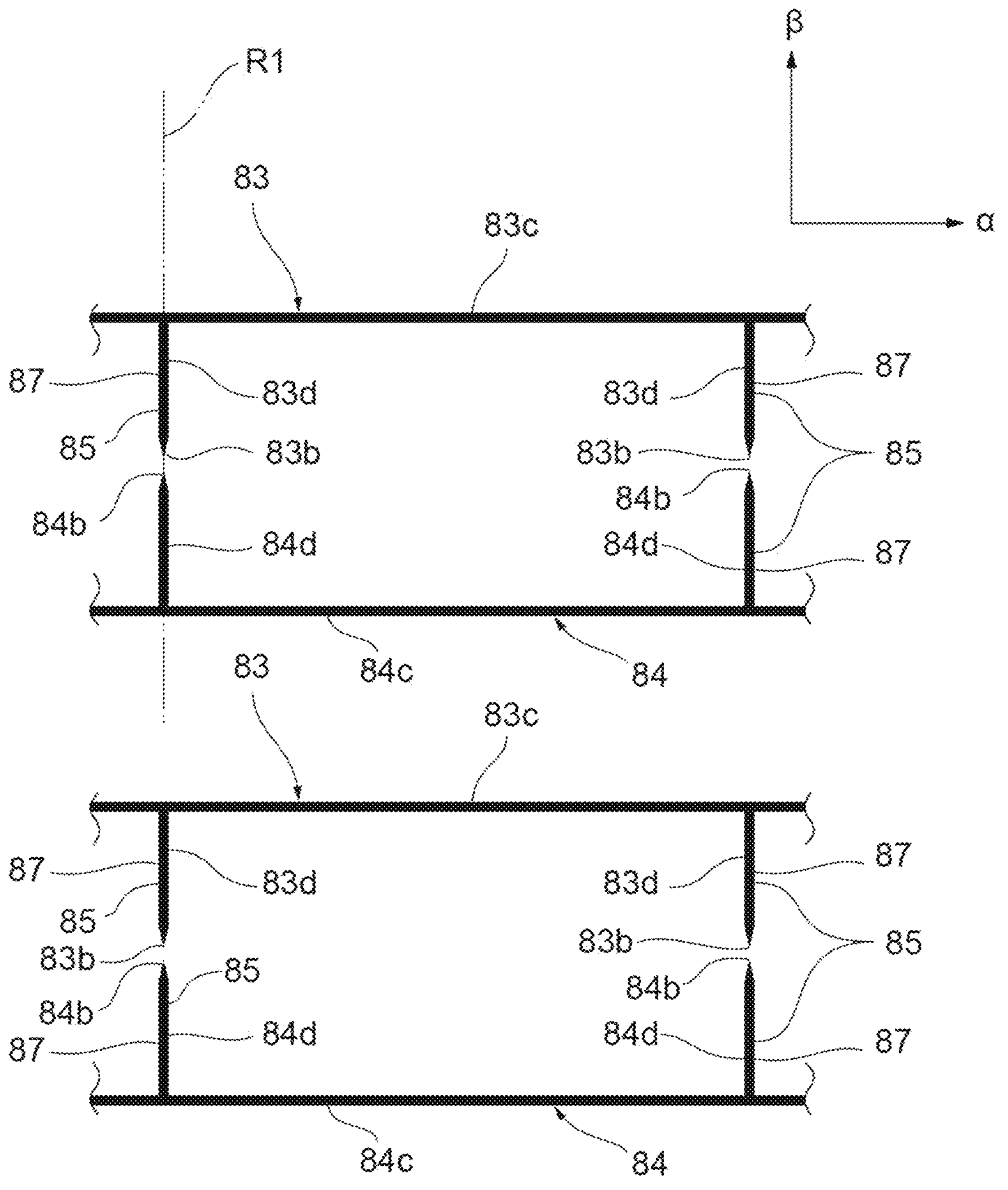
FIG. 14 is a view illustrating a structure of a conductive line.

Next, a configuration of the electron emitter 20 will be described in detail with reference to FIGS. 12 to 14. FIG. 13A is a plan view of an electron emitter. FIGS. 13B and 13C are plan views of an electron emitter in a modification of the embodiment. FIG. 14 is a view illustrating a configuration of a conductive line.

The principal surface 21*a* and the principal surface 21*b* of the substrate 21 have a rectangular shape. The principal surface 21*b* is defined by four edges 21*c*, 21*d*, 21*e* and 21*f*. The edge 21*c* and the edge 21*e* face each other, and the edge 21*d* and the edge 21*f* face each other.

The electron emitter 20 has, in addition to the meta-surface S, a first electrode 81 and a second electrode 82 which are electrically connected to the meta-surface S. The first electrode 81 and the second electrode 82 are spaced away from each other. When the electron tube 1 operates, potentials different from each other are applied to the first electrode 81 and the second electrode 82. One of the first electrode 81 and the second electrode 82 may be arranged to be connected to the ground. The first electrode 81 and the second electrode 82 are insulated at least when the electron tube 1 does not operate.

As illustrated in FIG. 6, in the embodiment, the meta-surface S and at least a part of the first and second electrode 81, 82 are exposed from the penetration opening 31 of the holding body 70. The first electrode 81 is electrically connected to the conductive terminal 33. The second electrode 82 is electrically connected to the conductive terminal 34. One of the first electrode 81 and the second electrode 82 is in contact with the contact electrode 65. In the embodiment, the contact electrode 65 is elastically in contact with the first electrode 81. Therefore, the contact electrode 65 is electrically connected to the first electrode 81. The energizing portion 73*d* is elastically in contact with the second electrode 82. Therefore, the energizing portion 73*d* is electrically connected to the second electrode 82.

As illustrated in FIG. 13A, in the embodiment, the first electrode 81 and the second electrode 82 are provided so as to face each other in the principal surface 21*b* of the substrate 21. In the embodiment, each of the first electrode 81 and the second electrode 82 has a rectangular shape as seen from a direction orthogonal to the principal surface 21*b*. An edge of the first electrode 81 fully overlaps an entire edge 21*c*, a part of the edge 21*d* and a part of the edge 21*f* as seen from a direction orthogonal to the principal surface 21*b*. An edge of the second electrode 82 fully overlaps an entire edge 21*e*, a part of the edge 21*d* and a part of the edge 21*f* as seen from a direction orthogonal to the principal surface 21*b*.

The meta-surface S is of an active type, and an electron emission is controlled by applying potentials different from each other to the first electrode 81 and the second electrode 82 when the electromagnetic wave is incident on the meta-surface S. The meta-surface S is provided in the center of the principal surface 21*b*. In the embodiment, the meta-surface S is disposed between the first electrode 81 and the second electrode 82 in the principal surface 21*b*. In the embodiment, the first electrode 81, the meta-surface S and the second electrode 82 are disposed in this order in a first direction α.

The meta-surface S includes a plurality of first conductive lines 83 and a plurality of second conductive lines 84. The first conductive lines 83 and the second conductive lines 84 are spaced away from each other. Each of the first conductive lines 83 is electrically connected to the first electrode 81, and extends from the first electrode 81 toward the second electrode 82. In the embodiment, each of the first conductive lines 83 extends in the first direction α in which the edge 21*c* and the edge 21*e* face each other. Each of the second conductive lines 84 is electrically connected to the second electrode 82, and extends from the second electrode 82 toward the first electrode 81. In the embodiment, each of the second conductive lines 84 extends in the first direction a in which the edge 21*e* and the edge 21*c* face each other.

The shapes of the first electrode 81 and the second electrode 82 are not limited to the rectangular configuration illustrated in FIG. 13A as long as they are spaced away from each other. For example, the first electrode 81 and the second electrode 82 may be configured as shown in FIGS. 13B and 13C. In the configuration illustrated in FIG. 13B, the second electrode 82 extends toward the edge 21*c* along the edge 21*d*, and extends toward the edge 21*c* along the edge 21*f*. The second electrode 82 is spaced away from the edge 21*c*. In the configuration illustrated in FIG. 13B, the edge of the second electrode 82 fully overlaps a part of the edge 21*d*, an entire edge 21*e* and a part of the edge 21*f* as seen from a direction orthogonal to the principal surface 21*b*.

In the configuration illustrated in FIG. 13C, the edge of the first electrode 81 fully overlaps only a part of the edge 21*c* and a part of the edge 21*d* as seen from a direction orthogonal to the principal surface 21*b*. In the structure illustrated in FIG. 13C, the edge of the second electrode 82 fully overlaps only a part of the edge 21*e* and a part of the edge 21*f* as seen from a direction orthogonal to the principal surface 21*b*. In the configuration illustrated in FIG. 13C, each of the first electrode 81 and the second electrode 82 has a square shape as seen from a direction orthogonal to the principal surface 21*b*. In the configuration illustrated in FIG. 13C, the plurality of first conductive lines 83 and the second conductive lines 84 corresponding to the first conductive lines 83 extend in the first direction α, the second direction β and a direction intersecting both of the first direction α and the second direction β. When the electron emitter 20 illustrated in FIG. 13C is employed, the configuration of the holder 30 may be modified from the configuration illustrated in FIG. 6 so that the contact electrode 65 is in contact with the first electrode 81.

FIG. 14 is a partially enlarged view of the first conductive line 83 and the second conductive line 84 in the meta-surface S in the embodiment. Each of the first conductive lines 83 extends from the first electrode 81 toward the corresponding second conductive line 84. Each of the second conductive lines 84 extends from the second electrode 82 toward the corresponding first conductive line 83. Each of the first conductive lines 83 includes a first end portion 83*a* and a plurality of second end portions 83*b*. As illustrated in FIG. 13A, the first end portion 83*a* is in contact with the first electrode 81. In other words, the first end portion 83*a* is directly coupled to the first electrode 81. Each of the second end portions 83*b* is electrically connected to the first end portion 83*a*. Each of the second conductive lines 84 includes a third end portion 84*a* and a plurality of fourth end portions 84*b*. The third end portion 84*a* is in contact with the second electrode 82. In other words, the third end portion 84*a* is directly coupled to the second electrode 82. The fourth end portion 84*b* is electrically connected to the third end portion 84*a*. The first conductive line 83 extends in the first direction α from the first end portion 83*a*, and branches at the meta-surface S, thereby forming the plurality of second end portions 83*b*. The second conductive line 84 extends in the first direction α from the third end portion 84*a* and branches at the meta-surface S, thereby forming the plurality of fourth end portions 84*b*. The first end portion 83*a* may be indirectly connected to the first electrode 81. The third end portion 84*a* may be indirectly connected to the second electrode 82.

As illustrated in FIG. 14, the second end portion 83*b* and the fourth end portion 84*b* corresponding to the second end portion 83*b* face each other and are adjacent to each other. One fourth end portion 84*b* is disposed adjacent to one second end portion 83*b*. The second end portion 83*b* is disposed closer to the corresponding fourth end portion 84*b* than all parts other than the second end portion 83*b* in the first conductive line 83. A shortest distance between the second end portion 83*b* and the fourth end portion 84*b* corresponding to each other is, for example, 1.8 μm. The shortest distance may be less than 1.8 μm. For example, the shortest distance may be 10 nm. As the shortest distance reduces, the sensitivity of the meta-surface increases.

In the embodiment, as illustrated in FIG. 14, the first conductive line 83 includes a linear portion 83*c* extending linearly in the first direction α, and a linear portion 83*d* branched from the linear portion 83*c* and extending linearly toward the facing second conductive line 84, in the meta-surface S. The linear portion 83*d* includes the second end portion 83*b*. The second conductive line 84 includes a linear portion 84*c* extending linearly in the first direction α, and a linear portion 84*d* branched from the linear portion 84*c* and extending linearly toward the facing first conductive line 83. The linear portion 84*d* includes the fourth end portion 84*b*. The linear portion 83*c* and the linear portion 84*c* extend in parallel to each other. In the embodiment, the linear portion 83*d* and the linear portion 84*d* extend in the second direction β orthogonal to the first direction α.

The linear portion 83*d* and the linear portion 84*d* corresponding to each other extend on the same virtual straight line R1. The linear portion 83*d* and the linear portion 84*d* corresponding to each other mean the linear portion 83*d* and the linear portion 84*d* including the second end portion 83*b* and the fourth end portion 84*b* which face each other and are adjacent to each other. The linear portion 83*d* of the first conductive line 83 is positioned on the virtual straight line R1 extending in the second direction β from the second end portion 83*b*, and the fourth end portion 84*b* of the linear portion 84*d* corresponding to the linear portion 83*d* is positioned on the virtual straight line R1. In other words, the linear portion 84*d* of the second conductive line 84 is positioned on the virtual straight line R1 extending in the second direction β from the fourth end portion 84*b*, and the second end portion 83*b* of the linear portion 83*d* corresponding to the linear portion 84*d* is positioned on the virtual straight line R1. Only one linear portion 83*d* extends toward the fourth end portion 84*b* of one linear portion 84*d*. The linear portion 83*d* and the linear portion 84*d* corresponding to each other have the same length. The term "same" includes a manufacturing tolerance range. In the configuration illustrated in FIG. 14, the first conductive line 83 and the second conductive line 84 are formed in mirror symmetry with each other.

The plurality of first conductive lines 83 and the plurality of second conductive lines 84 are formed, for example, by an evaporation processing and an etching processing. A material of the plurality of first conductive lines 83 and the plurality of second conductive lines 84 includes, for example, gold. In the embodiment, the first conductive line 83 and the second conductive line 84 are included in the metal layer described above, and are formed on the oxide layer described above. In the electron emitter 20, the first electrode 81 and the first conductive line 83, and the second electrode 82 and the second conductive line 84 are connected via the oxide layer, and are insulated each other at least when the electron tube 1 does not operate.

At least one of the first conductive line 83 and the second conductive line 84 is included in an antenna portion 85 and a bias portion 87. In the configuration illustrated in FIG. 14, both of the linear portion 83*d* of the first conductive line 83 and the linear portion 84*d* of the second conductive line 84 are configured as the antenna portion 85 and the bias portion 87.

The antenna portion 85 emits an electron in response to the incidence of the electromagnetic wave. In the embodiment, when the electromagnetic wave is incident on the antenna portion 85, an electric field is induced around the antenna portion 85. As a result, a potential barrier at the antenna-vacuum interface becomes thin, and the electron existing in the antenna portion 85 slips out of the potential barrier due to a tunnel effect. The electron slipping out of the potential barrier is accelerated by the electric field around the antenna portion 85. As a result, an electric field electron emission is generated by the incidence of the electromagnetic wave for the antenna portion 85. The bias portion 87 generates an electric field between the bias portion 87 and the antenna portion 85 of the corresponding conductive line when the bias potential is applied.

In the configuration illustrated in FIG. 14, the linear portion 83*d* of the first conductive line 83 includes the antenna portion 85 emitting the electron in response to the incidence of the electromagnetic wave, and the bias portion 87 generating the electronic field between the bias portion 87 and the linear portion 84*d* of the second conductive line 84 when the bias potential is applied to the first electrode 81. The second conductive line 84 includes the antenna portion 85 emitting the electron in response to the incidence of the electromagnetic wave, and the bias portion 87 generating the electric field between the bias portion 87 and the linear portion 83*d* of the first conductive line 83 when the bias potential is applied to the second electrode 82. That is, one of the first conductive line 83 and the second conductive line 84 includes the antenna portion 85 emitting the electron in response to the incidence of the electromagnetic wave, and the bias portion 87 generating the electric field between the bias portion 87 and the other of the first conductive line 83 and the second conductive line 84. In the configuration illustrated in FIG. 14, the second conductive line 84 emits the electron in response to the incidence of the electromagnetic wave when the bias potential is applied to the first electrode 81. The first conductive line 83 emits the electron in response to the incidence of the electromagnetic wave when the bias potential is applied to the second electrode 82.

The antenna portion 85 having a smaller size tends to generate an emission of an electric field electron for an electromagnetic wave having a shorter wavelength, that is, an electromagnetic wave having a larger frequency. According to the change of a structure of the antenna portion 85, the meta-surface S can correspond to a frequency band of about 0.01 to 150 THz, that is, a frequency band from a so-called millimeter wave to infrared light. The meta-surface S may be configured to correspond to a frequency band of 0.01 to 10 THz equivalent to the frequency band from a so-called millimeter wave to a terahertz-wave, for example. The meta-surface S may be configured to correspond to a frequency band of 10 to 150 THz equivalent to a frequency band from a terahertz-wave to infrared light, for example. In the embodiment, a size of the principal surface 21*b* of the electron emitter 20 is 10×10 mm A size of the meta-surface S in plan view is 3.2×3.2 mm A pitch of each antenna portion 85 is about 70 μm to 100 μm. The meta-surface S corresponds to an electromagnetic wave having a frequency of 0.5 THz.

In the embodiment, the meta-surface S is a transmissive meta-surface. In the transmissive meta-surface, when the electromagnetic wave is incident, the electron is emitted from the side opposite to the surface on which the electromagnetic wave has been incident. In the electron tube 1, the electromagnetic wave passed through the window 11*a* is incident on the principal surface 21*a* of the substrate 21. The electromagnetic wave passed through the substrate 21 enters the meta-surface S provided on the principal surface 21*b*. The meta-surface S emits the electron in response to the electromagnetic wave incident thereon after passing through the window 11*a* and the substrate 21.

Figure 15:
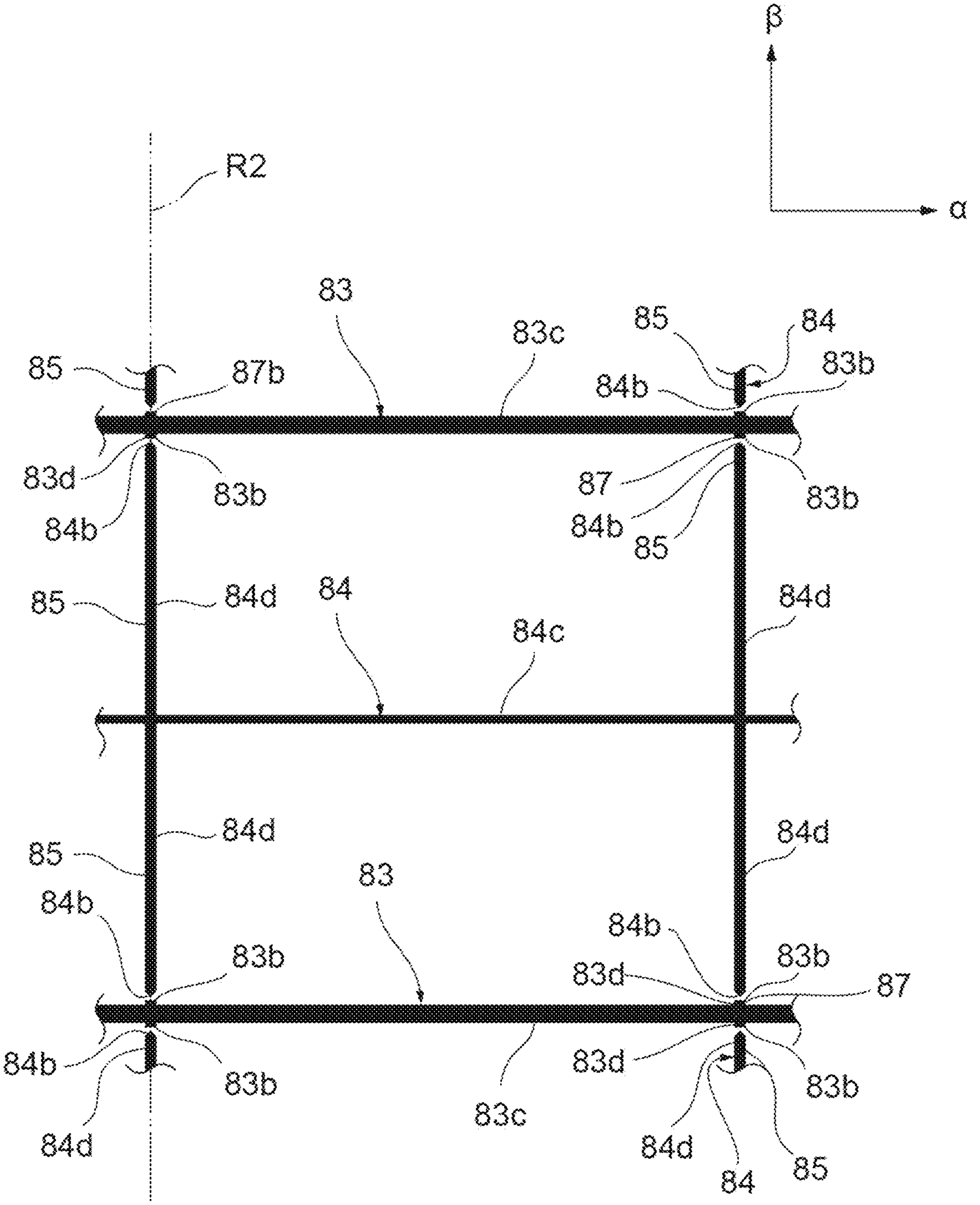
FIG. 15 is a view illustrating a structure of a conductive line in a modification of the embodiment.
Figure 16:
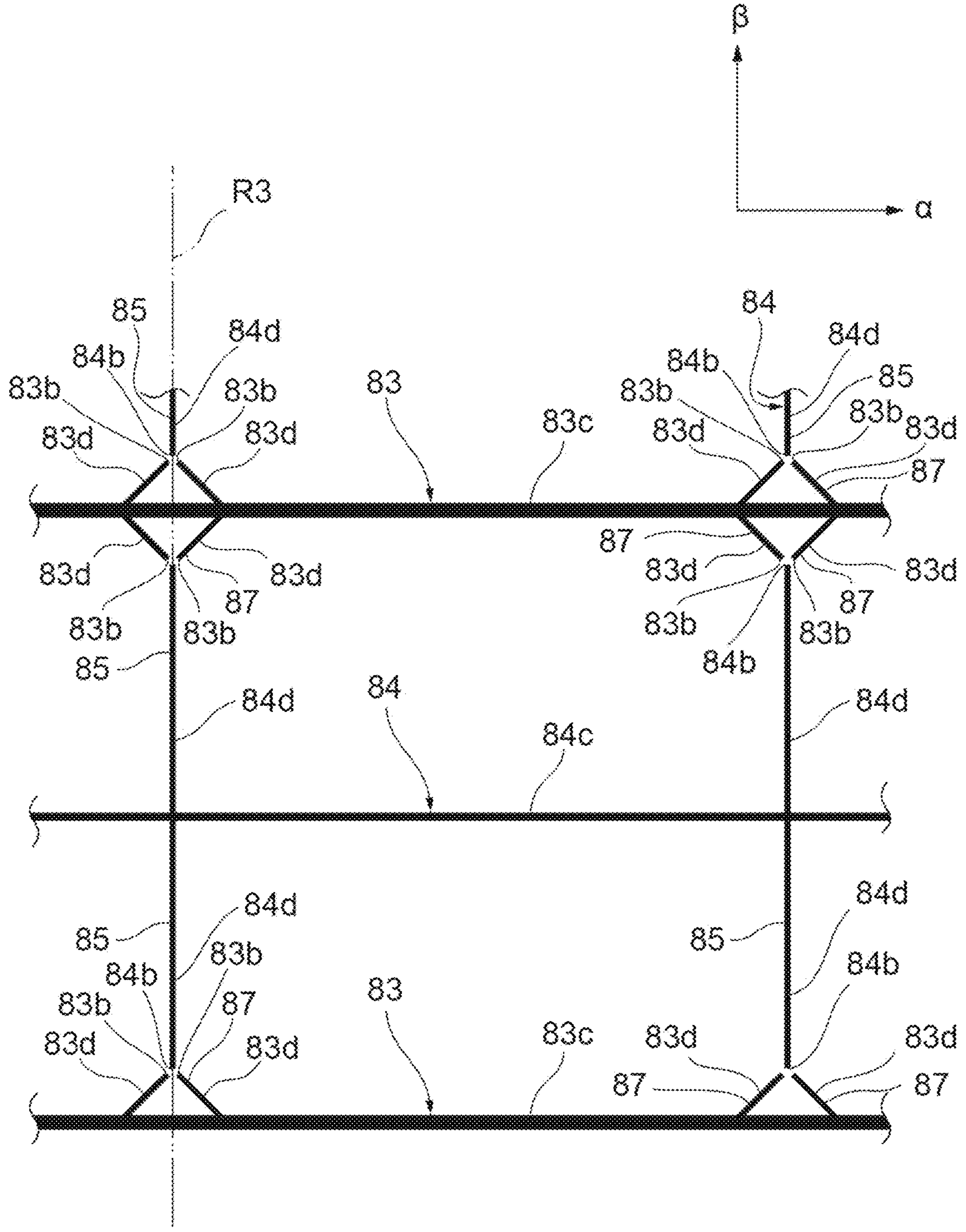
FIG. 16 is a view illustrating a structure of a conductive line in a modification of the embodiment.

Next, a configuration of the first conductive line 83 and the second conductive line 84 in modifications of the present embodiment will be described with reference to FIGS. 15 and 16. These modifications are approximately similar to or the same as the embodiment described above. These modifications are different from the embodiment described above in the configuration of the first conductive line 83 and the second conductive line 84. In these modifications, the first conductive line 83 and the second conductive line 84 are formed in mirror asymmetric with each other. Hereinafter, a difference between the embodiment and the modification will be mainly described. FIG. 15 is a partially enlarged view of the first conductive line 83 and the second conductive line 84 in the meta-surface S according to a modification of the embodiment. FIG. 16 is a partially enlarged view of the first conductive line 83 and the second conductive line 84 in the meta-surface S according to further the other modification of the embodiment.

In the configuration illustrated in FIG. 15, the linear portion 83*d* of the first conductive line 83 extends in the second direction β toward each of a pair of second conductive lines 84 interposing the linear portion 83*c* connected to the linear portion 83*d*. A linear portion 84*d* of the second conductive line 84 extends in the second direction β toward each of a pair of first conductive lines 83 interposing the linear portion 84*c* connected to the linear portion 84*d*. In the configuration illustrated in FIG. 15, the linear portion 83*c* and the linear portion 83*d* branched from the linear portion 83*c* intersect in a cross shape. The linear portion 84*c* and the linear portion 84*d* branched from the linear portion 84*c* intersect in a cross shape.

The linear portion 83*d* and the linear portion 84*d* corresponding to each other extend on the same virtual straight line R2. The linear portion 83*d* of the first conductive line 83 is positioned on the virtual straight line R2 extending in the second direction β from the second end portion 83*b*, and the fourth end portion 84*b* of the linear portion 84*d* corresponding to the linear portion 83*d* is positioned on the virtual straight line R2. In other words, the linear portion 84*d* of the second conductive line 84 is positioned on the virtual straight line R2 extending in the second direction β from the fourth end portion 84*b*, and the second end portion 83*b* of the linear portion 83*d* corresponding to the linear portion 84*d* is positioned on the virtual straight line R2. Only one linear portion 83*d* extends toward the fourth end portion 84*b* of one linear portion 84*d*. Only one linear portion 84*d* extends toward the second end portion 83*b* of one linear portion 83*d*.

In the configuration illustrated in FIG. 15, the linear portion 84*d* of the second conductive line 84 is configured as an antenna portion 85. The linear portion 83*d* of the first conductive line 83 is configured as the bias portion 87 generating an electric field between the bias portion 87 and the antenna portion 85 of the second conductive line 84 when a bias potential is applied to the first electrode 81. In the configuration illustrated in FIG. 15, a length of the linear portion 84*d* in the second direction β is larger than a length of the linear portion 83*d* in the second direction β. The term "length of the linear portion 83*d*" means a distance from a portion coupled to the linear portion 83*c* to the second end portion 83*b*. The term "length of the linear portion 84*d*" means a distance from a portion coupled to the linear portion 84*c* to the fourth end portion 84*b*. For example, the length of the linear portion 83*d* in the second direction β is 5.6 μm, and the length of the linear portion 84*d* in the second direction β is 116 μm. A thickness of the linear portion 83*c* is larger than a thickness of the linear portion 83*d*, the linear portion 84*c* and the linear portion 84*d*. The term "thickness of the linear portion" means a width of each of the linear portions in a direction orthogonal to an extending direction of the linear portion. For example, the thickness of the linear portion 83*c* is 7.8 μm, and the thickness of the linear portion 83*d*, the linear portion 84*c* and the linear portion 84*d* is 4.9 μm.

The configuration illustrated in FIG. 16 is different from the configuration illustrated in FIG. 15 in that the corresponding linear portion 83*c* is not positioned on a virtual straight line R3 on which the linear portion 84*c* extends. Hereinafter, a difference between the embodiment described above and the modification will be mainly described. In the configuration illustrated in FIG. 16, the linear portion 84*d* of the second conductive line 84 is also configured as an antenna portion 85. In the configuration illustrated in FIG. 16, the linear portion 83*d* of the first conductive line 83 is also configured as a bias portion 87 generating an electric field in the vicinity of the antenna portion 85 of the second conductive line 84 when a bias potential is applied to the first electrode 81.

In the configuration illustrated in FIG. 16, the plurality of linear portions 83*d* extends toward the fourth end portion 84*b* of one linear portion 84*d*. A plurality of second end portions 83*b* is disposed adjacent to one fourth end portion 84*b*. The number of the plurality of linear portions 83*d* extending toward one fourth end portion 84*b* may be two or three or more. In the configuration illustrated in FIG. 16, two linear portions 83*d* extend toward the fourth end portion 84*b* of one linear portion 84*d*. Each of two second end portions 83*b* faces one fourth end portion 84*b*. A distance between each of two second end portions 83*b* and one fourth end portion 84*b* is equidistance. The term "equidistance" includes a manufacturing tolerance range.

In the configuration illustrated in FIG. 16, the linear portion 83*d* extends from the linear portion 83*c* toward the fourth end portion 84*b* in a direction intersecting both of an extending direction of the linear portion 83*c* and an extending direction of the linear portion 84*d*. The linear portion 84*d* of the second conductive line 84 extends on the virtual straight line R3 extending from the fourth end portion 84*b* in the second direction β. The second end portion 83*b* of the linear portion 83*d* corresponding to the linear portion 84*d* is not positioned on the virtual straight line R3.

Figure 17:
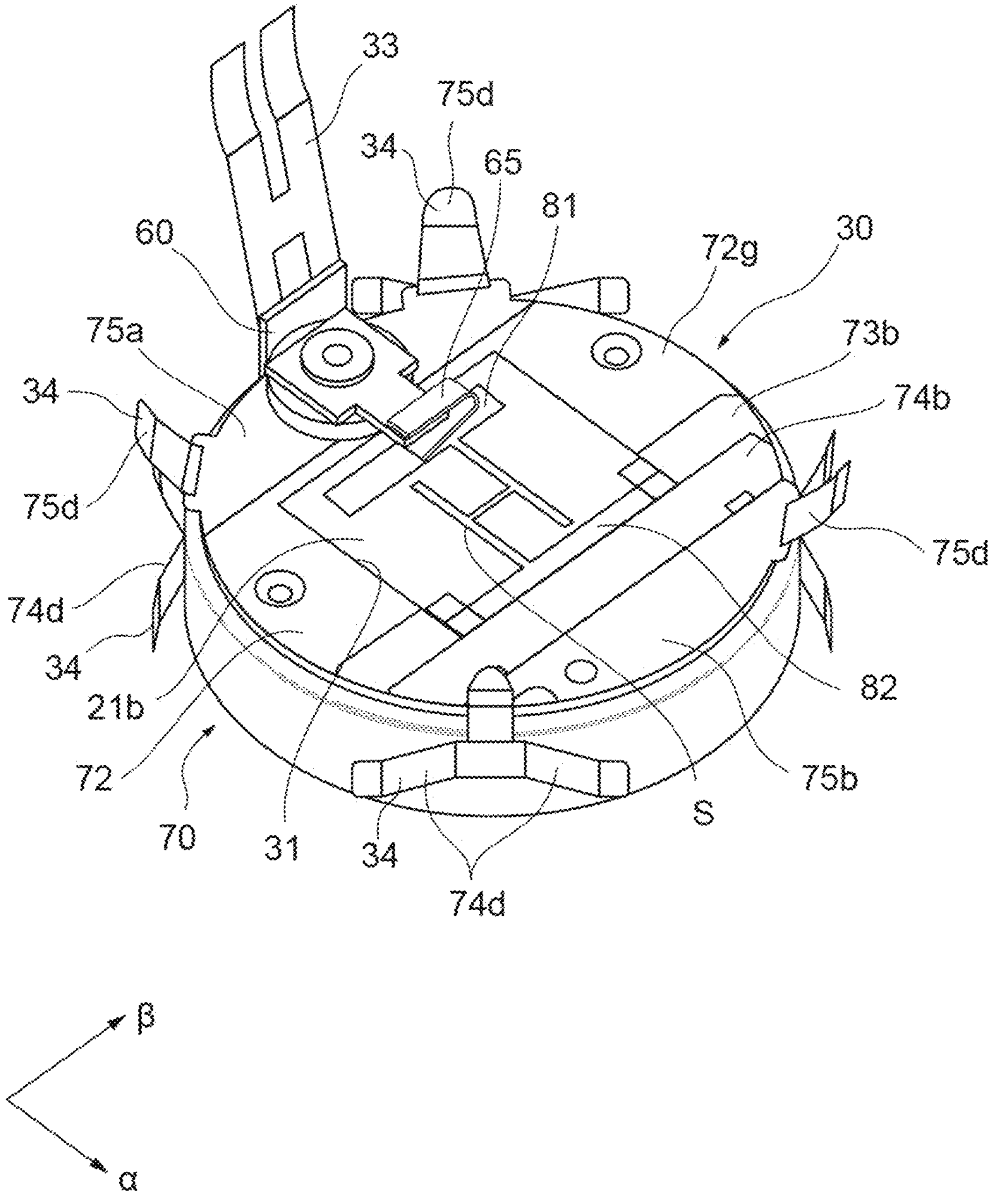
FIG. 17 is a perspective view of a holder in a modification of the embodiment.
Figure 18A:
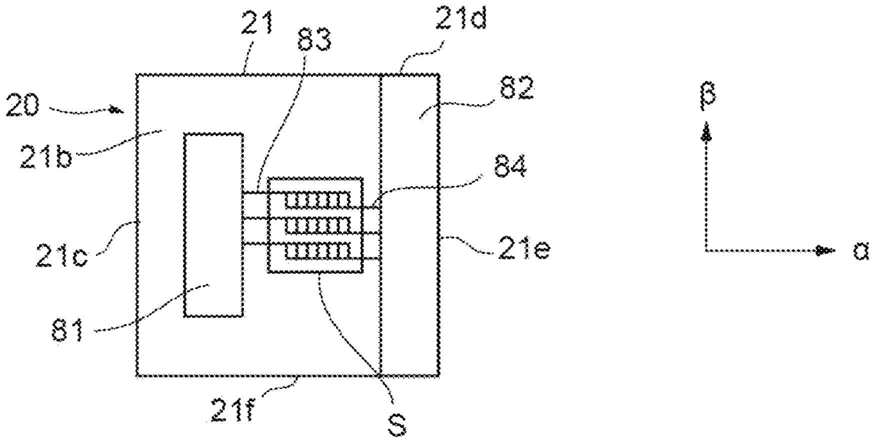
FIGS. 18A to 18D are plan views of an electron emitter in a modification of the embodiment.

Next, a configuration of the holder 30 and an electron emitter 20 in a modification of the present invention will be described in detail with reference to FIGS. 17 to 18D. FIG. 17 is a perspective view of the holder 30 in the modification of the embodiment. FIGS. 18A to 18D are plan views of the electron emitter 20. The modification is generally similar to or the same as the embodiment described above. The modification is different from the embodiment and the modification described above in a configuration of the first electrode 81 and the second electrode 82 and in a configuration of the frame member 72. Hereinafter, a difference between the embodiment described above and the modification will be mainly described.

As illustrated in FIG. 17, in the modification, the frame member 72 includes only a conductive portion 72*g*, and only a single potential is applied to the frame member 72. The frame member 72 in the modification does not include a portion corresponding to the insulating portion 72*e*. In the modification, an entire first electrode 81, a part of the second electrode 82 and the meta-surface S are exposed from the penetration opening 31 of the holding body 70. At least one of the first electrode 81 and the second electrode 82 is spaced away from the holding body 70 of the holder 30. In the modification, the first electrode 81 being in contact with the contact electrode 65 is spaced away from an edge of the penetration opening 31 of the holding body 70. The contact electrode 65 is elastically in contact with the first electrode 81.

At least one of the first electrode 81 and the second electrode 82 is spaced away from all edges 21*c*, 21*d*, 21*e* and 21*f* of the substrate 21. In the modification, similar to the embodiment described above, the first electrode 81 and the second electrode 82 have a rectangular shape. In the configuration illustrated in FIG. 18A, long sides of the first electrode 81 and the second electrode 82 extend in the second direction β. As seen from a direction orthogonal to the principal surface 21*b*, an edge of the second electrode 82 fully overlaps an entire edge 21*e*, a part of the edge 21*d* and a part of the edge 21*f*. An edge of the first electrode 81 fully overlaps none of the edges 21*c*, 21*d*, 21*e* and 21*f* of the substrate 21. As illustrated in FIG. 18A, the first electrode 81 is spaced away from all the edges 21*c*, 21*d*, 21*e* and 21*f* of the substrate 21 in the principal surface 21*b*.

Figure 18B:
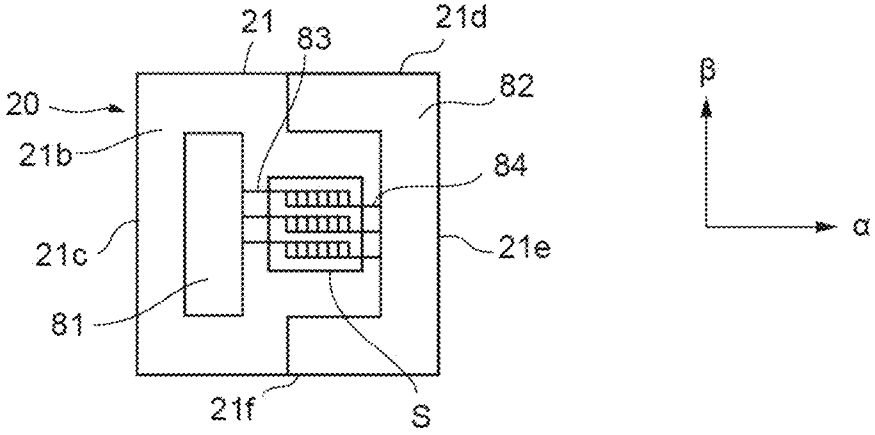
Figure 18C:
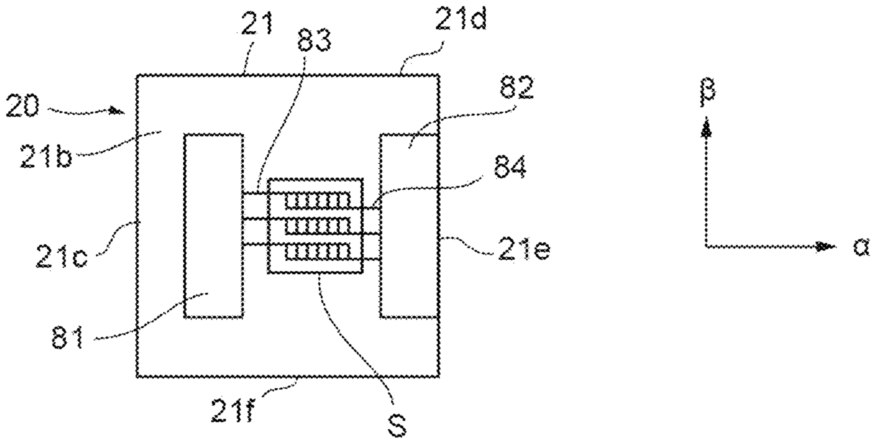
Figure 18D:
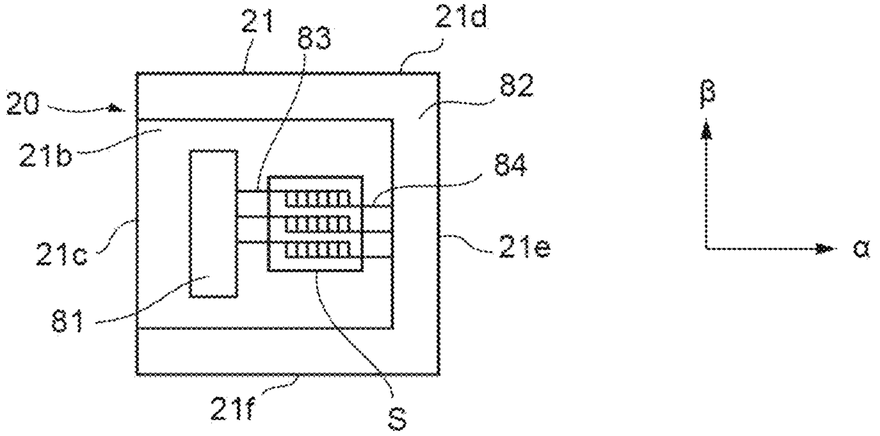

FIGS. 18B to 18D illustrate a modification of the configuration illustrated in FIG. 18A. For example, the first electrode 81 and the second electrode 82 may be configured as illustrated in FIGS. 18A to 18D. In the configuration illustrated in FIG. 18B, the second electrode 82 extends toward the edge 21*c* along the edge 21*d*, and extends toward the edge 21*c* along the edge 21*f*. In the configuration illustrated in FIG. 18B, the second electrode 82 is spaced away from the edge 21*c*. In the configuration illustrated in FIG. 18B, an edge of the second electrode 82 fully overlaps a part of the edge 21*d*, an entire edge 21*e* and a part of the edge 21*f* as seen from a direction orthogonal to the principal surface 21*b*.

In the configuration illustrated in FIG. 18C, the second electrode 82 is spaced away from the edges 21*d* and 21*f* of the substrate 21. In the configuration illustrated in FIG. 18C, the first electrode 81 and the second electrode 82 have the same shape. In the configuration illustrated in FIG. 18C, an edge of the second electrode 82 fully overlaps the edge 21*e* of the substrate 21 as seen from a direction orthogonal to the principal surface 21*b*.

In the configuration illustrated in FIG. 18D, the second electrode 82 extends to the edge 21*c* along the edge 21*d* and extends to the edge 21*c* along the edge 21*f*. In the configuration illustrated in FIG. 18D, an edge of the second electrode 82 fully overlaps a part of the edge 21*c*, an entire edge 21*d*, an entire edge 21*e* and an entire edge 21*f* as seen from the direction orthogonal to the principal surface 21*b*.

Figure 19A:
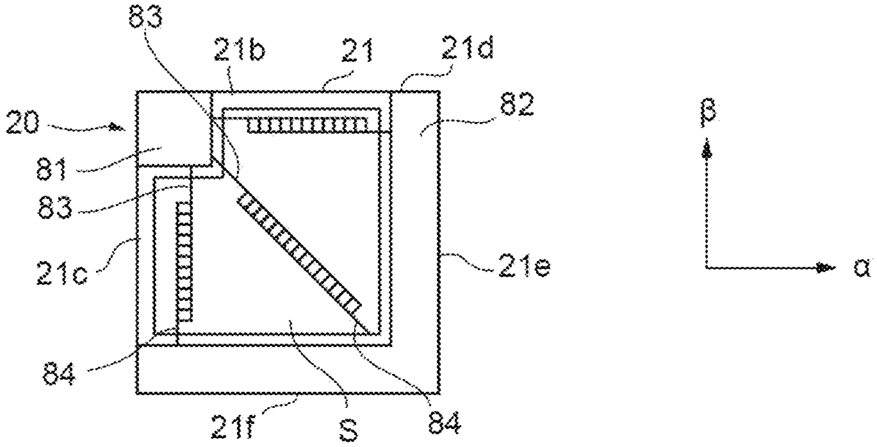
FIGS. 19A to 19C are plan views of an electron emitter in a modification of the embodiment.
Figure 19B:
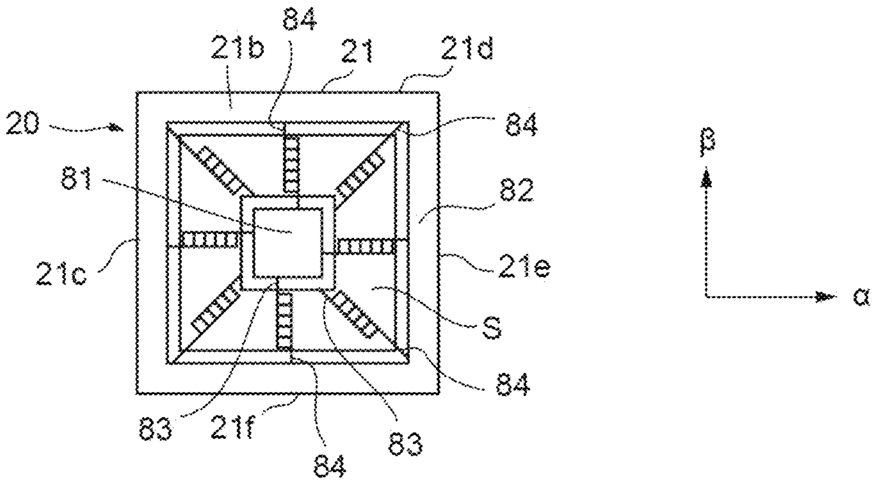
Figure 19C:
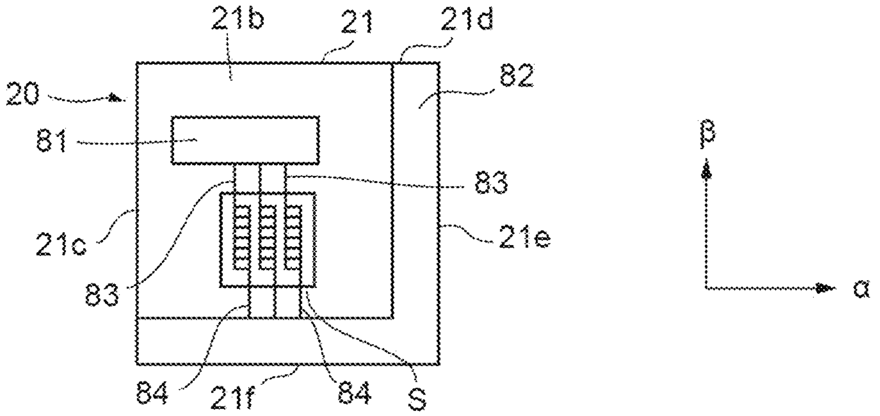

Next, a configuration of an electron emitter 20 according to further modification of the configuration illustrated in FIGS. 17 and 18A to 18D will be described in detail with reference to FIGS. 19A to 19C. The modification is generally similar to or the same as the modification illustrated in FIGS. 17 and 18A to 18D. Hereinafter, a difference from the modification illustrated in FIGS. 17 and 18A to 18D will be mainly described. FIGS. 19A to 19C are plan views of an electron emitter.

In the configuration illustrated in FIG. 19A, an edge of the first electrode 81 fully overlaps only a part of an edge 21*c* and a part of an edge 21*d* as seen from a direction orthogonal to the principal surface 21*b*. In the configuration illustrated in FIG. 19A, an edge of the second electrode 82 fully overlaps a part of the edge 21*d*, an entire edge 21*e*, an entire edge 21*f* and a part of the edge 21*c* as seen from a direction orthogonal to the principal surface 21*b*. In the configuration illustrated in FIG. 19A, the first electrode 81 has a rectangular shape and the second electrode 82 has an L-shaped form as seen from the direction orthogonal to the principal surface 21*b*. In the configuration illustrated in FIG. 19A, the first electrode 81, the meta-surface S and the second electrode 82 are disposed in this order in a direction intersecting both of the first direction α and the second direction β. In the configuration illustrated in FIG. 19A, the plurality of first conductive lines 83 and second conductive lines 84 corresponding to the first conductive lines 83 extend in the first direction α, the second direction β and a direction intersecting both of the first direction α and the second direction β. When the electron emitter 20 illustrated in FIG. 19A is employed, the configuration may be modified from the configuration of the holder 30 illustrated in FIG. 17 so that the contact electrode 65 is in contact with the first electrode 81.

In the configuration illustrated in FIG. 19B, as seen from a direction orthogonal to the principal surface 21*b*, an edge of the second electrode 82 fully overlaps an entire edge 21*c*, an entire edge 21*d*, an entire edge 21*e* and an entire edge 21*f*. In the configuration illustrated in FIG. 19B, as seen from the direction orthogonal to the principal surface 21*b*, the first electrode 81 has a rectangular shape and is disposed in the center of the principal surface 21*a*, and the second electrode 82 has an O-shaped form and surrounds the first electrode 81. In the configuration illustrated in FIG. 19B, the meta-surface S is surrounded by the second electrode 82 and surrounds the first electrode 81. In the configuration illustrated in FIG. 19B, the plurality of first conductive lines 83 and second conductive lines 84 corresponding to the first conductive lines 83 extend radially from the center of the principal surface 21*b*. When the electron emitter 20 illustrated in FIG. 19B is employed, the configuration may be modified from the configuration of the holder 30 illustrated in FIG. 17 so that the contact electrode 65 is in contact with the first electrode 81.

In the configuration illustrated in FIG. 19C, an edge of the first electrode 81 fully overlaps none of edges 21*c*, 21*d*, 21*e* and 21*f* of the substrate 21. In the configuration illustrated in FIG. 19C, the edge of the first electrode 81 is spaced away from all the edges 21*c*, 21*d*, 21*e* and 21*f* of the substrate 21 as seen from the direction orthogonal to the principal surface 21*b*. In the configuration illustrated in FIG. 19C, as seen from the direction orthogonal to the principal surface 21*b*, an edge of the second electrode 82 fully overlaps a part of the edge 21*d*, an entire edge 21*e*, an entire edge 21*f* and a part of the edge 21*c*. In the configuration illustrated in FIG. 19C, as seen from the direction orthogonal to the principal surface 21*b*, the first electrode 81 has a rectangular shape, and the second electrode 82 has an L-shaped form. In the configuration illustrated in FIG. 19C, a long side of the first electrode 81 extends in the first direction α.

In the configuration illustrated in FIG. 19C, the first electrode 81, the meta-surface S and the second electrode 82 are disposed in this order in the second direction β. In the configuration illustrated in FIG. 19C, the plurality of first conductive lines 83 and second conductive lines 84 corresponding to the first conductive lines 83 extend in the second direction β. When the electron emitter 20 illustrated in FIG. 19C is employed, the configuration of the holder 30 may be modified from the configuration illustrated in FIG. 17 so that a contact member having the same configuration as the contact member 60 connected to the first electrode 81 is connected to the second electrode 82.

The electron emitter 20 is not limited to the configurations illustrated in FIGS. 13A to 13C, 18A to 18D, and 19A to 19C. For example, the electron emitter may be configured as shown in FIGS. 20A and 20B.

Figure 20A:
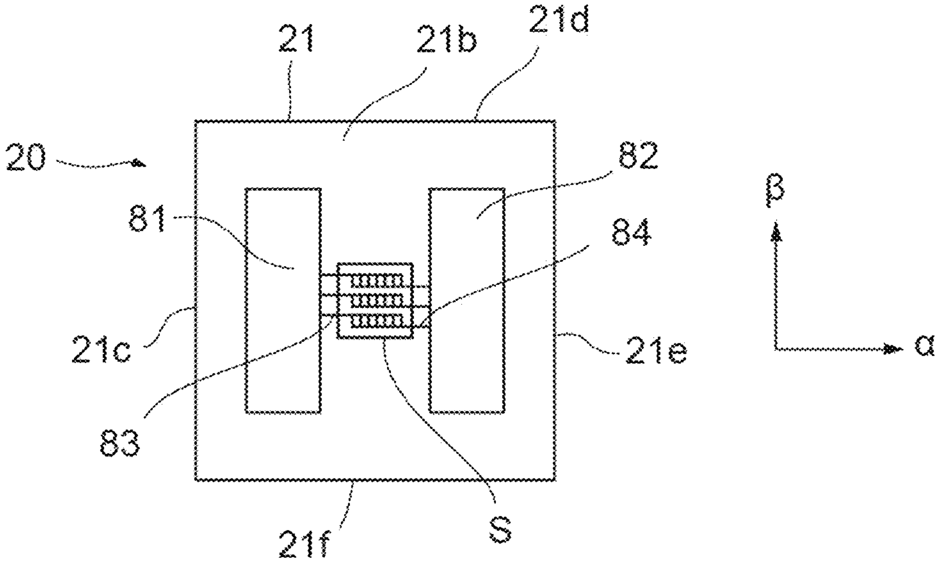
FIGS. 20A and 20B are plan views of an electron emitter in a modification of the embodiment.

In the configuration illustrated in FIG. 20A, the first electrode 81 and the second electrode 82 have a rectangular shape as seen from a direction orthogonal to the principal surface 21*b*. In the configuration illustrated in FIG. 20A, long sides of the first electrode 81 and the second electrode 82 extend in the second direction β. In the configuration illustrated in FIG. 20A, an edge of the first electrode 81 fully overlaps none of edges 21*c*, 21*d*, 21*e* and 21*f* of the substrate 21. In the configuration illustrated in FIG. 20A, the edge of the first electrode 81 is spaced away from all the edges 21*c*, 21*d*, 21*e* and 21*f* of the substrate 21 as seen from the direction orthogonal to the principal surface 21*b*. In the configuration illustrated in FIG. 20A, the first electrode 81 and the second electrode 82 have the same shape, and are disposed rotationally symmetrical and linearly symmetrical in the principal surface 21*b*.

In the configuration illustrated in FIG. 20A, the first electrode 81, the meta-surface S and the second electrode 82 are disposed in this order in the first direction α. In the configuration illustrated in FIG. 20A, the plurality of first conductive lines 83 and second conductive lines 84 corresponding to the first conductive lines 83 extend in the first direction α. When the electron emitter 20 illustrated in FIG. 20A is employed, the first electrode 81, the second electrode 82 and the meta-surface S are exposed from an opening 72*a*, and are spaced away from an edge of the opening 72*a*. When the electron emitter 20 illustrated in FIG. 20A is employed, two contact members each having the same configuration as the contact member 60 connected to the first electrode 81 may be used. In this case, two contact electrodes 65 spaced away from each other are in contact with the first electrode 81 and the second electrode 82 respectively.

Figure 20B:
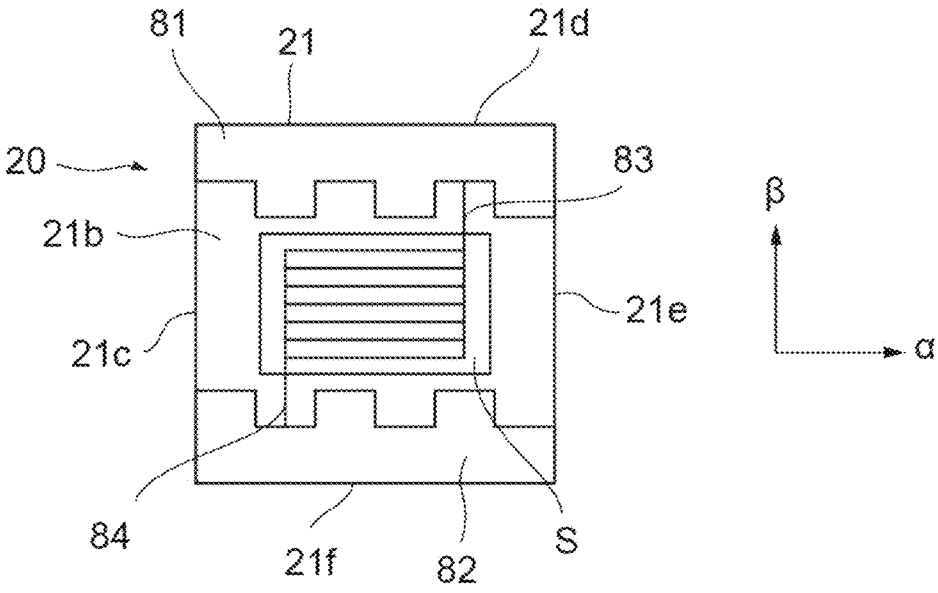

In the configuration illustrated in FIG. 20B, as seen from a direction orthogonal to the principal surface 21*b*, an edge of the first electrode 81 fully overlaps a part of an edge 21*c*, an entire edge 21*d* and a part of an edge 21*e*. In the configuration illustrated in FIG. 20B, as seen from the direction orthogonal to the principal surface 21*b*, an edge of the second electrode 82 fully overlaps a part of the edge 21*e*, an entire edge 21*f* and a part of the edge 21*c*. In the configuration illustrated in FIG. 20B, the first electrode 81 and the second electrode 82 have an edge having a concave-convex shape in a direction facing each other. In the configuration illustrated in FIG. 20B, the first electrode 81, the meta-surface S and the second electrode 82 are disposed in this order in the second direction β. In the configuration illustrated in FIG. 20B, the first conductive line 83 and the second conductive line 84 corresponding to the first conductive line 83 extend in the second direction β.

Next, an operation of the electron tube 1 according to the embodiment will be described. Potentials are applied to the holder 30, the dynodes 42*a* and 42*b* and the anode 51 respectively through the wires 13. The potentials respectively applied to the holder 30, the dynodes 42*a* and 42*b* and the anode 51 are set to be sequentially higher toward the anode 51 from the holder 30.

A potential is applied to the first electrode 81 of the electron emitter 20 through the conductive layer 15 and the conductive terminal 33. A potential is applied to the second electrode 82 of the electron emitter 20 through the conductive layer 16 and the conductive terminal 34. The different potentials from each other are applied to the first electrode 81 and the second electrode 82. One of the first electrode 81 and the second electrode 82 may be the ground.

The electromagnetic wave enters the opening 71*a* of the base member 71 in the holder 30 after passing through the window 11*a* of the housing 10. The electromagnetic wave passed through the opening 71*a* enters the incidence surface 22 of the electron emitter 20. The electromagnetic wave passes through the substrate 21 and enters the meta-surface S. When the electromagnetic wave is incident on the meta-surface S, the electric field is induced around the antenna portion 85. As a result, the potential barrier at the antenna-vacuum interface becomes thinner, and the electron existing in the antenna portion 85 slips out of the potential barrier due to the tunnel effect. The electron slipping out of the potential barrier is accelerated by the electric field around the antenna portion 85. As a result, the electron emitter 20 emits the electron from the meta-surface S in response to the incidence of the electromagnetic wave. The electron emitted from the electron emitter 20 is guided to the incidence surface 40*a* of the electron multiplying unit 40.

The electrons emitted from the electron emitter 20 are converged by the focusing electrode 41 and are sent to the first stage dynode 42*a*. When the electron enters the first stage dynode 42*a*, secondary electrons are emitted to the second stage dynode 42*b*. When the electrons enter the second stage dynode 42*b*, the secondary electrons are emitted to the third stage dynode 42*b*. As such, the electrons are successively sent while being multiplied from the first stage dynode 42*a* to the tenth stage dynode 42*b*. For the electron emitted from the electron emitter 20, cascade multiplication is performed by the electron multiplying unit 40. The electrons multiplied by the electron multiplying unit 40 are collected by the anode 51 which is the electron collecting unit 50, and are output as output signals from the anode 51 through the wire 13.

Figure 21:
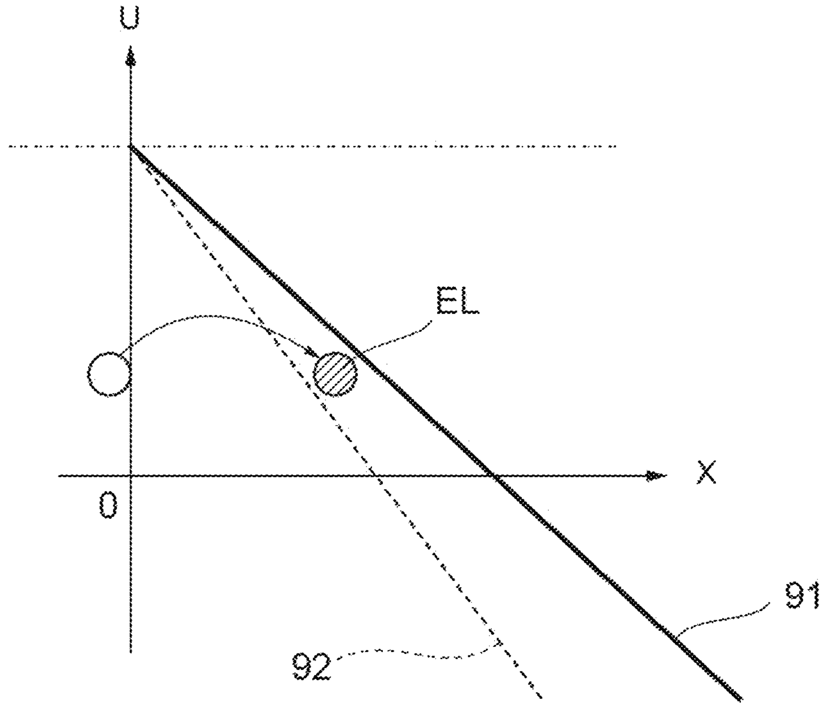
FIG. 21 is a view for describing an operation of an electron tube in the embodiment.
Figure 22A:
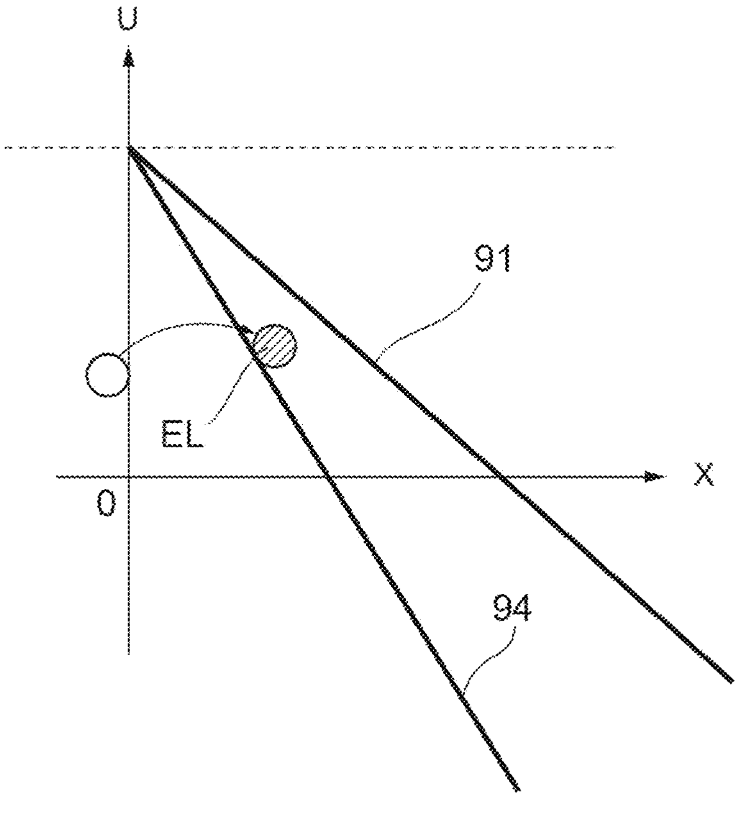
FIGS. 22A and 22B are views for describing an operation of the electron tube in the embodiment.
Figure 22B:
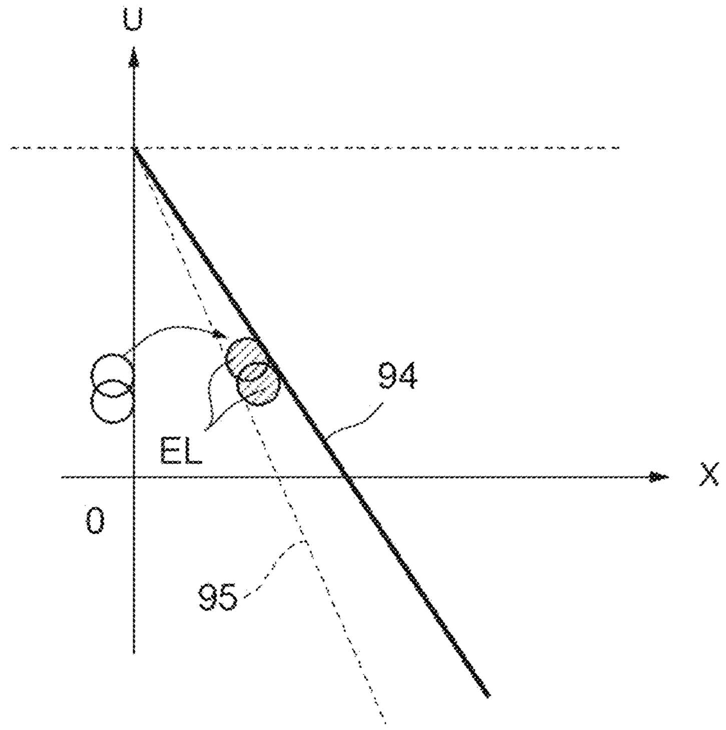
Figure 23:
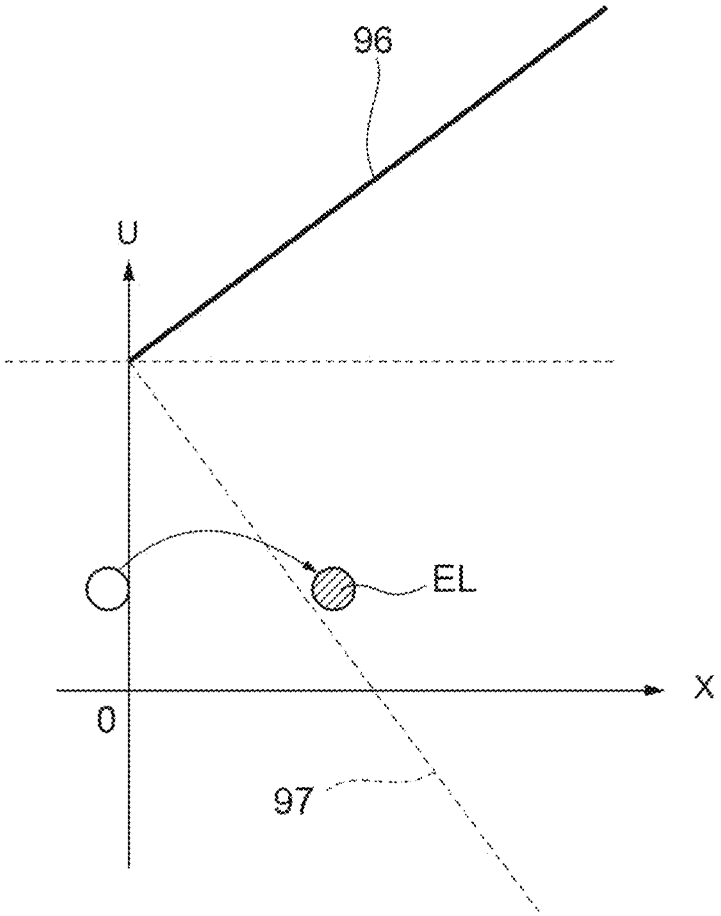
FIG. 23 is a view for describing an operation of the electron tube in the embodiment.

An operation of the electron emitter 20 will be described in more detail with reference to FIGS. 21 to 23. In FIGS. 21 to 23, a vertical axis indicates a potential energy U, and a horizontal axis indicates a distance X from an edge of the antenna portion 85. FIG. 21, FIGS. 22A and 22B and FIG. 23 are views for describing different operation modes.

First, a threshold value mode will be described with reference to FIG. 21. When the electron tube 1 operates, a bias voltage is applied to the electron emitter 20 between the first electrode 81 and the second electrode 82. In other words, the bias voltage is applied to the antenna portion 85 through the first conductive line 83 and the second conductive line 84. As a result, the potential around the antenna portion 85 is tilted as illustrated by a solid straight line 91 in FIG. 21 from a state before the electromagnetic wave is incident on the meta-surface S. Therefore, when the electromagnetic wave is incident on the meta-surface S in a state where the bias voltage is applied to the antenna portion 85, the potential around the antenna portion 85 is further tilted as illustrated by a broken line 92. Therefore, when the amplitude of the electromagnetic wave is low, the electron EL slipping out of the potential barrier due to the tunnel effect is increased, compared to the situation when no bias is applied. According to the operation mode described above, it is possible to detect whether or not an output is provided in the electromagnetic wave having a low output, for example.

Next, a modulation mode will be described with reference to FIGS. 22A and 22B. In this operation mode, a higher bias voltage than the threshold value mode is applied to the antenna portion 85. As a result, as illustrated by a solid straight line 94 in FIG. 22A, the potential around the antenna portion 85 is further tilted before the electromagnetic wave enters the meta-surface S. That is, the solid straight line 94 in FIG. 22A is tilted more than the solid straight line 91 in FIG. 21. Specifically, the bias voltage is set so that the electron in the antenna portion 85 slips out of the potential barrier from before the electromagnetic wave enters the meta-surface S. When the electromagnetic wave is incident on the meta-surface S in this state, the potential around the antenna portion 85 is further tilted as illustrated by a broken line 95. According to the operation mode described above, it is possible to detect a very small change of the electromagnetic wave incident on the meta-surface S. Therefore, a stableness of the electromagnetic wave incident on the meta-surface S can be measured, for example.

Next, a reverse bias mode will be described with reference to FIG. 23. In this operation mode, a reverse bias voltage is applied to the antenna portion 85. As a result, as shown by a solid straight line 96 in FIG. 23, the potential around the antenna portion 85 is tilted in a reverse direction to the threshold value mode and the modulation mode described above before the electromagnetic wave enters the meta-surface S. When the electromagnetic wave having a high output is incident on the meta-surface S in this state, the potential around the antenna portion 85 is tilted as illustrated by a broken line 97. As a result, the electron is emitted from the meta-surface S due to the tunnel effect. According to the operation mode, a stable measurement can be achieved and breakage of device can be suppressed even if the electromagnetic wave having the high output is incident on the meta-surface S.

Figure 24:
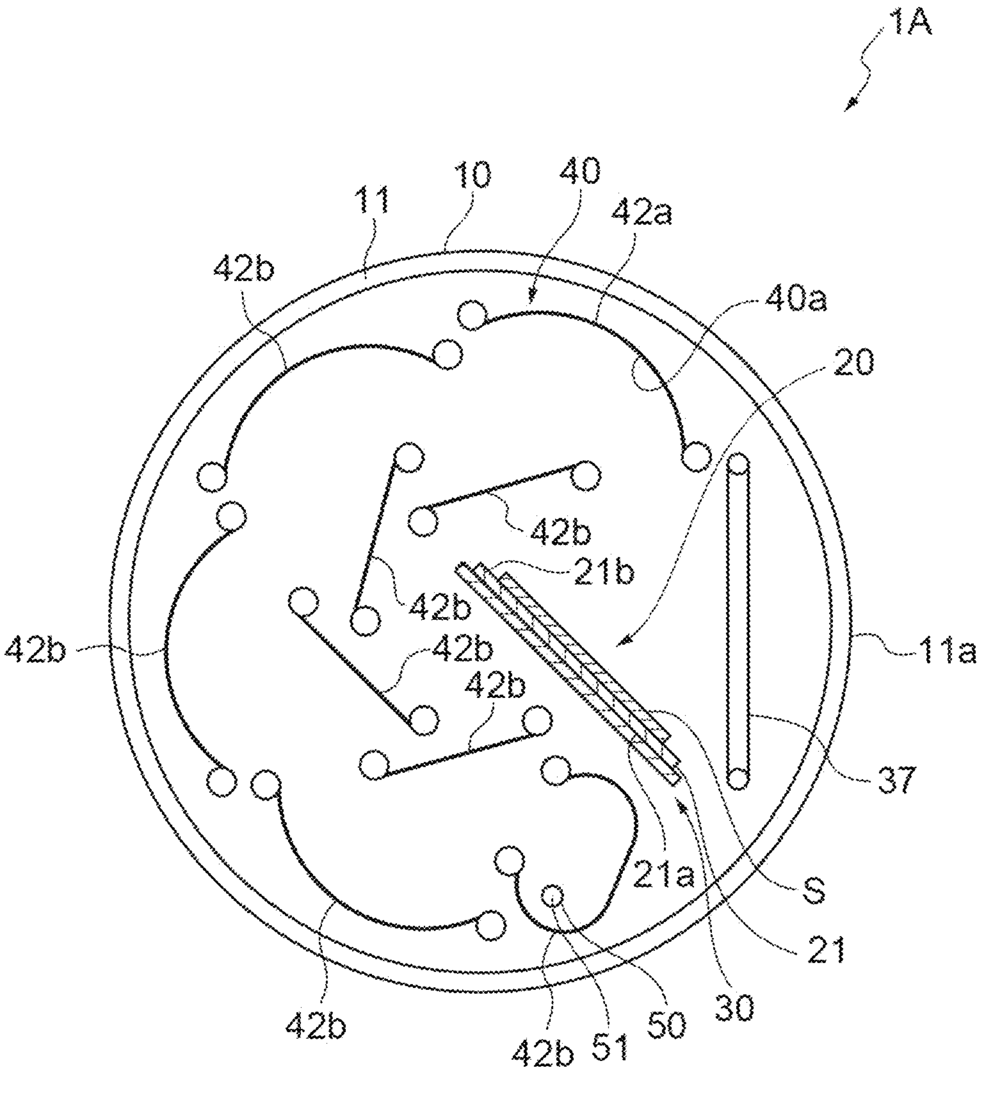
FIG. 24 is a cross-sectional view of an electron tube in a modification of the embodiment.

Next, an electron tube according to a modification of the embodiment will be described with reference to FIG. 24. FIG. 24 is a cross-sectional view illustrating an example of the electron tube. The modification illustrated in FIG. 24 is generally similar to or the same as the embodiment described above. However, the modification is different from the embodiment in that the window 11*a* is provided on a side surface of the housing 10, an incidence direction of the electromagnetic wave to the meta-surface S is different, and the electron multiplying unit 40 includes so-called circular-cage multistage dynodes. Hereinafter, a difference between the embodiment and the modification will be mainly described.

In an electron tube 1A illustrated in FIG. 24, the window 11*a* is provided on the side surface of the housing 10 having the circular cylindrical shape. In the electron tube 1A, the electron emitter 20 is also held by the holder 30. In the electron tube 1A, the principal surface 21*b* of the substrate 21 faces the window 11*a* and the incidence surface 40*a* of the electron multiplying unit 40. That is, the meta-surface S provided in the principal surface 21*b* faces the window 11*a* and the incidence surface 40*a* of the electron multiplying unit 40.

In the electron tube 1A, the meta-surface S of the electron emitter 20 is a reflective meta-surface. In the reflective meta-surface, when the electromagnetic wave is incident, the electron is emitted to the direction facing the surface on which the electromagnetic wave has been incident. In the electron tube 1A, the electromagnetic wave passed through the window 11*a* enters the meta-surface S provided on the principal surface 21*b* of the substrate 21 without passing through the substrate 21. The meta-surface S emits the electron in response to the electromagnetic wave incident thereon after passing through the window 11*a*.

The electron tube 1A includes a grid 37 between the meta-surface S and the window 11*a*. The electromagnetic wave passed through the window 11*a* passes through the grid 37 and is incident on the meta-surface S. A voltage is applied to the grid 37 through the wire 13. Due to an influence of an electric field caused by the grid 37, the electron emitted from the meta-surface S is guided to the incidence surface 40*a* of the electron multiplying unit 40.

The electron multiplying unit 40 of the electron tube 1A includes so-called circular-cage multistage dynodes 42*a* and 42*b*. The dynode 42*a* includes the incidence surface 40*a*. In this modification, the electron multiplying unit 40 includes nine stages of the dynodes 42*a* and 42*b*. Eight stages of the dynodes 42*b* are disposed in the rear stage of the dynode 42*a*. The dynodes 42*a* and 42*b* are provided around the electron emitter 20 along the side surface of the housing 10. A predetermined potential is applied to each of the dynodes 42*a* and 42*b* through the wire 13. The dynodes 42*a* and 42*b* multiply the incident electron according to the applied potential.

The electron collecting unit 50 of the electron tube 1A is surrounded by the curved dynode 42*b*. In this modification, the electron collecting unit 50 is the anode 51. One of the plurality of wires 13 is connected to the anode 51. A predetermined potential is applied to the anode 51 through the wire 13. The anode 51 catches the electrons multiplied by the dynodes 42*a* and 42*b*.

In the electron tube 1A illustrated in FIG. 24, if the electromagnetic wave passes through the window 11*a* of the housing 10, the electromagnetic wave passes through the grid 37 and is incident on the meta-surface S provided on the principal surface 21*b* of the substrate 21. The meta-surface S emits the electron in response to the incidence of the electromagnetic wave. The electron emitted from the meta-surface S is emitted to the incidence surface 40*a* of the electron multiplying unit 40 by the influence of the electric field caused by the grid 37.

The electron emitted from the meta-surface S is sent to the first stage dynode 42*a*. When the electron enters the first stage dynode 42*a* (incidence surface 40*a*), secondary electrons are emitted from the dynode 42*a* to the second stage dynode 42*b*. When the electrons enter the second stage dynode 42*b*, the secondary electrons are emitted from the dynode 42*b* to the third stage dynode 42*b*. As such, the electrons are successively sent to go around the substrate 21 while being multiplied from the first stage dynode 42*a* to the ninth stage dynode 42*b*. The electrons multiplied by the electron multiplying unit 40 are collected by the anode 51 which is the electron collecting unit 50, and are output as output signals from the anode 51 through the wire 13.

Figure 25:
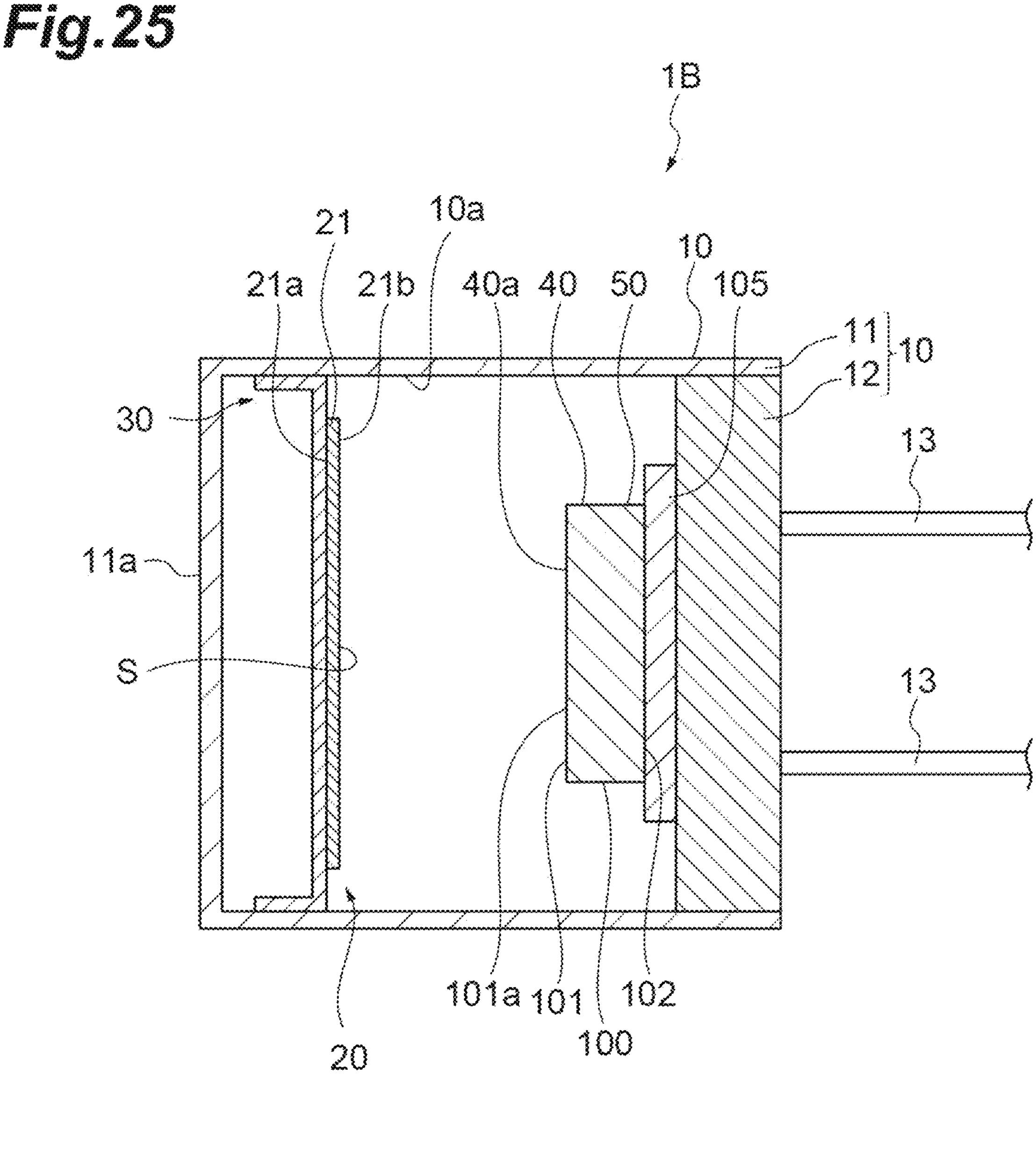
FIG. 25 is a cross-sectional view of an electron tube in a modification of the embodiment.

Next, an electron tube according to a modification of the embodiment will be described with reference to FIG. 25. FIG. 25 is a cross-sectional view illustrating an example of the electron tube. The modification illustrated in FIG. 25 is generally similar to or the same as the embodiment described above. However, the modification is different from the embodiment described above in that the electron multiplying unit 40 and the electron collecting unit 50 are integrally configured as the diode 100. Hereinafter, a difference between the embodiment described above and the modification will be mainly described.

In an electron tube 1B illustrated in FIG. 25, the electron multiplying unit 40 and the electron collecting unit 50 are the diode 100. In the electron tube 1B, the electron multiplying unit 40 and the electron collecting unit 50 are integrally configured. In the electron tube 1B, the meta-surface S faces the window 11*a*.

In this modification, the diode 100 is an avalanche diode. The diode 100 has a rectangular shape in plan view and includes a pair of principal surfaces 101 and 102 opposite to each other. The principal surface 101 includes an electron incidence surface 101*a*. The principal surface 101 faces the window 11*a* of the housing 10. The principal surface 102 faces the stein 12 of the housing 10. The principal surfaces 101 and 102 are disposed in parallel to the window 11*a*, the substrate 21, and the meta-surface S.

The principal surface 102 of the diode 100 is provided with an insulating layer 105. The diode 100 is connected to the stein 12 in such a matter that the insulating layer 105 is located between the diode 100 and the stein 12. One of the plurality of wires 13 is connected to each of the principal surface 101 and the principal surface 102.

A reverse bias voltage is applied to the diode 100 through the wire 13. In this modification, the reverse bias voltage higher than a breakdown voltage is applied between the side of the principal surface 101 (electron incidence surface 101*a*) of the diode 100 and the side of the principal surface 102 of the diode 100. In the electron tube 1B, when the electron emitted from the meta-surface S of the substrate 21 is incident on the electron incidence surface 101*a* of the diode 100, the incident electron is multiplied by avalanche multiplication in the inner portion of the diode 100. The multiplied electrons are output as output signals through the wire 13.

Figure 26:
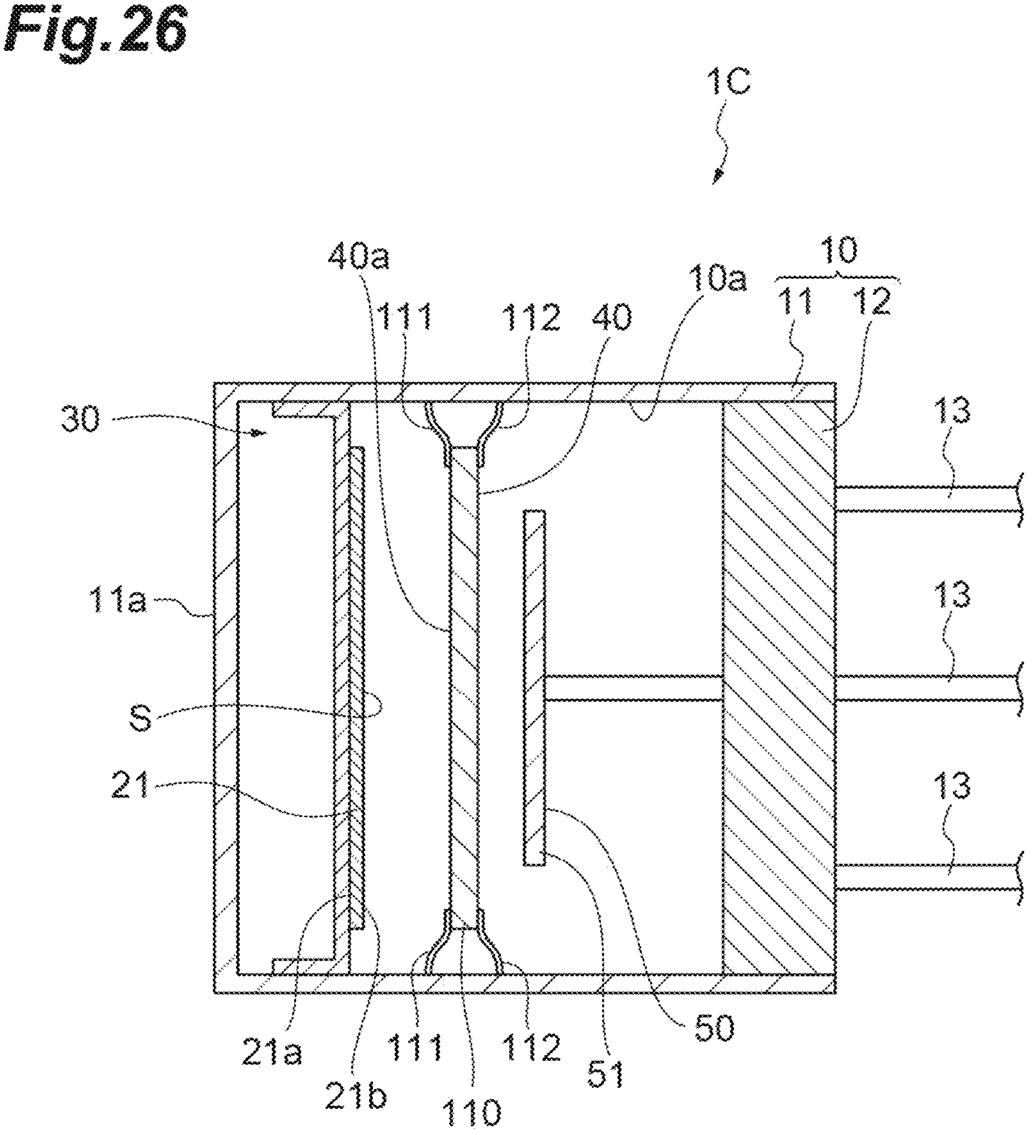
FIG. 26 is a cross-sectional view of an electron tube in a modification of the embodiment.
Figure 27:
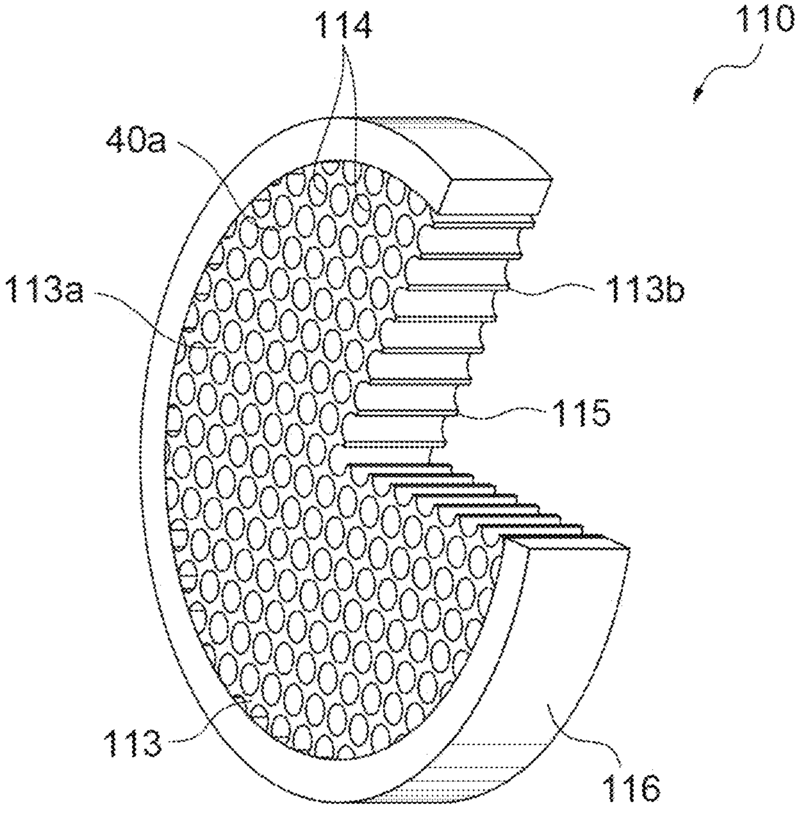
FIG. 27 is a perspective cutaway view of a microchannel plate.

Next, an electron tube according to a modification of the embodiment will be described with reference to FIGS. 26 and 27. FIG. 26 is a cross-sectional view illustrating an example of the electron tube. The modification illustrated in FIG. 27 is generally similar to or the same as the embodiment described above. However, the modification is different from the embodiment described above in that the electron multiplying unit 40 includes a microchannel plate 110 instead of the focusing electrode 41 and the plurality of dynodes 42*a* and 42*b*. Hereinafter, a difference between the embodiment described above and the modification will be mainly described.

In an electron tube 1C illustrated in FIG. 26, the microchannel plate 110 is supported by inner edges of attachment members 111 and 112 fixed to an inner wall of the valve 11. The microchannel plate 110 is disposed between the electron emitter 20 and the electron collecting unit 50. Specifically, the microchannel plate 110 is disposed between the substrate 21 provided with the meta-surface S and the anode 51. The microchannel plate 110 is spaced away from the substrate 21 and the anode 51. Even in the electron tube 1C, the electron collecting unit 50 may include a diode instead of the anode 51.

FIG. 27 is a perspective cutaway view of an example of the microchannel plate. In this modification, the microchannel plate 110 includes a base body 113, a plurality of channels 114, a partition wall portion 115, and a frame member 116, as illustrated in FIG. 27. The base body 113 includes an input surface 113*a* and an output surface 113*b* opposite to the input surface 113*a*. The base body 113 is formed in a disk shape. The input surface 113*a* faces the substrate 21. The output surface 113*b* faces the anode 51 which is the electron collecting unit 50. The input surface 113*a* and the output surface 113*b* are disposed in parallel to the window 11*a*, the substrate 21, and the meta-surface S. The anode 51 has a flat plate shape and is disposed in parallel to the output surface 113*b* of the microchannel plate 110.

The plurality of channels 114 is formed in the base body 113 from the input surface 113*a* to the output surface 113*b*. Specifically, each of the channels 114 extends from the input surface 113*a* to the output surface 113*b*, in a direction orthogonal to the input surface 113*a* and the output surface 113*b*. The plurality of channels 114 is disposed in a matrix shape in plan view. Each of the channels 114 has a circular cross-sectional shape. Between the plurality of channels 114, the partition wall portion 115 is provided. To function as an electron multiplier, the microchannel plate 110 includes a resistance layer and an electron emitting layer not illustrated in the drawings, on a surface of the partition wall portion 115 in the channels 114. The frame member 116 is provided on a peripheral edge portion of the input surface 113*a* and output surface 113*b* of the base body 113.

In the electron tube 1C, one of the plurality of wires 13 is connected to each of the attachment members 111 and 112. In the microchannel plate 110, a voltage is applied to the input surface 113*a* and the output surface 113*b* through the wire 13 and the attachment members 111 and 112. Specifically, potentials are applied to the input surface 113*a* and the output surface 113*b* so that the output surface 113*b* has a higher potential than the input surface 113*a*. When the electron emitted from the meta-surface S is incident on the input surface 113*a*, the electron is multiplied by the channels 114 and is emitted from the output surface 113*b*. The electrons multiplied by the microchannel plate 110 are collected by the anode 51 which is the electron collecting unit 50, and are output as output signals from the anode 51 through the wire 13.

Figure 28:
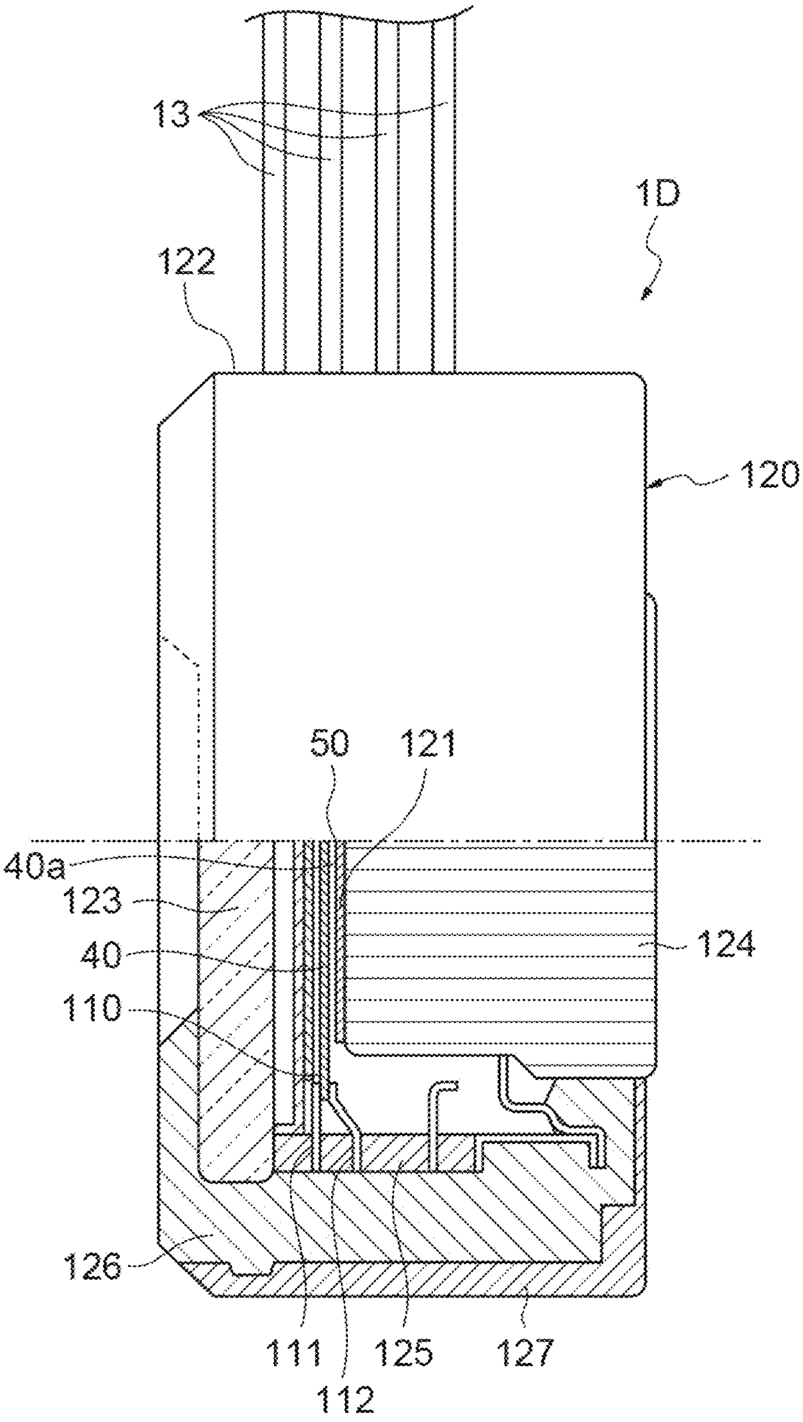
FIG. 28 is a partially cross-sectional view of an electron tube in a modification of the embodiment.
Figure 29:
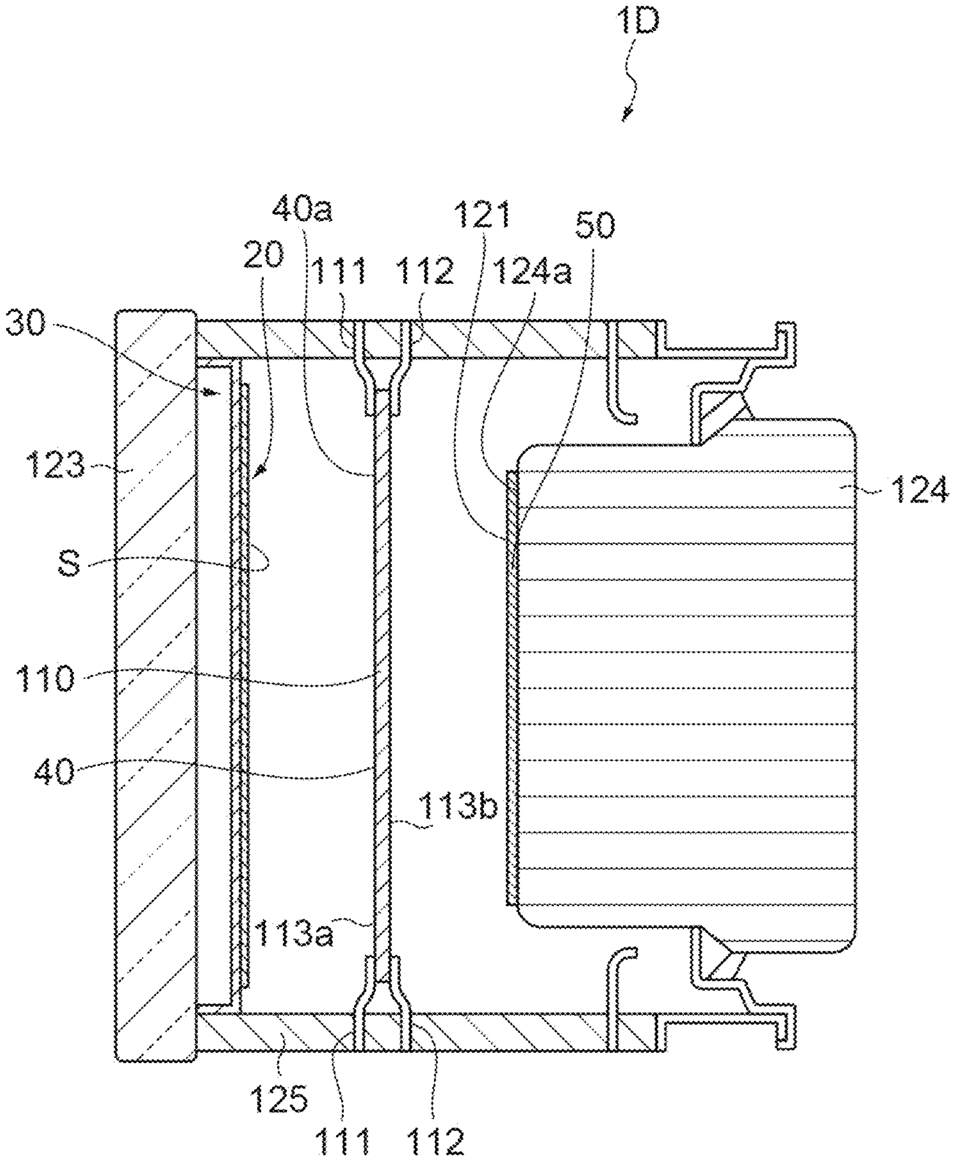
FIG. 29 is a cross-sectional view of an electron tube in a modification of the embodiment.

Next, an electron tube according to a modification of the embodiment will be described with reference to FIGS. 28 and 29. FIG. 28 is a partial cross-sectional view illustrating an example of the electron tube. FIG. 29 is a cross-sectional view illustrating a part of the electron tube illustrated in FIG. 28. The modification illustrated in FIGS. 28 and 29 is generally similar to or the same as the embodiment described above. However, the modification is different from the embodiment described above in that the electron tube is a so-called image intensifier. Hereinafter, a difference between the embodiment described above and the modification will be mainly described.

In an electron tube 1D illustrated in FIG. 28, the electron emitter 20, the electron multiplying unit 40, and the electron collecting unit 50 are disposed in a housing 120. Similar to the electron tube 1C illustrated in FIG. 26, in the electron tube 1D, the electron multiplying unit 40 includes the microchannel plate 110 instead of the focusing electrode 41 and the dynodes 42*a* and 42*b*. In the electron tube 1D, the electron collecting unit 50 includes a fluorescent body 121 instead of the anode 51. In the electron tube 1D, the meta-surface S, the microchannel plate 110, and the fluorescent body 121 are close to each other in the housing 120.

The housing 120 includes a sidewall 122, an incidence window 123 (window 11*a*), and an emission window 124. The sidewall 122 has a hollow cylindrical shape. Each of the incidence window 123 and the emission window 124 has a disk shape. An inner portion of the housing 120 is held in a vacuum by airtightly sealing both ends of the sidewall 122 with the incidence window 123 and the emission window 124. For example, the inner portion of the housing 120 is held at $1\times10^{-5}$ to $1\times10^{-7}$ Pa.

The sidewall 122 includes a side tube 125, a mold member 126 covering a side portion of the side tube 125, and a case member 127 covering a side portion and a bottom portion of the mold member 126, for example. Each of the side tube 125, the mold member 126, and the case member 127 has a hollow circular cylindrical shape. The side tube 125 is made of, for example, ceramic. The mold member 126 is made of, for example, silicone rubber. The case member 127 is made of, for example, ceramic.

A through-hole is formed in each of both ends of the mold member 126. One end of the case member 127 is opened. The other end of the case member 127 is provided with a through-hole. The through hole of the case member 127 includes an edge located to fully overlap an edge position of one through-hole of the mold member 126. At one end of the mold member 126, the incidence window 123 is joined to a surface around the through-hole of the mold member 126.

Similar to the window 11*a* of the electron tube 1, the incidence window 123 transmits an electromagnetic wave. Similar to the window 11*a* of the electron tube 1, the incidence window 123 includes at least one selected from quartz, silicon, germanium, sapphire, zinc selenide, zinc sulfide, magnesium fluoride, lithium fluoride, barium fluoride, calcium fluoride, magnesium oxide, and calcium carbonate.

In the electron tube 1D, the electron emitter 20 having the meta-surface S is held by the holder 30, and is disposed in the housing 120. In the housing 120, conductive layers spaced away from each other are disposed in the inner surface of the housing 120, and are in contact with the holder 30. Therefore, in the electron tube 1D, potentials different from each other can be applied to the first electrode 81 and the second electrode 82 of the electron emitter 20.

In the electron tube 1D, the meta-surface S faces the microchannel plate 110 which is the electron multiplying unit 40. The microchannel plate 110 is disposed between the meta-surface S and the fluorescent body 121. The microchannel plate 110 is spaced away from the meta-surface S and the fluorescent body 121.

At the other end side of the mold member 126, the emission window 124 is fitted into the other through-hole of the mold member 126. The emission window 124 is, for example, a fiber plate configured by gathering a large number of optical fibers in a plate shape. Each of the optical fibers of the fiber plate is configured such that an end surface 124*a* of the inner side of the housing 120 flushes with each optical fiber. The end surface 124*a* is disposed in parallel to the meta-surface S.

The fluorescent body 121 is disposed on the end surface 124*a*. The fluorescent body 121 is formed by applying a fluorescent material to the end surface 124*a*, for example. The fluorescent material is, for example, (ZnCd)S:Ag (zinc sulfide cadmium doped with silver). On the surface of the fluorescent body 121, a metal back layer and a low electron reflectance layer are sequentially stacked. For example, the metal back layer is formed by evaporation of Al, has relatively high reflectance for light passed through the microchannel plate 110, and has relatively high transmittance for the electrons emitted from the microchannel plate 110. Further, the low electron reflectance layer is formed by evaporation of, for example, C (carbon), Be (beryllium), or the like, and has relatively low reflectance for the electrons emitted from the microchannel plate 110.

Similar to the electron tube 1C, in the electron tube 1D, one of the plurality of wires 13 extending to the outside of the housing 120 is connected to each of the attachment members 111 and 112 holding the microchannel plate 110. In the microchannel plate 110, a voltage is applied to the side of the input surface 113*a* and the side of the output surface 113*b* through the attachment members 111 and 112.

When the electron emitted from the meta-surface S is incident on the input surface 113*a*, the electron is multiplied by the channels 114 and is emitted from the output surface 113*b*. In the electron tube 1D, the electrons multiplied by the microchannel plate 110 are collected in the fluorescent body 121. The fluorescent body 121 receives the electrons multiplied by the microchannel plate 110 and emits light. The light emitted from the fluorescent body 121 passes through the fiber plate and is emitted from the emission window 124 to the outside of the housing 120.

Figure 30:
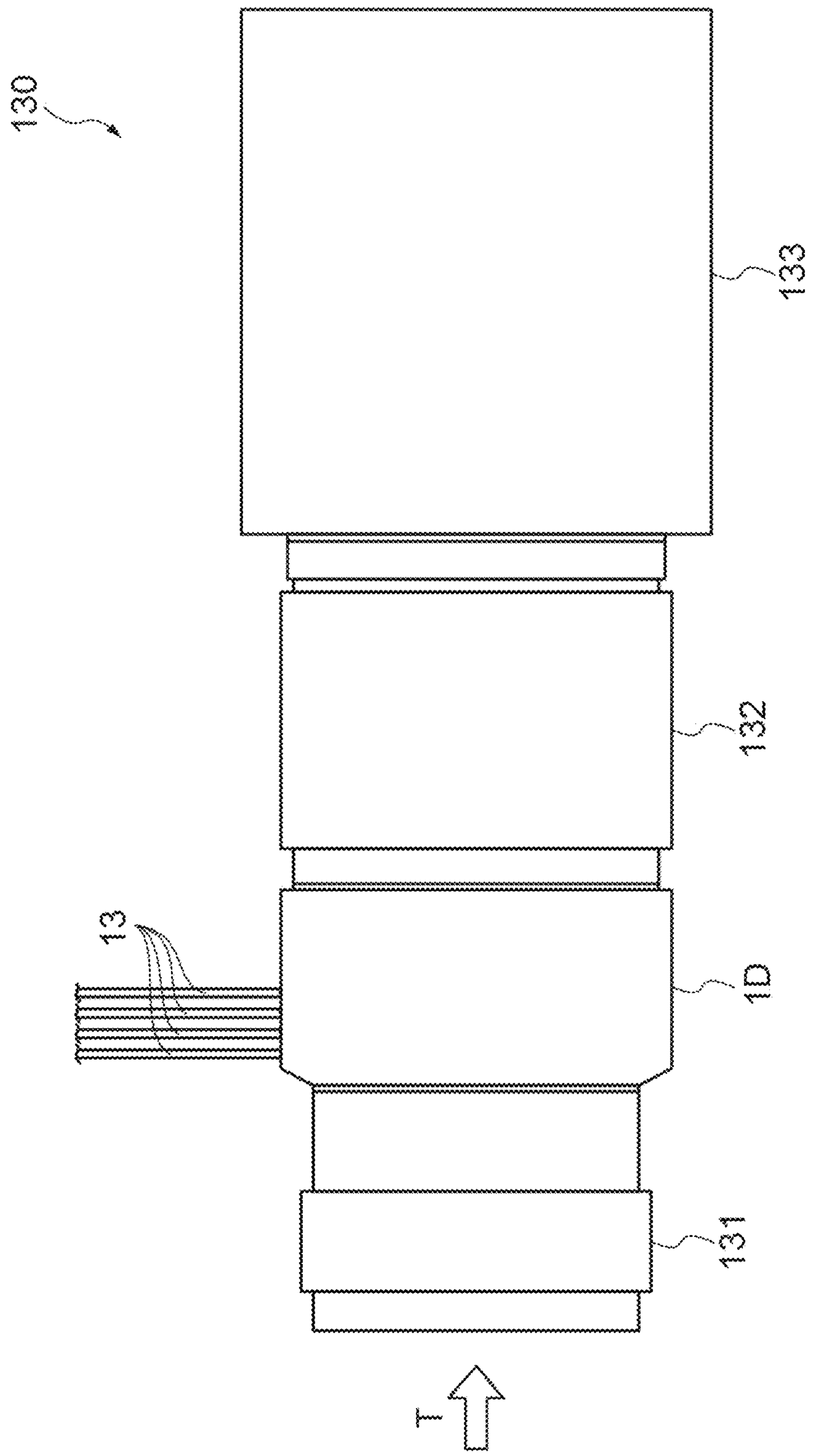
FIG. 30 is a side view of an imaging device in a modification of the embodiment.

Next, an imaging device including an electron tube according to a modification of the embodiment will be described with reference to FIG. 30. FIG. 30 is a side view of the imaging device. An imaging device 130 illustrated in FIG. 30 acquires an image based on an electromagnetic wave emitted from an observation target or an electromagnetic wave reflected or scattered by the observation target. The imaging device 130 includes the electron tube 1D which is an image intensifier, an objective lens 131, a relay lens 132, and an imaging unit 133 as components. In the imaging device 130, the components are joined in the order of the objective lens 131, the electron tube 1D, the relay lens 132, and the imaging unit 133.

The objective lens 131 includes a lens having a refractive index in the electromagnetic wave incident on the electron tube 1D. The objective lens 131 guides an electromagnetic wave T from the observation target to the incidence window 123 of the electron tube 1D. The relay lens 132 guides the light emitted from the emission window 124 of the electron tube 1D to the imaging unit 133. The imaging unit 133 captures an image based on the light guided from the relay lens 132, that is, the light emitted from the fluorescent body 121. The imaging unit 133 is, for example, a CCD camera.

Figure 31:
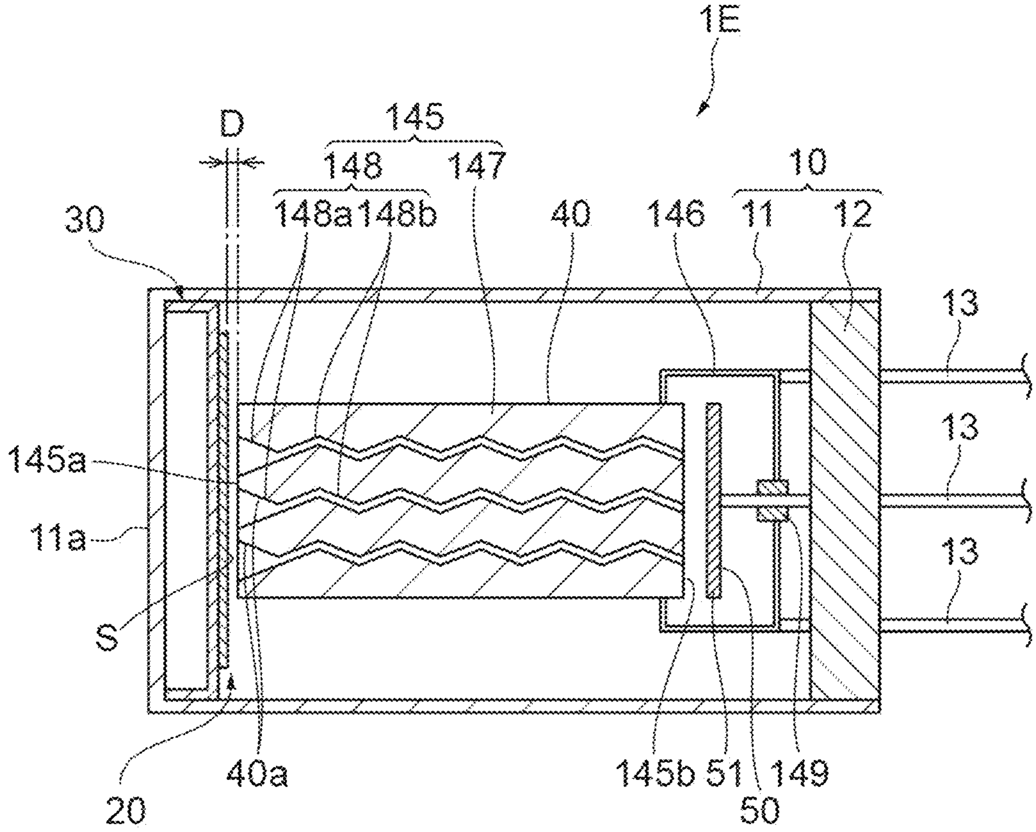
FIG. 31 is a cross-sectional view of an electron tube in a modification of the embodiment.

Next, an electron tube according to a modification of the embodiment will be described with reference to FIG. 31. FIG. 31 is a partially cross-sectional view illustrating an example of the electron tube. The modification illustrated in FIG. 31 is generally similar to or the same as the embodiment described above. However, the modification is different from the embodiment described above in that the electron multiplying unit 40 includes an electron multiplying body 145 instead of the focusing electrode 41 and the dynodes 42*a* and 42*b*. Hereinafter, a difference between the embodiment described above and the modification will be mainly described. The electron multiplying body 145 is a so-called channel electron multiplier (CEM).

In an electron tube 1E illustrated in FIG. 31, the electron multiplying body 145 is supported by a supporting member 146 fixed to an inner wall of the valve 11. The electron multiplying body 145 is disposed between the electron emitter 20 and the electron collecting unit 50. Specifically, the microchannel plate 110 is disposed between the window 11*a* provided with the meta-surface S and the anode 51. The electron multiplying body 145 is spaced away from the window 11*a* and the anode 51. Even in the electron tube 1E, the electron collecting unit 50 may include a diode instead of the anode 51.

In this modification, the electron multiplying body 145 includes an input surface 145*a* and an output surface 145*b* opposite to the input surface 145*a*. The input surface 145*a* faces the window 11*a*. The output surface 145*b* faces the anode 51 which is the electron collecting unit 50. The input surface 145*a* and the output surface 145*b* are disposed in parallel to the window 11*a* and the meta-surface S. The anode 51 has a flat plate shape and is disposed in parallel to the output surface 145*b* of the electron multiplying body 145. In the embodiment, a distance D between the input surface 145*a* and the meta-surface S is, for example, 0.615 mm, in a direction orthogonal to the input surface 145*a*.

The electron multiplying body 145 includes a main body portion 147 and a plurality of channels 148. The main body portion 147 has a rectangular parallelepiped shape. The plurality of channels 148 is defined by the main body portion 147. Each of the channels 148 is formed from the input surface 145*a* to the output surface 145*b*. Specifically, each of the channels 148 extends from the input surface 145*a* to the output surface 145*b*, in a direction orthogonal to the input surface 145*a* and the output surface 145*b*. In the configuration illustrated in FIG. 31, three channels 148 are distributed in one direction parallel to the input surface 145*a*.

Each of the channels 148 includes an electron incidence portion 148*a* and a multiplication portion 148*b*. The electron incidence portion 148*a* of each of the channels 148 has an opening provided on the input surface 145*a*. The opening of the electron incidence portion 148*a* has a rectangular shape, as seen from a direction orthogonal to the input surface 145*a*. The electron incidence portion 148*a* gradually narrows in an arrangement direction of the plurality of channels 148, from the input surface 145*a* to the output surface 145*b*. That is, the electron incidence portion 148*a* has a tapered shape the diameter of which decreases along the direction orthogonal to the input surface 145*a*.

The multiplication portion 148*b* of each of the channels 148 is formed in a zigzag shape or a wave shape, as seen from a direction parallel to the input surface 145*a* and orthogonal to an arrangement direction of the plurality of channels 148. In other words, the multiplication portion 148*b* has a shape repeating bends, in an arrangement direction of the plurality of channels 148.

In the electron tube 1E, two of the plurality of wires 13 are connected to the supporting member 146. A voltage is applied to the electron multiplying body 145 through the wires 13 and the supporting member 146. Specifically, potentials are applied to the input surface 145*a* and the output surface 145*b* so that the output surface 145*b* has a higher potential than the input surface 145*a*. A wire 13 different from the wires 13 connected to the supporting member 146 is connected to the anode 51. The supporting member 146 and the anode 51 are electrically insulated from each other, by an insulating member 149.

The electrons emitted from the meta-surface S enter the opening of the input surface 145*a* of any of the channels 148, and thereafter enter the multiplication portion 148*b* through the electron incidence portion 148*a*. As a result of this, the electrons emitted from the meta-surface S are multiplied by the channels 148 and are emitted from the output surface 145*b*. The electrons multiplied by the electron multiplying body 145 are collected by the anode 51 which is the electron collecting unit 50, and are output as output signals from the anode 51 through the wire 13.

Figure 32:
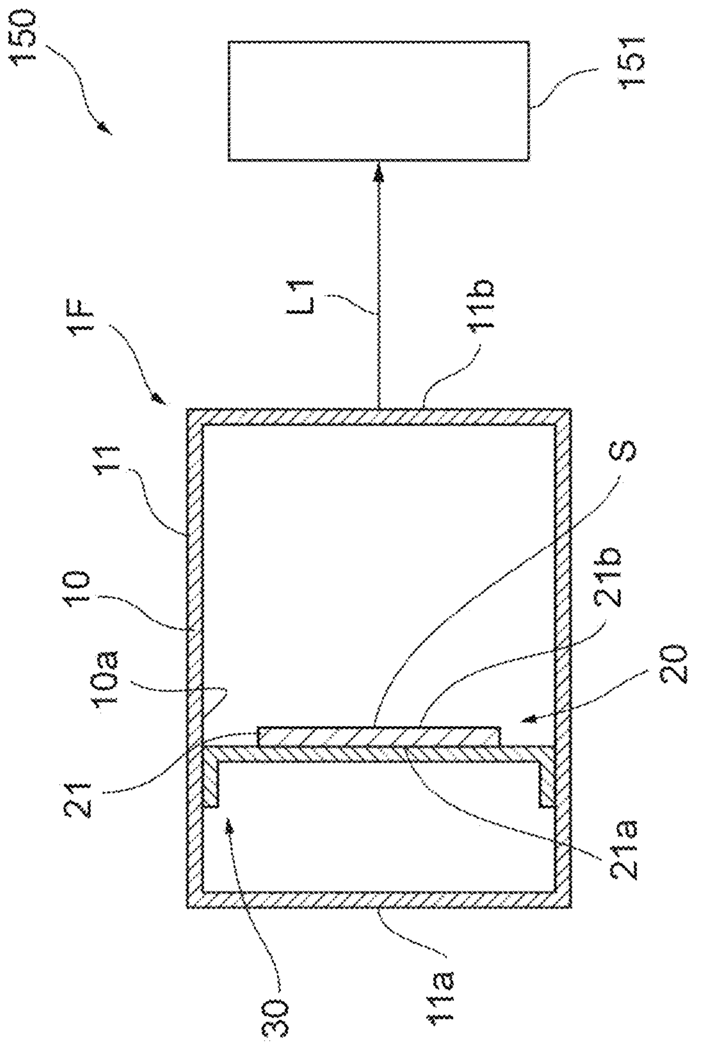
FIG. 32 is a cross-sectional view of an electromagnetic wave detection device in a modification of the embodiment.

Next, an electromagnetic wave detection device according to a modification of the embodiment will be described with reference to FIG. 32. FIG. 32 is a schematic view illustrating an example of the electromagnetic wave detection device. An electron tube of the modification illustrated in FIG. 32 is generally similar to or the same as the embodiment described above. However, the electron tube of the modification is different from the embodiment described above in that the electron tube is configured to house a gas and detect light due to light emission of the electron from the electron emitter. Hereinafter, a difference between the embodiment described above and the modification will be mainly described.

An electromagnetic wave detection device 150 illustrated in FIG. 32 includes an electron tube 1F, and a light detector 151. The electron tube IF houses a gas in an inner portion of the housing 10. The housing 10 is sealed in a state of housing the gas. The gas housed in the housing 10 is excited by the electron emitted from the electron emitter 20 and emits light. The gas housed in the housing 10 includes, for example, air, argon gas, or nitrogen gas. In the modification, the gas housed in the housing 10 is the nitrogen gas and emits ultraviolet light due to the electron emitted from the electron emitter 20.

In the electron tube 1F, the housing 10 has a window 11*b* in addition to the window 11*a*. The window 11*b* transmits light L1 generated by the light emission of the gas. In the embodiment, the window 11*b* is disposed to face the principal surface 21*b* of the electron emitter 20. In the modification, the light L1 is the ultraviolet light, and the window 11*b* transmits the ultraviolet light. A material of the window 11*b* includes, for example, quarts.

The light detector 151 detects the light L1 passed through the window 11*b*. In other words, the light detector 151 detects the light L1 generated due to the light emission of the gas. The electromagnetic wave incident on the meta-surface S is detected by referring to a result of detection in the light detector 151.

As described above, in the electron tubes 1, 1A, 1B, 1C, 1D, 1E and 1F, the electron emitter 20 having the meta-surface S is held in the housing 10 sealed by the holder 30. The first conductive line 83 included in the meta-surface S is electrically connected to the first electrode 81, and the second conductive line 84 included in the meta-surface S is electrically connected to the second electrode 82. In the electron tube 1, 1A, 1B, 1C, 1D, 1E and 1F, by applying the potentials different from each other to the first electrode 81 and the second electrode 82, it is possible to achieve improvement or suppression of the electron emission in the meta-surface S in response to the electromagnetic wave incident from the window 11*a*. Therefore, by using the electron tubes 1, 1A, 1B, 1C, 1D, 1E and 1F and observing the electron emitted from the electron emitter 20, the detection accuracy of the electromagnetic wave incident on the electron tube 1, 1A, 1B, 1C, 1D, 1E and 1F can be ensured.

The holder 30 has the conductive terminals 33 and 34 spaced away from each other. The first electrode 81 is electrically connected to the conductive terminal 33. The second electrode 82 is electrically connected to the conductive terminal 34. In this case, a voltage can be applied to the electron emitter 20 through the holder 30. Therefore, it is possible to achieve reduction of the number of parts of the electron tubes 1, 1A, 1B, 1C, 1D, 1E and 1F and compactification of the electron tubes 1, 1A, 1B, 1C, 1D, 1E and 1F.

The housing 10 has the conductive layers 15 and 16 provided in the inner surface 10*a* of the housing 10. The conductive layers 15 and 16 are spaced away from each other. The conductive terminal 33 is in contact with the conductive layer 15. The conductive terminal 34 is in contact with the conductive layer 16. In this case, potentials can be applied to the conductive terminal 33 and the conductive terminal 34 by the conductive layers 15 and 16 provided in the inner surface 10*a* of the housing 10. Therefore, it is possible to achieve compactification of the electron tubes 1, 1A, 1B, 1C, 1D, 1E and 1F.

The holder 30 has the plurality of springs 74*d* and 75*d*. The plurality of springs 74*d* and 75*d* positions the holder 30 for the housing 10 by applying an energizing force to the inner surface 10*a* of the housing 10. The plurality of springs 74*d* and 75*d* includes at least one of the conductive terminal 33 and the conductive terminal 34. In this case, in spite of any deformation due to a certain amount of manufacturing error or a change in temperature in each of the members of the electron tubes 1, 1A, 1B, 1C, 1D, 1E and 1F, the holder 30 is stably held to the housing 10. The potential can be applied to the electron emitter through the springs 74*d* and 75*d*.

The holder 30 includes the holding body 70 and the contact electrode 65. The holding body 70 is in contact with the electron emitter 20 and has the penetration opening 31. The contact electrode 65 is spaced away from the frame member 72 and is in contact with one of the first electrode 81 and the second electrode 82. The meta-surface S and the one being in contact with the contact electrode 65 are exposed from the penetration opening 31, and are spaced away from the edge of the penetration opening 31. In this case, the one being in contact with the contact electrode 65 is prevented from being in contact with the holding body 70. Therefore, a desired electrical connection structure can be achieved between the first electrode 81 and the second electrode 82, and the holder 30. For example, it is possible to easily achieve a configuration in which the one being in contact with the contact electrode 65 is insulated from the holding body 70. In the embodiment described above, the contact electrode 65 is in contact with the first electrode 81. The first electrode 81 being in contact with the contact electrode 65 and the meta-surface S are exposed from the penetration opening 31, and are spaced away from the edge of the penetration opening 31.

In the configuration illustrated in FIG. 20A, two contact electrodes 65, illustrated in FIG. 6, are spaced away from each other, and are respectively in contact with the first electrode 81 and the second electrode 82. The first electrode 81, the second electrode 82 and the meta-surface S are exposed from the penetration opening 31, and are spaced away from the edge of the penetration opening 31. Therefore, it is possible to easily achieve the configuration in which the first electrode 81 and the second electrode 82 being in contact with each of the contact electrodes 65 are insulated from the holding body 70.

At least one of the first electrode 81 and the second electrode 82 is spaced away from the entire edges 21*c*, 21*d*, 21*e* and 21*f* of the principal surface 21*b*. The contact between the holder 30 and at least one of the first electrode 81 and the second electrode 82 can be easily prevented as long as being spaced away from the entire edge of the principal surface 21*b*. Therefore, a desired electrical connection structure can be achieved between the holder 30 and the first and second electrodes 81, 82 with a simple configuration. For example, an insulation property to the holder 30 can be ensured for at least one of the first electrode 81 and the second electrode 82.

The holder 30 has the base member 71 and the intermediate member 73 functioning as the energizing member. The base member 71 is in contact with the principal surface 21*a*. The intermediate member 73 is in contact with the edge of the principal surface 21*b* and elastically energizes the electron emitter 20 to the base member 71. The intermediate member 73 is electrically connected to the second electrode 82. In this case, in spite of any deformation due to a certain amount of manufacturing error or a change in temperature in each of the members of the electron tubes 1, 1A, 1B, 1C, 1D, 1E and 1F, the electron emitter 20 is stably held to the base member 71. The voltage can be applied to the electron emitter 20 through the intermediate member 73.

The second conductive line 84 includes the antenna portion 85 emitting the electron in response to the incidence of the electromagnetic wave. The first conductive line 83 includes the bias portion 87 generating the electric field between the bias portion 87 and the antenna portion 85 when the bias potential is applied to the first electrode 81. In this case, the potential can be tilted around the antenna portion 85. Therefore, the electron emission in the meta-surface S can be improved or suppressed.

The first conductive line 83 includes the first end portion 83*a* being in contact with the first electrode 81 and the second end portion 83*b* electrically connected to the first end portion 83*a*. The second conductive line 84 includes the third end portion 84*a* being in contact with the second electrode 82 and the fourth end portion 84*b* electrically connected to the third end portion 84*a*. The second end portion 83*b* is disposed closer to the fourth end portion 84*b* than all parts other than the second end portion 83*b* of the first conductive line 83. In this case, the intensity of the electric field generated between the second end portion 83*b* and the fourth end portion 84*b* is improved, and the potential is further tilted around the antenna portion 85. Therefore, the electron emission in the meta-surface S can be improved or suppressed.

The second conductive line 84 includes the linear portion 84*d* extending on a virtual straight line extending from the fourth end portion 84*b*. The second end portion 83*b* is positioned on the virtual straight line. In this case, the electron emitted in the fourth end portion 84*b* hits against the second end portion 83*b* and is amplified. Therefore, the electron emission in the meta-surface S is improved.

The second end portion 83*b* may not be positioned on the virtual straight line as illustrated in FIG. 16. In this case, the amplification of the electron emitted in the fourth end portion 84*b*, caused by the second end portion 83*b*, is suppressed. As a result, the electron at an amount depending on the electromagnetic wave passed through the window 11*a* is emitted from the meta-surface S. Therefore, the amplitude of the electromagnetic wave passed through the window 11*a* can be more accurately detected.

The electron tubes 1, 1A, 1B, 1C, 1D and 1E include the electron multiplying unit 40 and the electron collecting unit 50. The electron multiplying unit 40 is disposed in the housing 10 and multiplies the electron emitted from the electron emitter 20. The electron collecting unit 50 is disposed in the housing 10 and collects the electrons multiplied by the electron multiplying unit 40. The housing 10 is internally held in a vacuum. In this case, the electron emitted from the electron emitter 20 is collected in the electron collecting unit 50 after being amplified in the electron multiplying unit 40. Therefore, in spite of a compact structure, the detection accuracy can be ensured for the electromagnetic wave which is incident from the window 11*a*.

In the electron tube 1B, the electron multiplying unit 40 and the electron collecting unit 50 are the diode 100 and are integrally configured. In this case, the size of the electron tube can be further reduced.

In the electron tubes 1 and 1A, the electron multiplying unit 40 has the plurality of dynodes 42*a* and 42*b* spaced away from each other. The electron collecting unit 50 has the anode 51 or the diode arranged to collect the electrons multiplied by the electron multiplying unit 40. In this case, the electron emitted from the meta-surface S is multiplied by the plurality of dynodes 42*a* and 42*b*. Therefore, a multiplication factor of the electrons collected by the anode 51 or the diode is improved.

In the electron tube 1C, the electron multiplying unit 40 has the microchannel plate 110. The electron collecting unit 50 has the anode 51 or the diode 100 arranged to collect the electrons multiplied by the electron multiplying unit 40. In this case, a size, a weight, and power consumption are reduced and a response speed and a gain are improved, as compared with a case where the plurality of dynodes is used for the electron multiplying unit 40.

In the electron tube 1D, the electron collecting unit 50 has the fluorescent body 121 which receives the electrons multiplied by the electron multiplying unit 40 and emits light. In this case, two-dimensional positions of the electron emitted from the meta-surface S can be detected by the light emitted from the fluorescent body 121.

The imaging device 130 includes the electron tube 1D and the imaging unit 133 which captures an image based on the light from the fluorescent body 121. As a result of this, detection accuracy of the electromagnetic wave described above is ensured.

Although the embodiment and the modifications of the present invention have been described, the present invention is not necessarily limited to the embodiment and the modifications and various changes can be made without departing from the gist thereof.

For example, in the embodiment, the holder 30 has been described as the configuration having the intermediate member 73. However, the holder 30 may be configured so that a plurality of energizing portions 73*d* extends from an edge of the flat plate portion 71*c* of the base member 71. In this case, the plurality of energizing portions 73*d* may be formed to bend in a direction in parallel to the principal surface 21*b* after extending close to the principal surface 21*b* of the electron emitter 20 from the edge of the flat plate portion 71*c* of the base member 71. Even in this case, the plurality of energizing portions 73*d* is elastically in contact with the edge of the principal surface 21*b* and energize the electron emitter 20 to the flat plate portion 71*c* of the base member 71.

In the electron tube 1, the electron collecting unit 50 may have a diode instead of the anode 51. In this case, the electrons multiplied by the electron multiplying unit 40 are collected by the diode.

The shapes of the housings 10 and 120 are not limited to the circular cylindrical shape. For example, the housings 10 and 120 may have a tubular shape with a polygonal cross-section.

In the electron tube 1C, a sweep electrode may be disposed between the meta-surface S and the microchannel plate 110. As a result, a so-called streak tube may be configured. In this case, a slit arranged to cause measured light to be incident thereon and a lens system arranged to capture a slit image may be disposed outside the window 11*a* of the electron tube 1C functioning as the streak tube. As a result, a so-called streak camera may be configured.

In the imaging device 130, the electrons multiplied by the microchannel plate 110 in the electron tube 1D are collected in the fluorescent body 121, and the light emitted from the fluorescent body 121 is arranged to be captured by the imaging unit 133 disposed outside the electron tube 1E. In this regard, the electron tube may be configured to function as the imaging device by providing an electron-bombarded solid-state image sensor, instead of the fluorescent body 121, as the electron collecting unit 50 in the inner portion of the electron tube. In this case, the electrons multiplied by the microchannel plate 110 can be arranged to be captured by the electron-bombarded solid-state image sensor without providing the imaging unit 133 outside the electron tube. The electron-bombarded solid-state image sensor is, for example, an electron-bombarded charge-coupled Device (EBCCD).

REFERENCE SIGNS LIST

1, 1A, 1B, 1C, 1D, 1E, 1F electron tube
10, 120 housing
10*a* inner surface
11*a*, 11*b* window
20 electron emitter
21 substrate
21*c*, 21*d*, 21*e*, 21*f* edge
30 holder
31 penetration opening
40 electron multiplying unit
42*a*, 42*b* dynode
50 electron collecting unit
51 anode
70 holding body
71 base member
74*d*, 75*d* spring
81 first electrode
82 second electrode
83 first conductive line
83*a* first end portion
83*b* second end portion
83*c*, 83*d*, 84*c*, 84*d* linear portion
84 second conductive line
84*a* third end portion
84*b* fourth end portion
85 antenna portion
87 bias portion
100 diode
110 microchannel plate
121 fluorescent body
130 imaging device
133 imaging unit
150 electromagnetic wave detection device
151 light detector
F2, F3 energizing force
S meta-surface
R1, R2, R3 virtual straight line

The invention claimed is:

1. An electron tube comprising:

a housing sealed and including a window transmitting an electromagnetic wave;

an electron emitter disposed in the housing and including an electron- emission surface, a first electrode, and a second electrode, the electron-emission surface arranged to emit an electron in response to incidence of the electromagnetic wave, the first electrode and the second electrode being spaced away from each other and respectively arranged to apply potentials different from each other to the electron-emission surface; and a holder disposed in the housing and holding the electron emitter, wherein the electron-emission surface includes a first conductive line and a second conductive line at least partially disposed on the electron-emission surface, the first conductive line and the second conductive line being coupled with each other to emit an electron in response to incidence of the electromagnetic wave, the first conductive line being electrically connected to the first electrode, and the second conductive line spaced away from the first conductive line and electrically connected to the second electrode, the first conductive line extends from the first electrode toward the second conductive line, and the second conductive line extends from the second electrode toward the first conductive line.

2. The electron tube according to claim 1, wherein the holder includes a first conductive terminal and a second conductive terminal that are spaced away from each other, the first electrode is electrically connected to the first conductive terminal, and the second electrode is electrically connected to the second conductive terminal.

3. The electron tube according to claim 2, wherein the housing includes a first conductive layer and a second conductive layer that are provided on an inner surface of the housing, the first conductive layer and the second conductive layer are spaced away from each other, the first conductive terminal is in contact with the first conductive layer, and the second conductive terminal is in contact with the second conductive layer.

4. The electron tube according to claim 2, wherein the holder includes a plurality of springs arranged to apply energizing force to the inner surface of the housing, the spring positioning the holder with respect to the housing due to the energizing force, and the plurality of springs includes at least one of the first conductive terminal and the second conductive terminal.

5. The electron tube according to claim 1, wherein the holder includes a holding body having a penetration opening and being in contact with the electron emitter, and a contact electrode being in contact with one of the first electrode and the second electrode and being spaced away from the holding body, and the electron-emission surface and the one being in contact with the contact electrode are exposed from the penetration opening and are spaced away from an edge of the penetration opening.

6. The electron tube according to claim 1, wherein the electron emitter includes a substrate having a first principal surface and a second principal surface that face each other, and the electron-emission surface is provided on the first principal surface.

7. The electron tube according to claim 6, wherein at least one of the first electrode and the second electrode is spaced away from an entire edge of the first principal surface.

8. The electron tube according to claim 6, wherein the holder includes a base member being in contact with the second principal surface and the energizing member being in contact with an edge of the first principal surface and being arranged to energize the electron emitter to the base member, and the energizing member electrically connects the second electrode.

9. The electron tube according to claim 1, wherein one of the first electrode and the second electrode is an electrode arranged to connect a ground.

10. The electron tube according to claim 1, wherein one of the first conductive line and the second conductive line includes an antenna portion arranged to emit an electron in response to incidence of the electromagnetic wave and a bias portion arranged to generate an electric field with the other of the first conductive line and the second conductive line.

11. The electron tube according to claim 1, wherein the second conductive line is arranged to emit an electron in response to incidence of the electromagnetic wave when a bias potential is applied to the first electrode, and/or the first conductive line is arranged to emit an electron in response to incidence of the electromagnetic wave when a bias potential is applied to the second electrode.

12. The electron tube according to claim 1, wherein the second conductive line includes an antenna portion arranged to emit an electron in response to incidence of the electromagnetic wave, and the first conductive line includes a bias portion arranged to generate an electric field with the antenna portion when a bias potential is applied to the first electrode.

13. The electron tube according to claim 1, wherein the first conductive line includes a first end portion being in contact with the first electrode, and a second end portion electrically connecting the first end portion, the second conductive line includes a third end portion being in contact with the second electrode, and a fourth end portion electrically connecting the third end portion, and the second end portion is disposed closer to the fourth end portion than all parts other than the second end portion in the first conductive line.

14. The electron tube according to claim 13, wherein the second conductive line includes a linear portion extending on a virtual straight line extending from the fourth end portion, and the second end portion is located on the virtual straight line.

15. The electron tube according to claim 13, wherein the second conductive line includes a linear portion extending on a virtual straight line extending from the fourth end portion, and the second end portion is not located on the virtual straight line.

16. The electron tube according to claim 1, further comprising:

an electron multiplying unit disposed in the housing and arranged to multiply the electron emitted from the electron emitter; and an electron collecting unit disposed in the housing and arranged to collect electrons multiplied by the electron multiplying unit, wherein an inner portion of the housing is held at a pressure lower than an atmospheric pressure, in particular, the inner portion of the housing is held at $1\times10^{-4}$ to $1\times10^{-7}$ Pa.

17. The electron tube according to claim 16, wherein the electron multiplying unit and the electron collecting unit are a diode and are integrally configured.

18. The electron tube according to claim 16, wherein the electron multiplying unit includes a plurality of dynodes spaced away from each other, and the electron collecting unit includes an anode or a diode arranged to collect the electrons multiplied by the electron multiplying unit.

19. The electron tube according to claim 16, wherein the electron multiplying unit includes a microchannel plate, and the electron collecting unit includes an anode or a diode arranged to collect the electrons multiplied by the electron multiplying unit.

20. The electron tube according to claim 16, wherein the electron multiplying unit includes a microchannel plate, and the electron collecting unit includes a fluorescent body arranged to receive the electrons multiplied by the electron multiplying unit and emit light.

21. An imaging device comprising:

the electron tube according to claim 20; and an imaging unit arranged to capture an image based on the light from the fluorescent body.

22. An electromagnetic wave detecting device comprising:

the electron tube according to claim 1; and a light detector arranged to detect light, wherein the housing houses a gas for emitting light due to an electron emitted from the electron-emission surface, and the light detector is arranged to detect light due to light emission of the gas.

23. The electromagnetic wave detection device according to claim 22, wherein the gas includes air, argon gas, or nitrogen gas.

* * * * *